United States Patent [19]

Anderson

[11] Patent Number: 5,027,658
[45] Date of Patent: * Jul. 2, 1991

[54] THREE DIMENSIONAL IMAGING METHOD AND DEVICE USING ELLIPSOIDAL BACKPROJECTION WITH ARBITRARILY SHAPED PULSES

[76] Inventor: Forrest L. Anderson, P.O. Box 1400, Bernalillo, N. Mex. 87004

[*] Notice: The portion of the term of this patent subsequent to Aug. 25, 2004 has been disclaimed.

[21] Appl. No.: 270,636

[22] Filed: Nov. 7, 1988

Related U.S. Application Data

[63] Continuation-in-part of Ser. No. 221,501, Jul. 19, 1988, abandoned, which is a continuation-in-part of Ser. No. 106,577, Oct. 7, 1987, which is a continuation-in-part of Ser. No. 858,696, May 2, 1986, Pat. No. 4,706,499.

[51] Int. Cl.$^5$ ............................................. G01N 29/04
[52] U.S. Cl. ........................................ 73/625; 73/626
[58] Field of Search ................. 73/625, 628, 606, 603, 73/597; 128/660.07, 660.01, 661.01

[56] References Cited

U.S. PATENT DOCUMENTS

| | | | |
|---|---|---|---|
| 3,717,843 | 2/1973 | Farrah et al. | 73/603 |
| 4,131,021 | 12/1978 | Mezrich et al. | 73/606 |
| 4,332,016 | 5/1982 | Berntsen | 73/628 |
| 4,688,430 | 8/1987 | Anderson | 73/625 |
| 4,706,499 | 11/1987 | Anderson | 73/625 |
| 4,817,434 | 4/1989 | Anderson | 73/625 |

Primary Examiner—Hezron E. Williams
Assistant Examiner—Louis M. Arana

[57] ABSTRACT

A method and device for imaging three dimensions with a single pulse of energy is described. An embodiment is disclosed which uses a single monopolar transmitted pulse which radiates through a wide solid angular volume. Echoes caused by objects in this volume are detected by a large diameter, sparse circular array of receiver elements. The time history of each element is stored in a digital memory. A reconstruction processor uses this stored time history to reconstruct an image of the reflecting objects. A simple time of flight algorithm, based on Huygens principle, is used in the reconstruction. The algorithm automatically takes into account transmitted wave front curvature and makes no approximations such as fresnel or fraunhofer in the reconstruction. A circular array of receiver elements can be used, which is axicon, and is focused throughout the imaged volume.

A perspective processor controls the reconstruction processor such that the volumetric image may be viewed from various perspectives. Tomographic images may be selected from the imaged volume at various positions and orientations. The perspective processor controls the reconstruction process such that the reconstructed points may be accumulated, summed and thus integrated so that a three dimensional volume may be viewed on a two dimensional display.

21 Claims, 22 Drawing Sheets

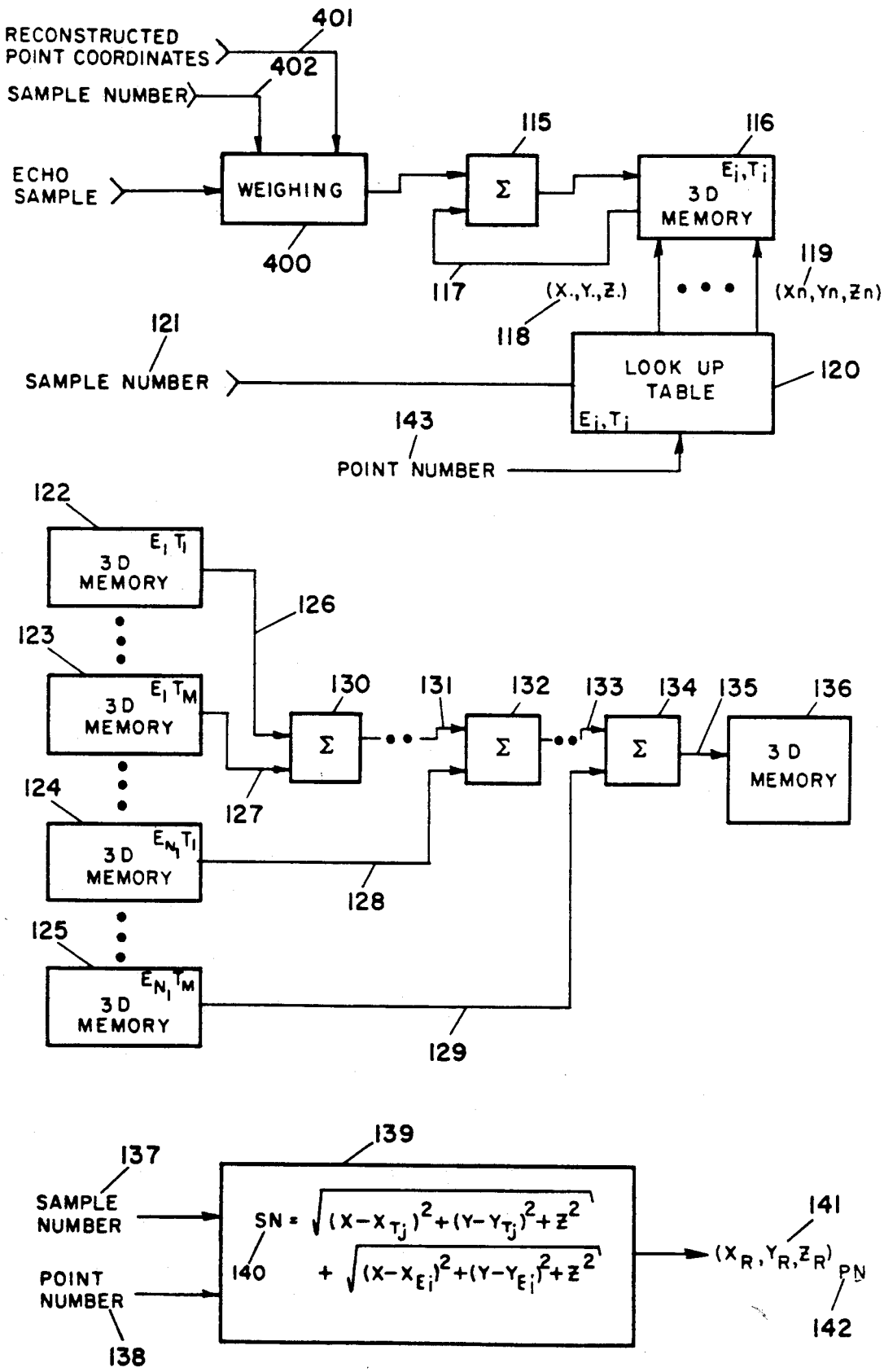
FIG—7

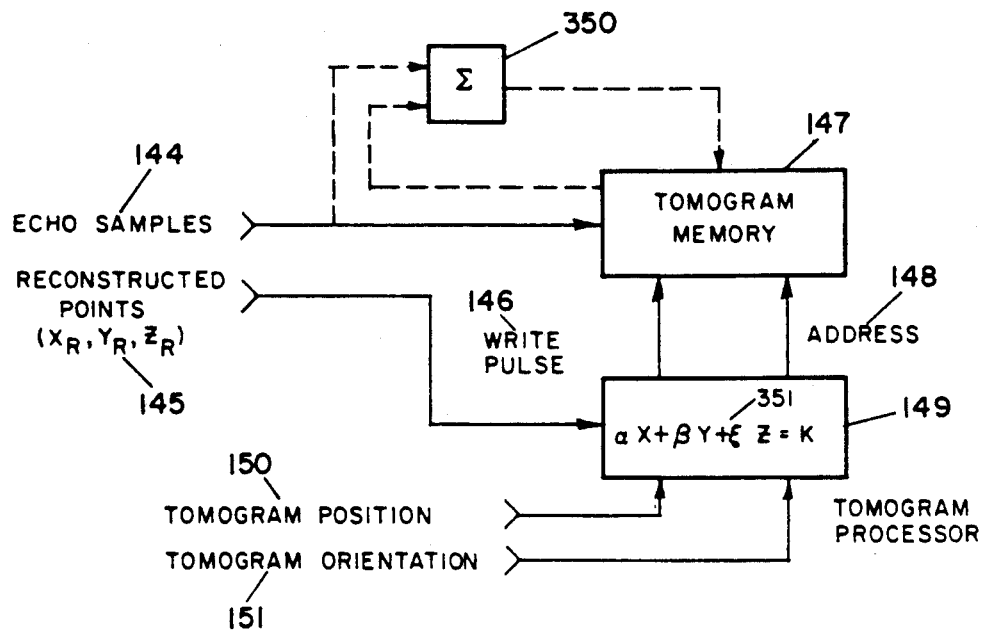
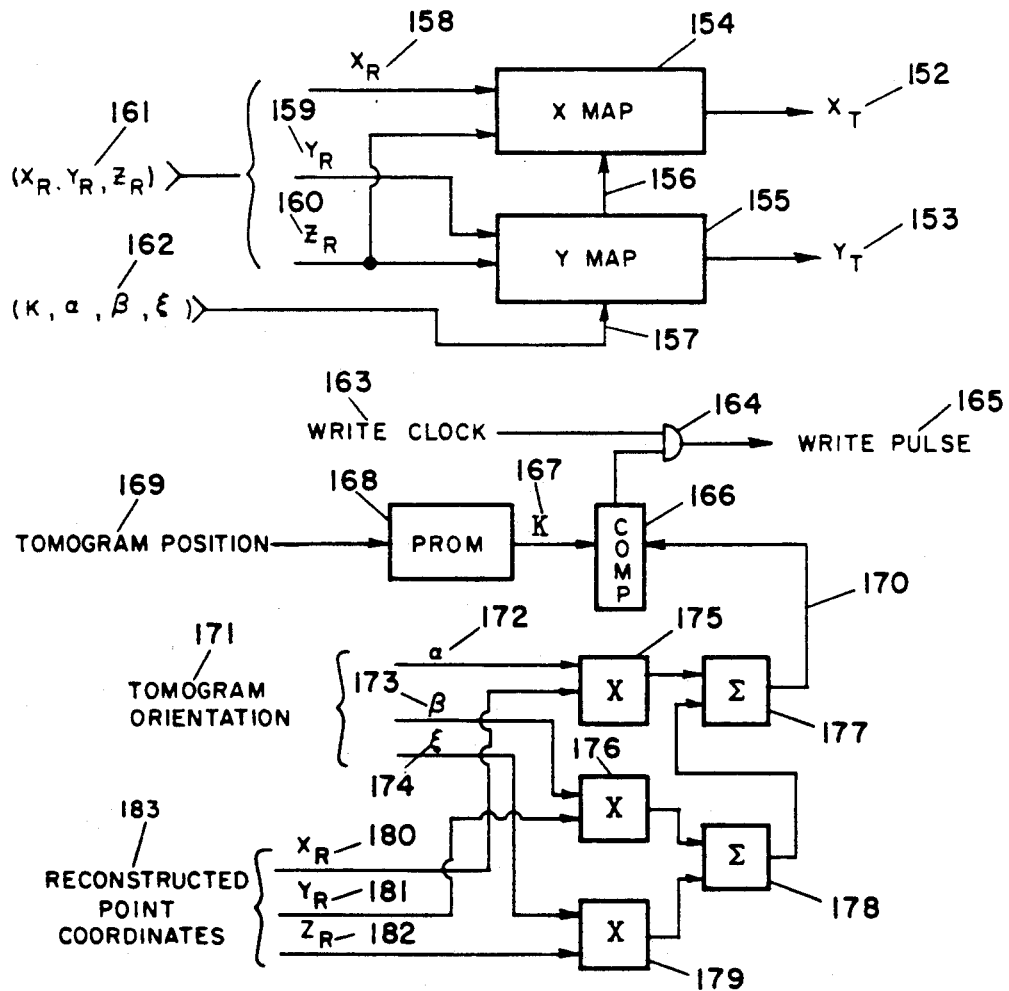
FIG—8

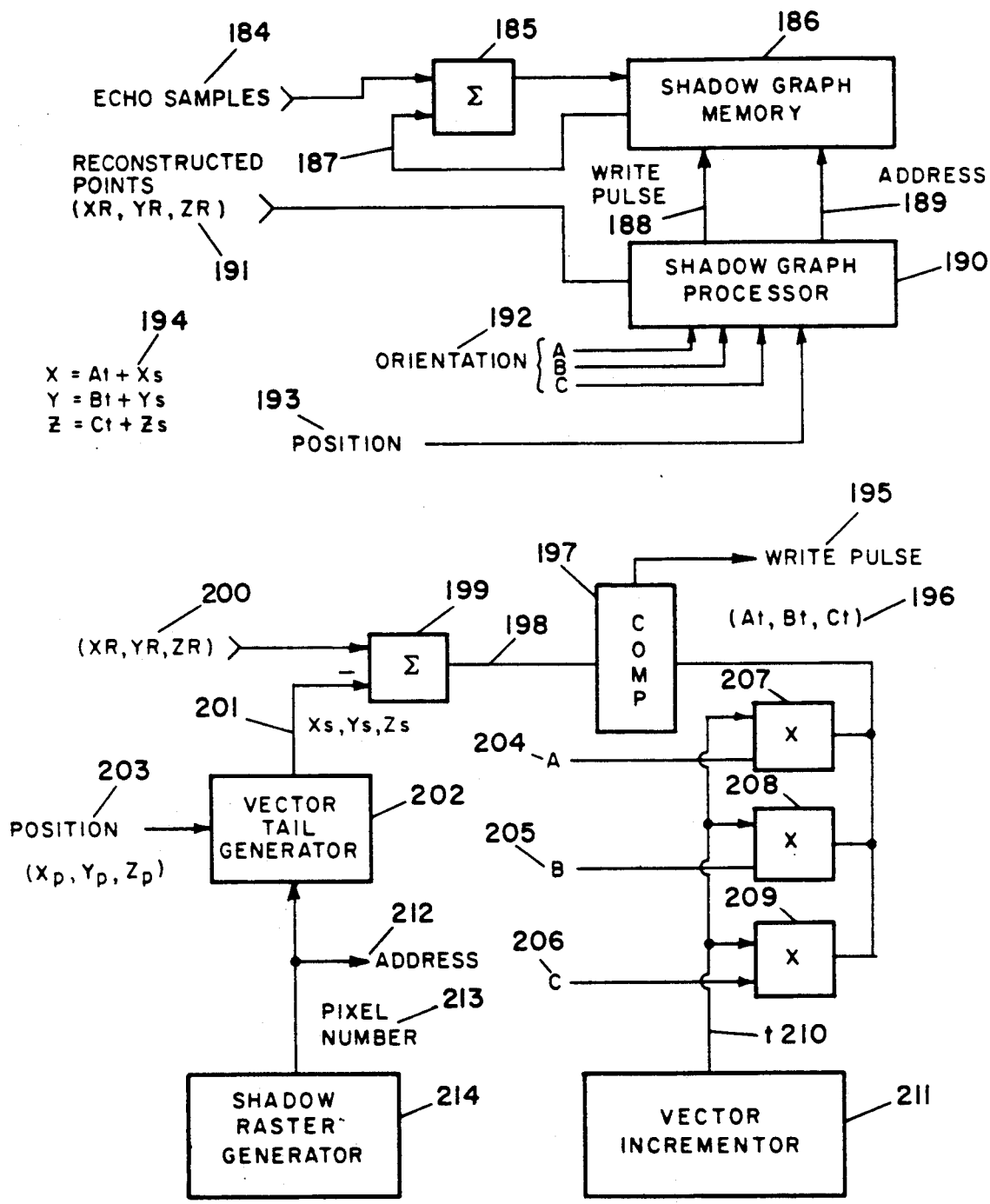
FIG—9

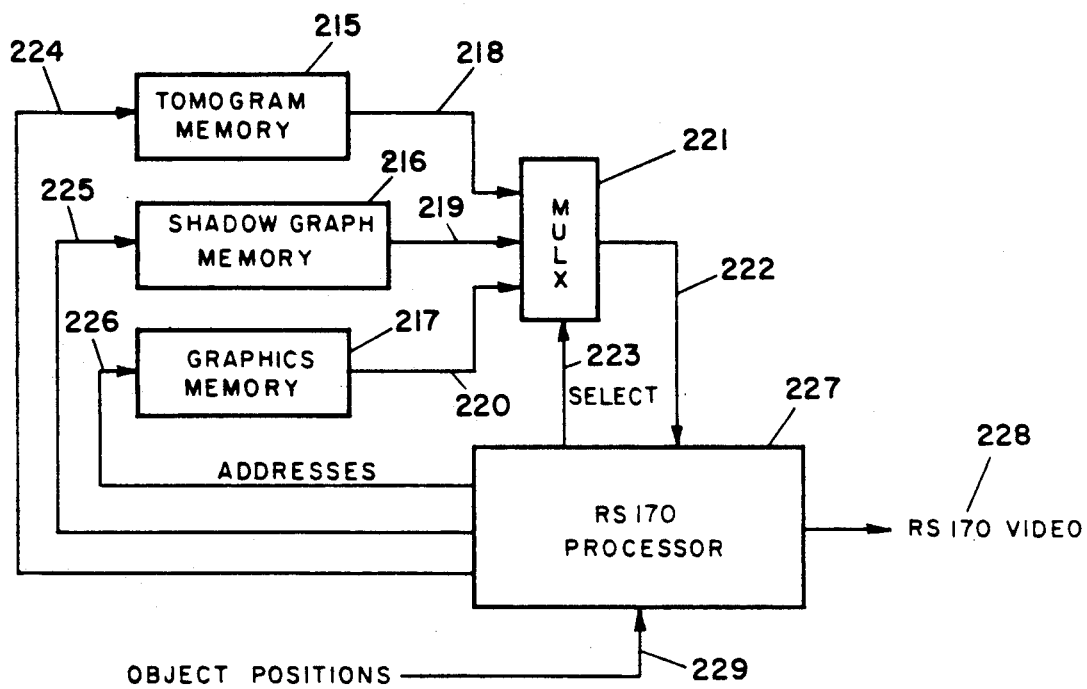
FIG—10
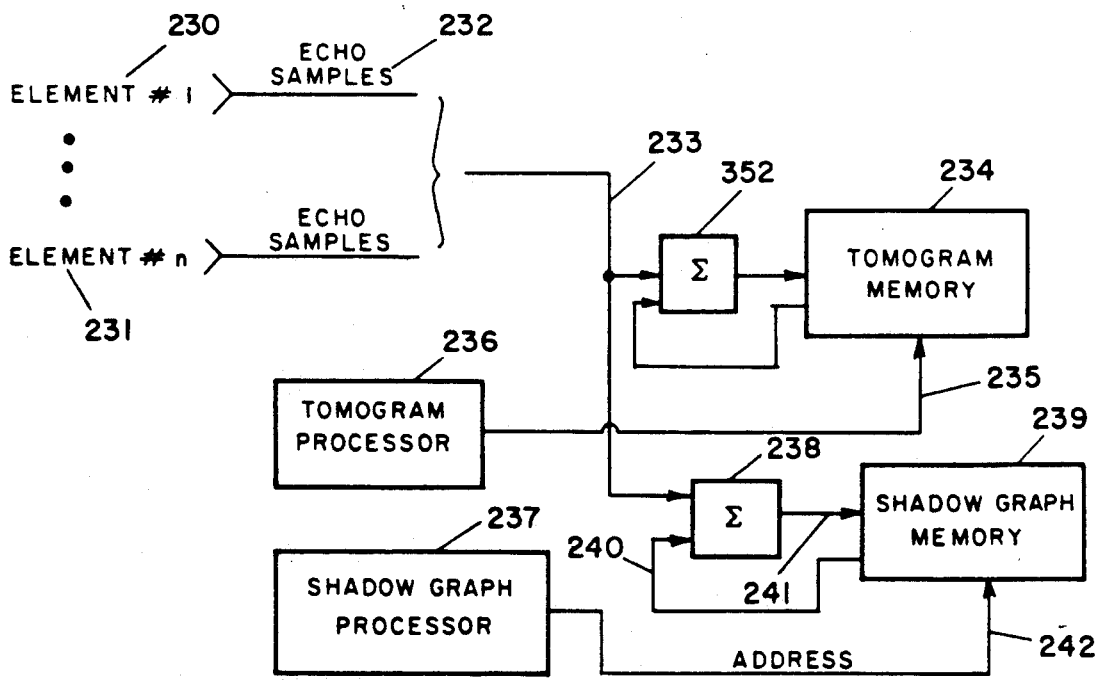
FIG—11

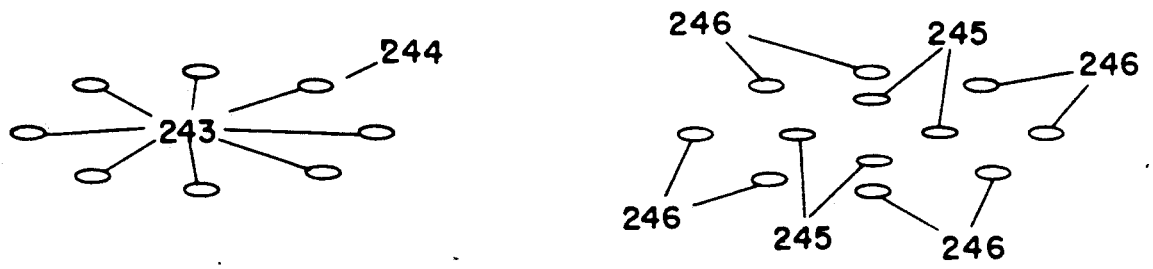
FIG—12
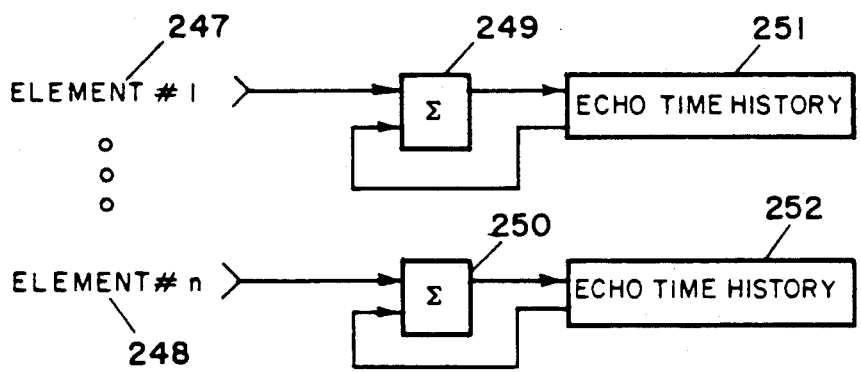
FIG—13
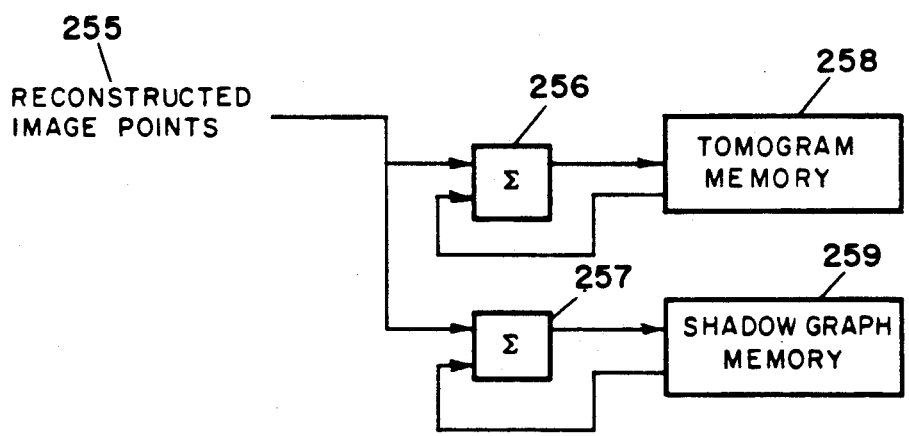
FIG—14

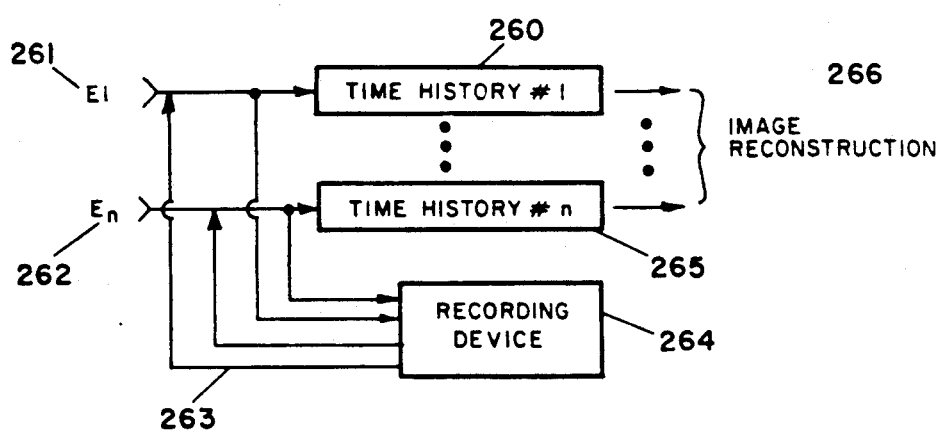
FIG—15
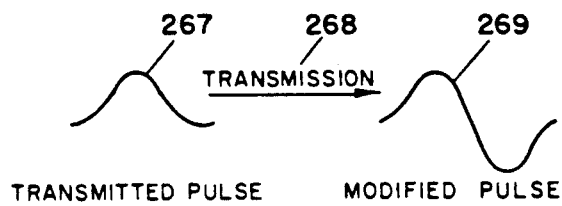
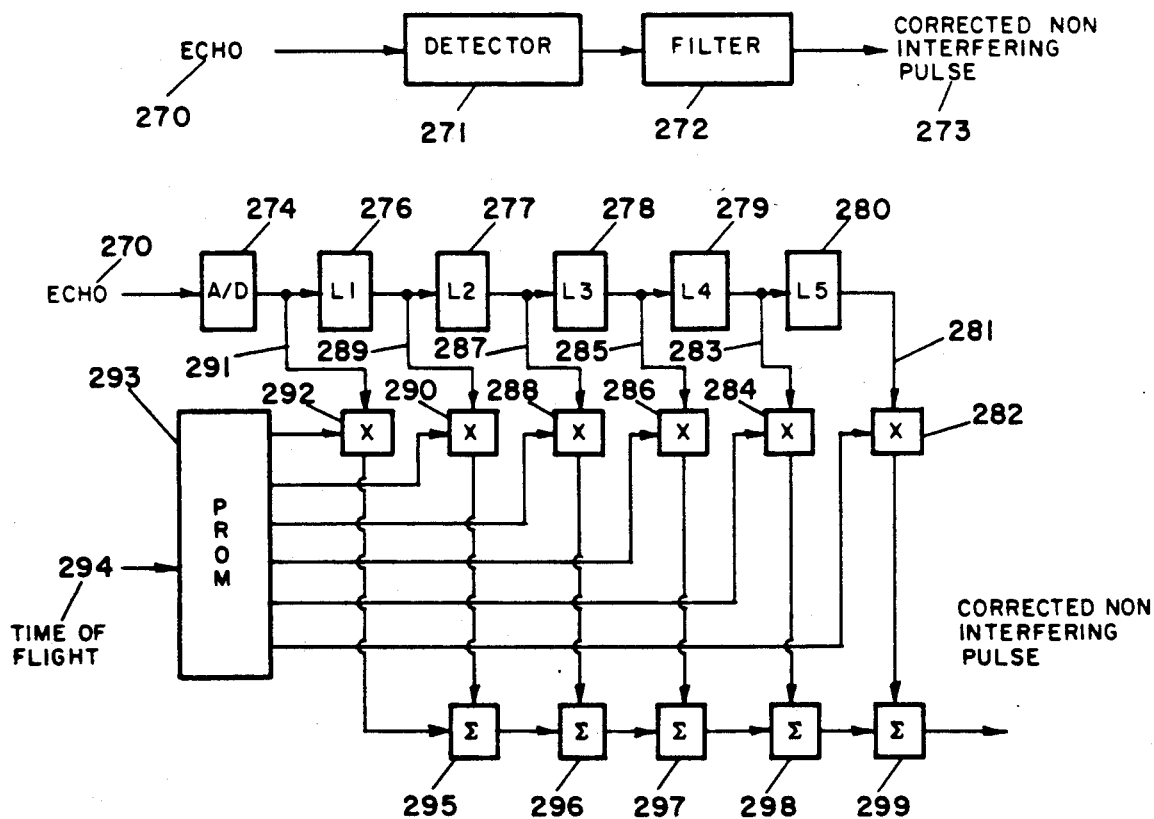
FIG—16

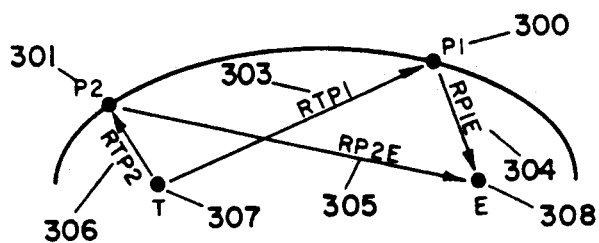
FIG—17
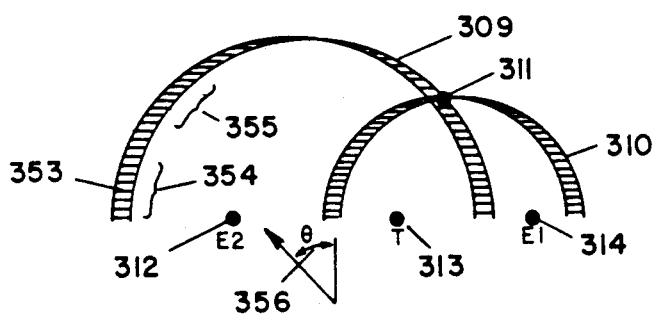
FIG—18
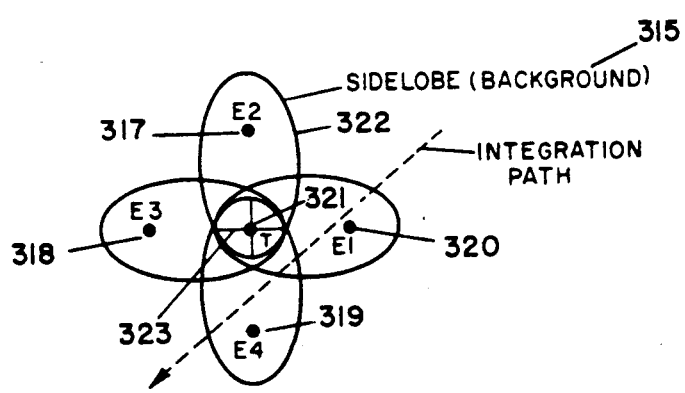
FIG—19
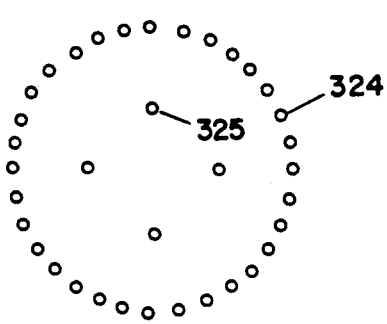
FIG—20

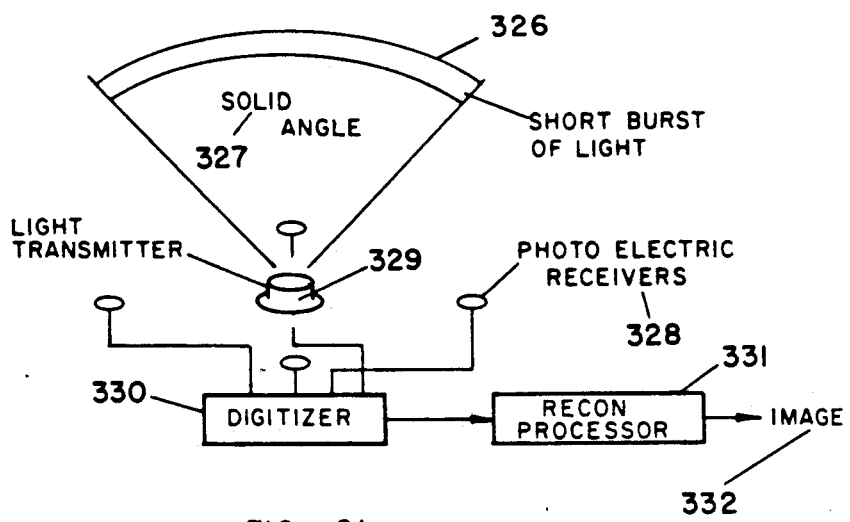
FIG—21
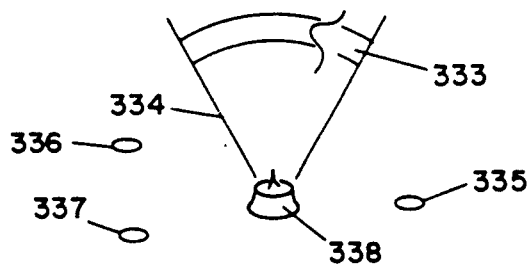
FIG—22
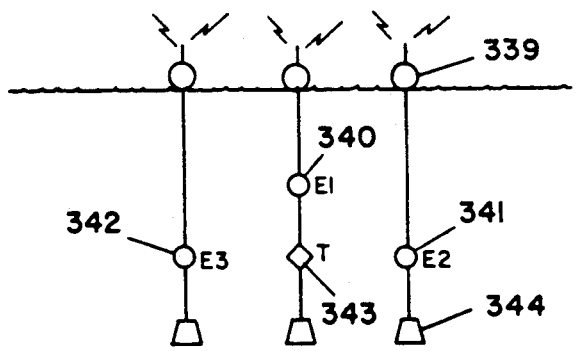
FIG—23
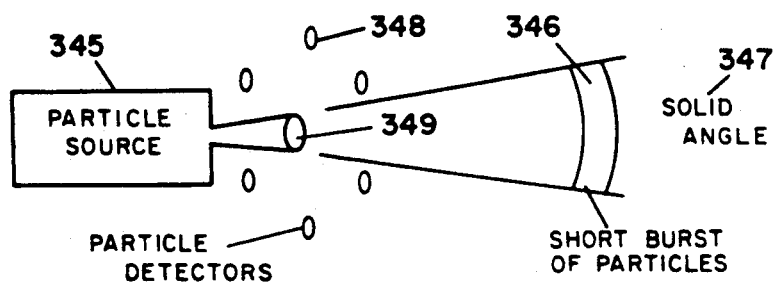
FIG—24

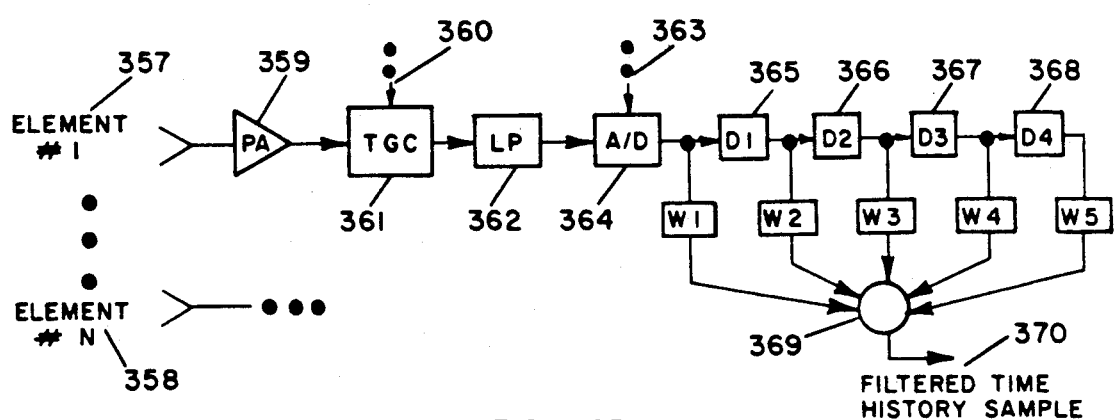
FIG — 25
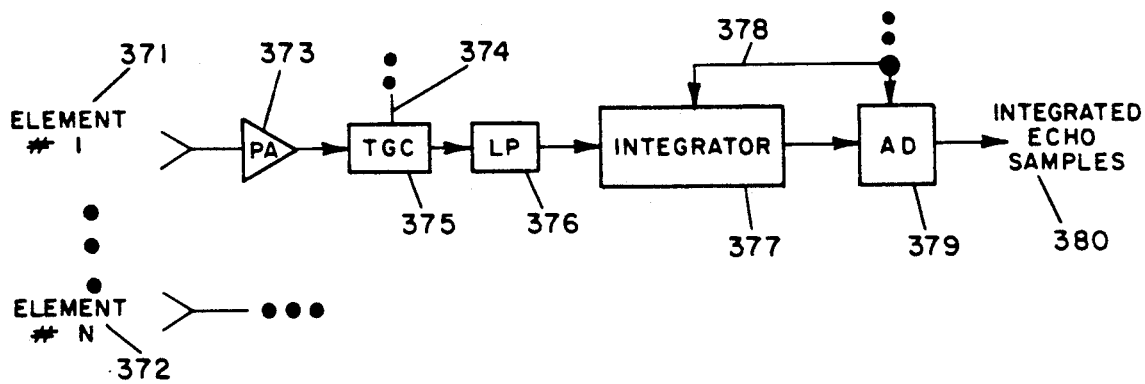
FIG — 26
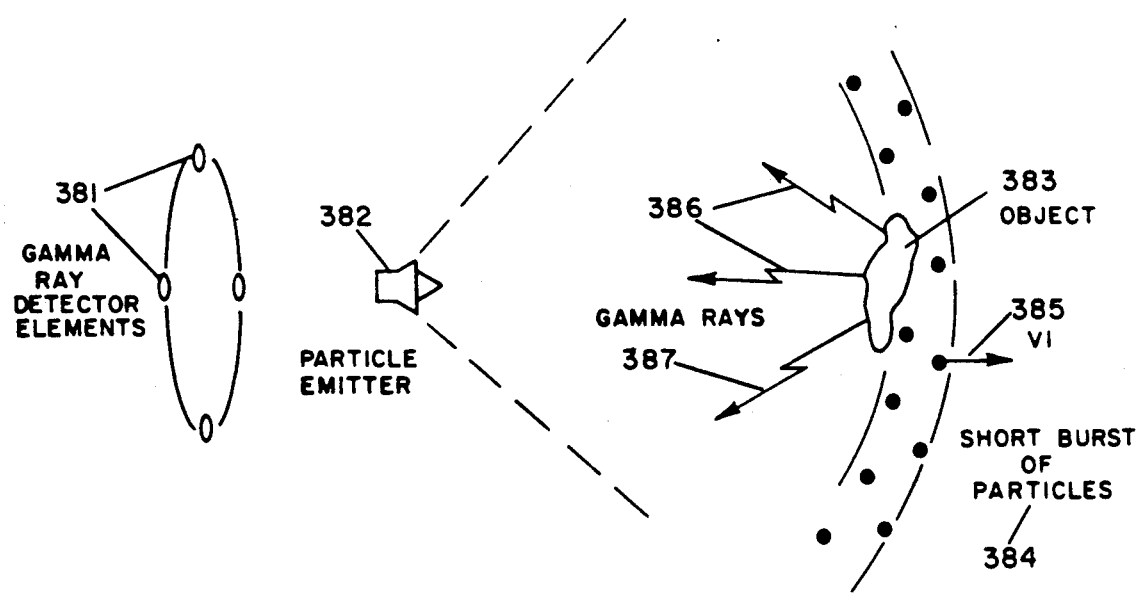
FIG — 27

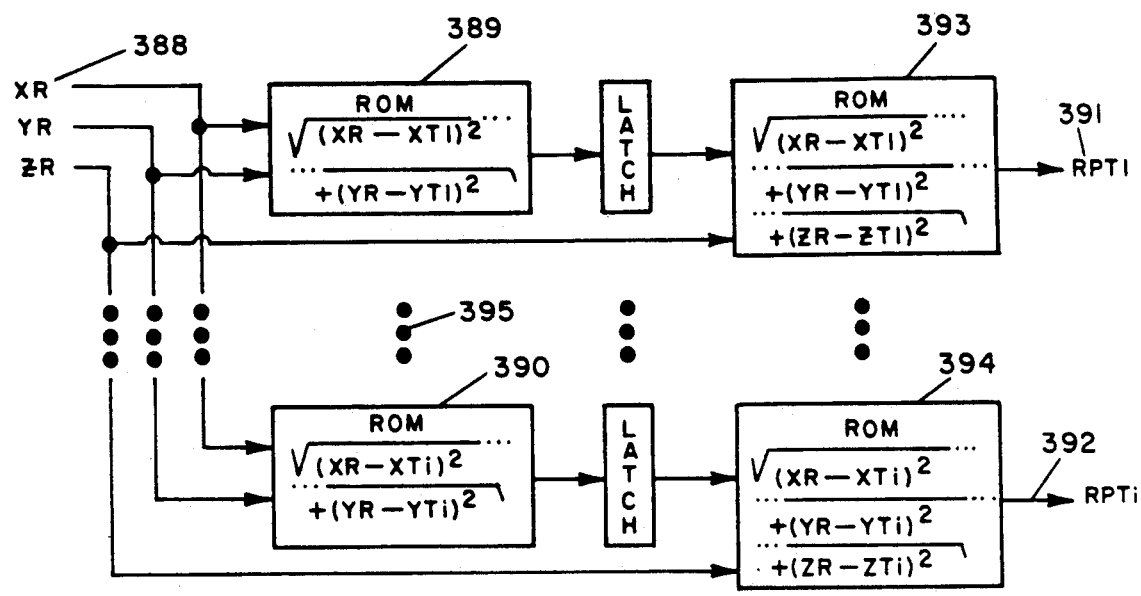
FIG—28
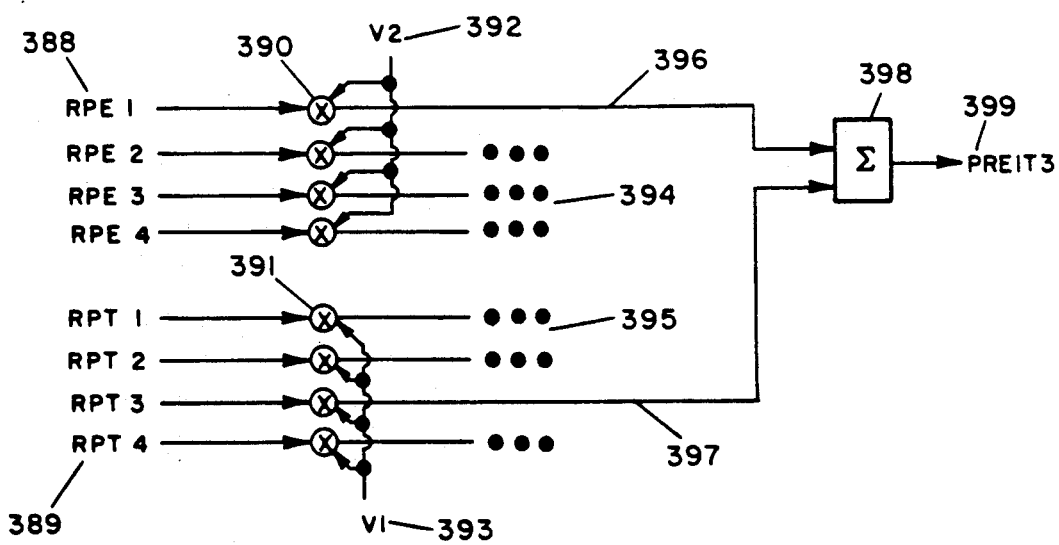
FIG—29

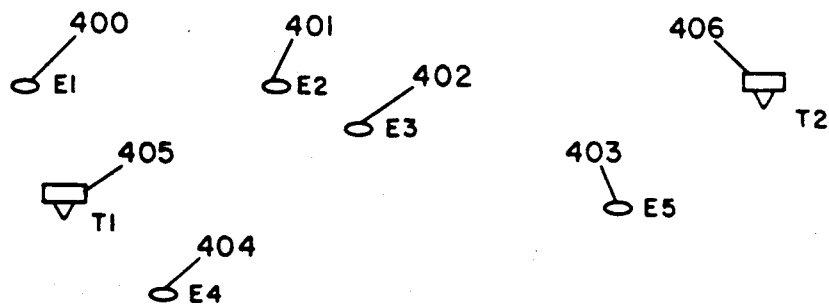
FIG—30
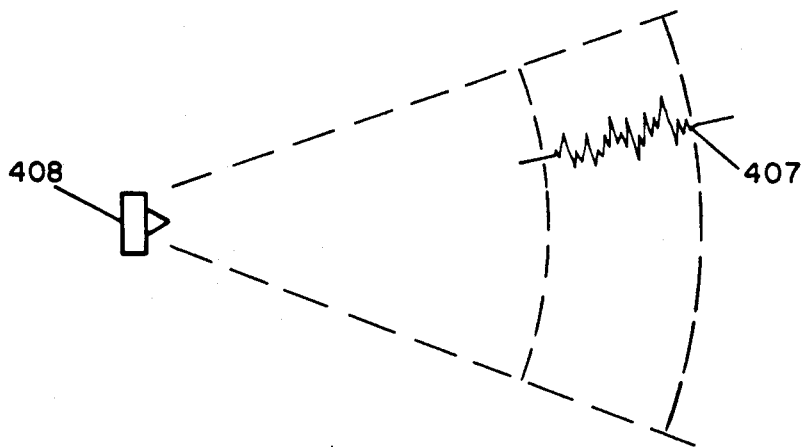
FIG—31
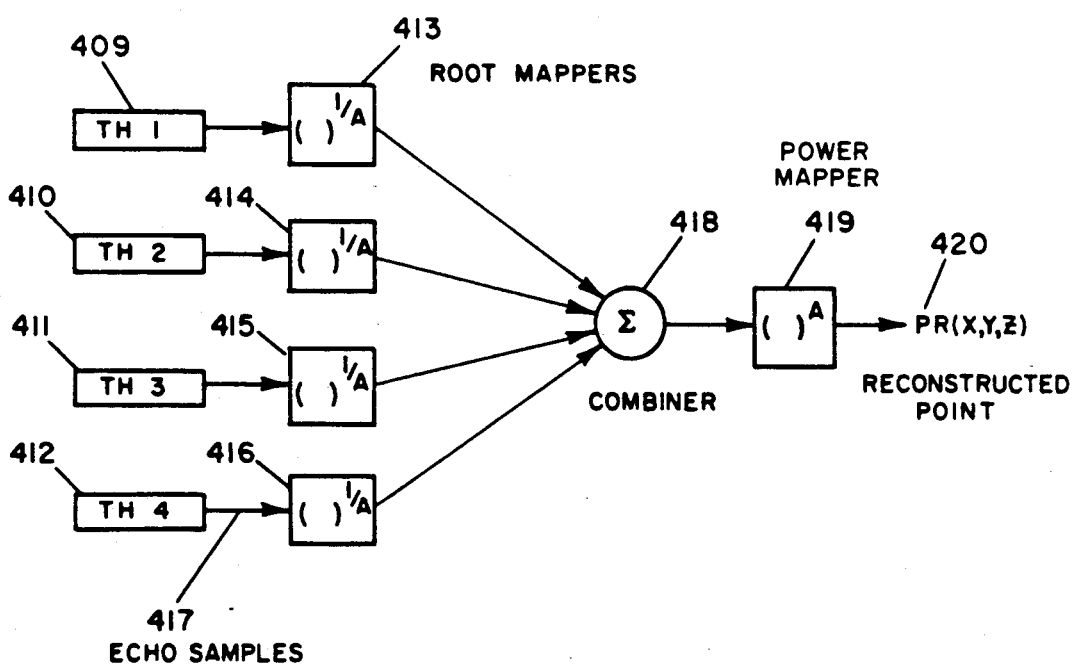
FIG—32

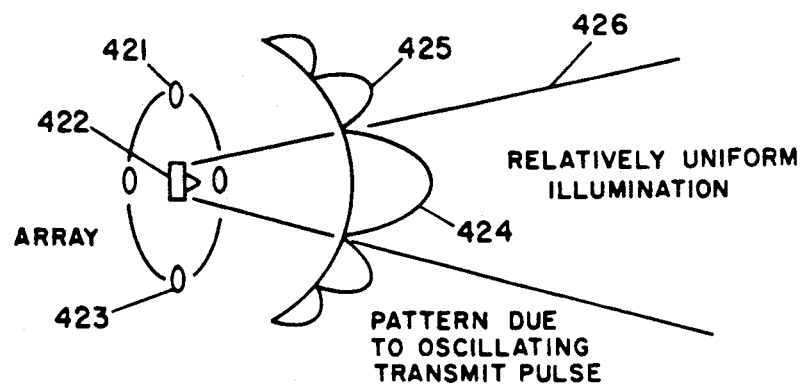
FIG—33
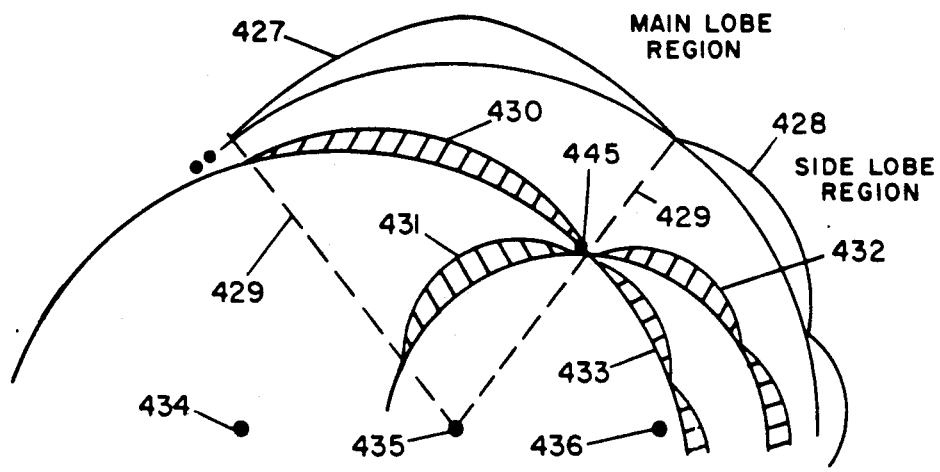
FIG—34
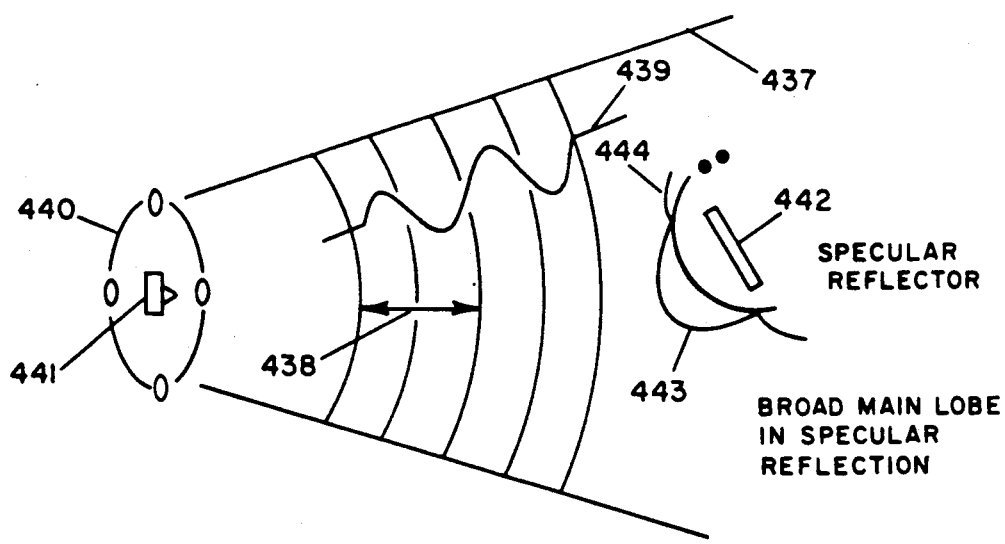
FIG—35

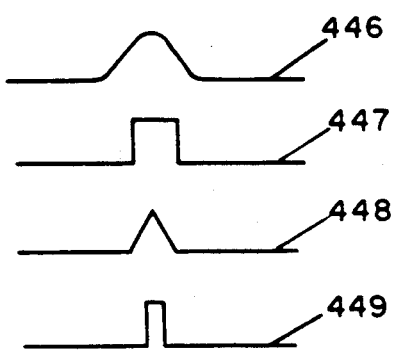
FIG—36
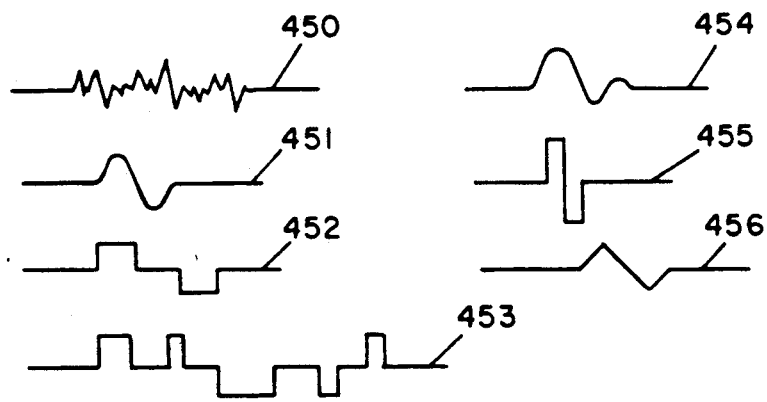
FIG—37
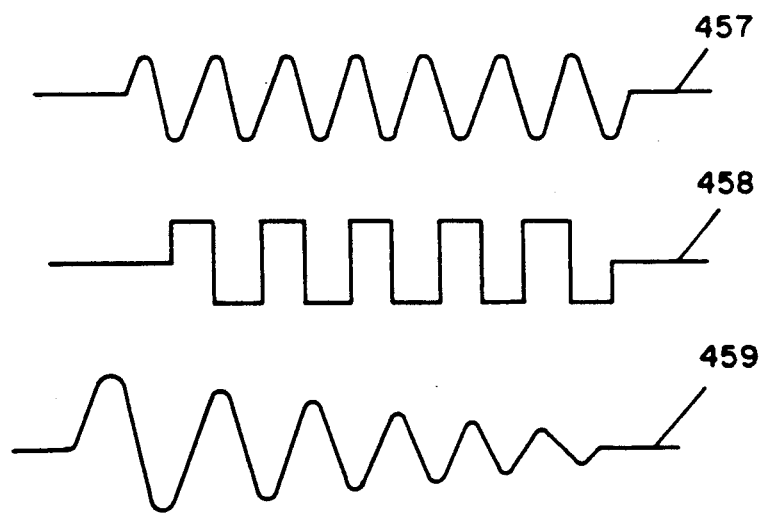
FIG—38

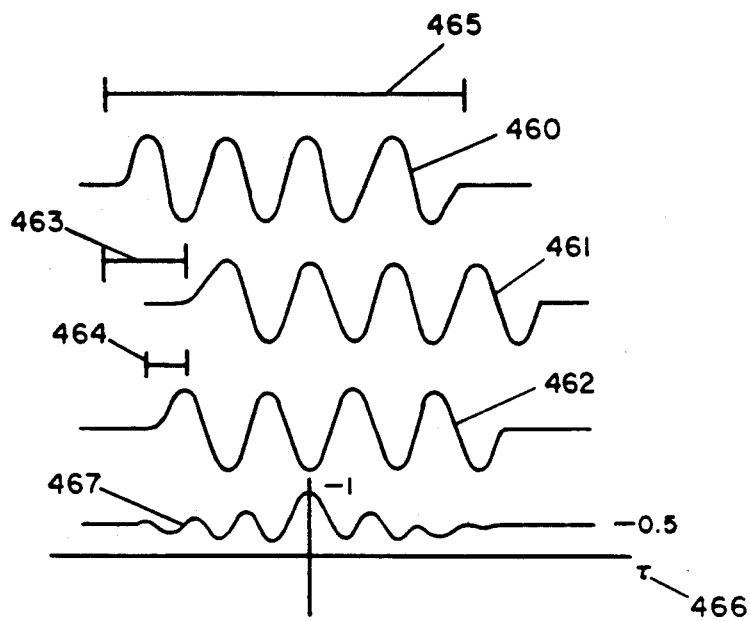
FIG — 39
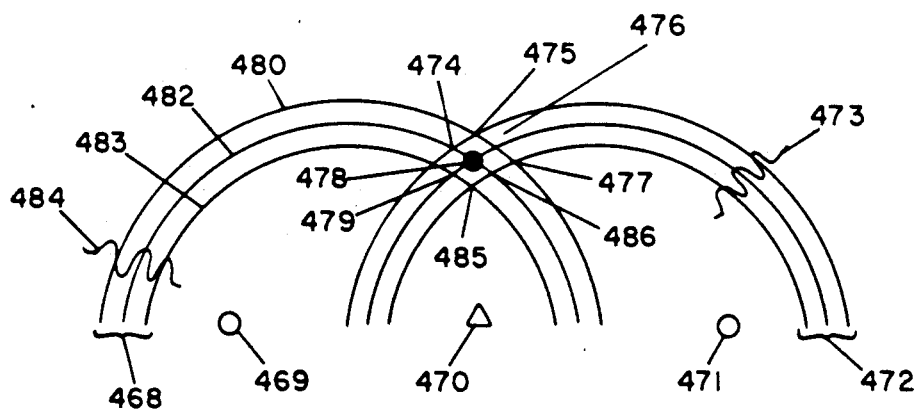
FIG — 40
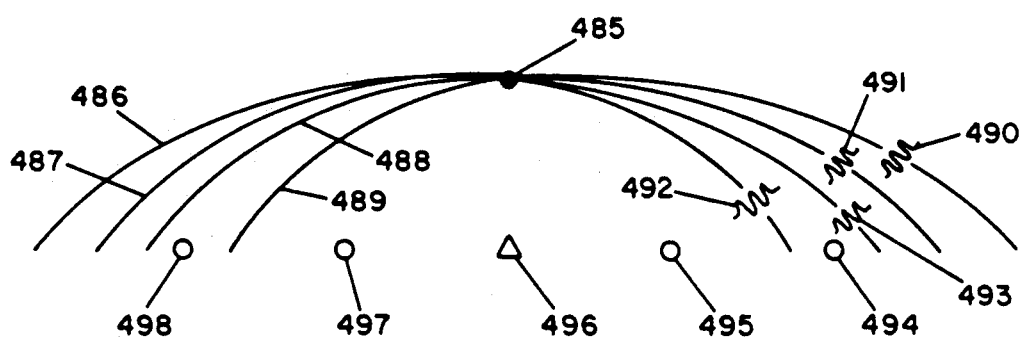
FIG — 41

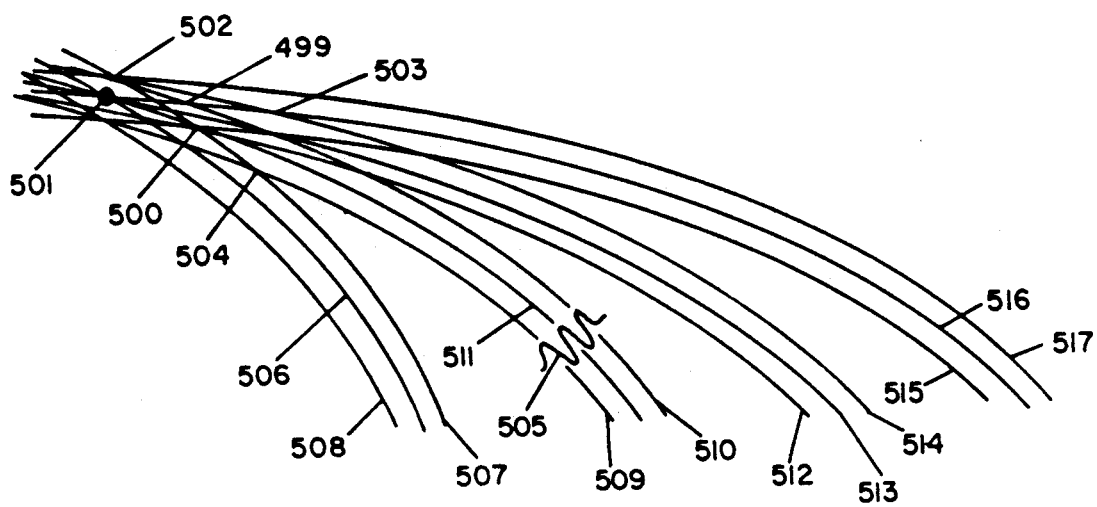
FIG — 42
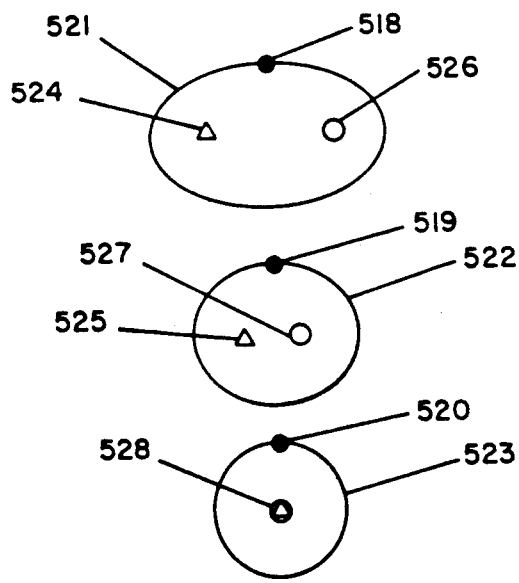
FIG — 43
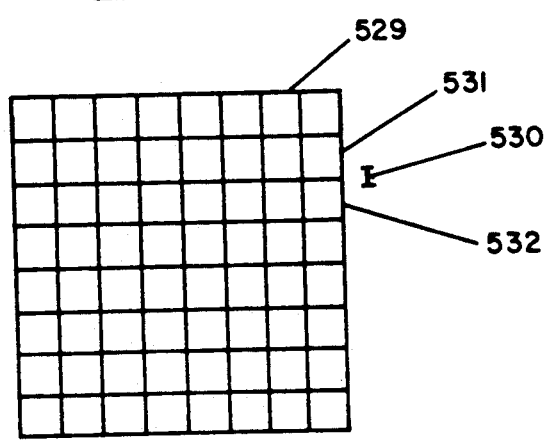
FIG — 44

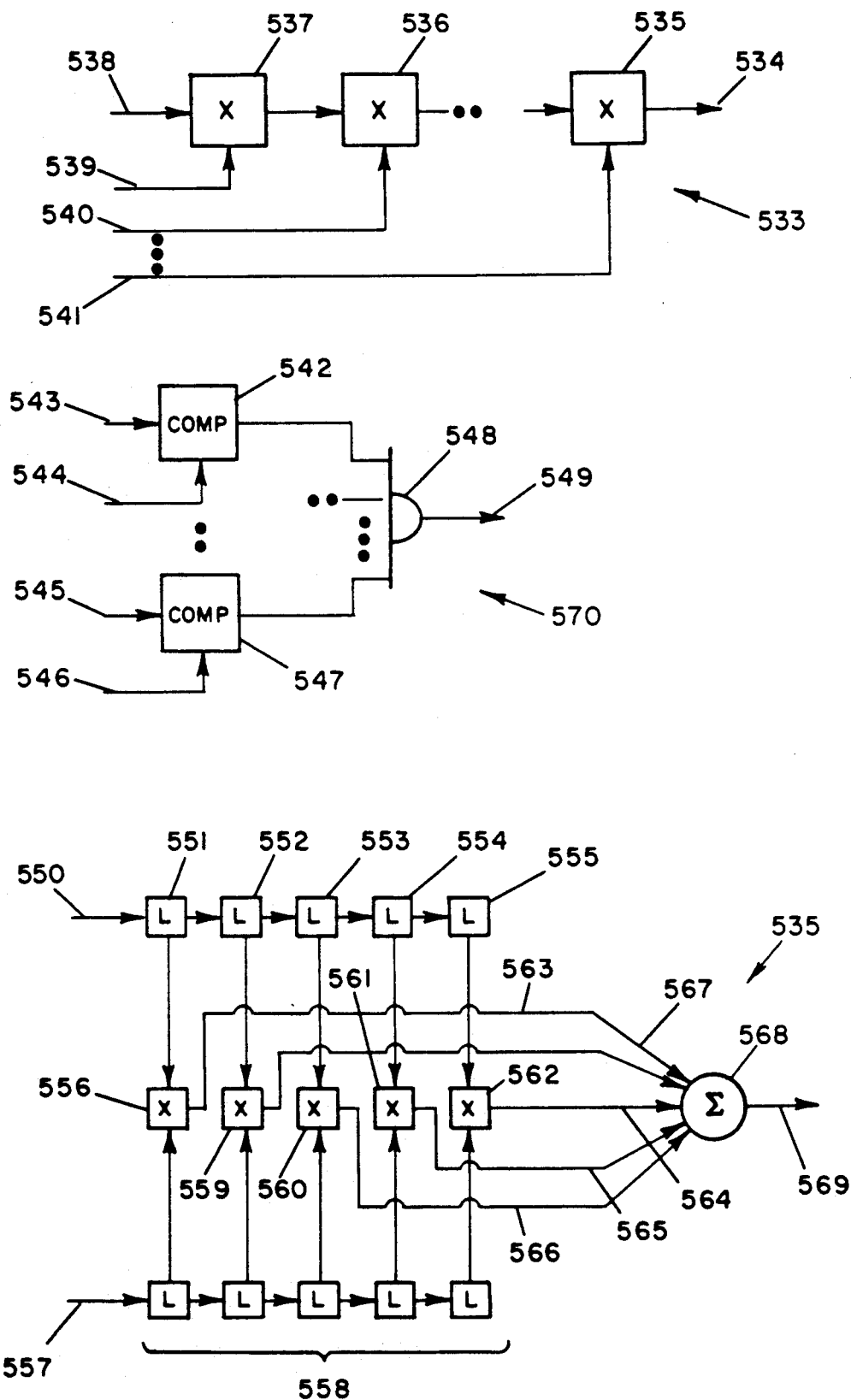
FIG — 45

THREE DIMENSIONAL IMAGING METHOD AND DEVICE USING ELLIPSOIDAL BACKPROJECTION WITH ARBITRARILY SHAPED PULSES

CROSS-REFERENCES TO RELATED APPLICATIONS

This application is a file wrapper continuation in part of application Ser. No. 07/221,501 filed Jul. 19, 1988, now abandoned, which is a continuation in part of application Ser. No. 07/106,577 filed Oct. 7, 1987 which is a continuation in part of U.S. Ser. No. 858,696, now U.S. Pat. No. 4,706,499 filed May 2, 1986. It is also related to application Ser. No. 07/086,588 filed Aug. 17, 1987, now U.S. Pat. No. 4,817,434, which is continuation in part of U.S. Pat. No. 4,688,430 filed Oct. 19, 1985. It is additionally related to application Ser. No. 07/221,534 filed Jul. 19, 1988 which is a continuation in part applications of application Ser. No. 07/106,577 filed Oct. 7, 1987 which is a continuation in part of U.S. Pat. No. 4,706,499 filed May 2, 1986. It is further related to application Ser. No. 07/205,298 filed Jun. 10, 1988 which is related to application Ser. No. 07/106,577 filed Oct. 7, 1987 which is a continuation in part of U.S. Pat. No. 4,796,499 filed May 2, 1986. U.S. Pat. Nos. 4,706,499, 4,688,430 and 4,817,434 are hereby incorporated by reference.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TERMINAL DISCLAIMER

The terminal part of any patent granted on this application which would extend beyond the expiration date of U.S. Pat. No. 4,688,430, is hereby disclaimed. Any patent granted on this application shall be enforceable only for and during such period that legal title shall be the same as the legal titles to U.S. Pat. No. 4,688,430 and U.S. Pat. No. 4,706,499 and also the same as legal titles to any patents resulting from applications Ser. Nos. 07/221,501 or 07/106,577 or 07/086,588 or 07/221,534 or 07/205,298.

BACKGROUND OF THE INVENTION

1. Field of the Invention

This invention relates to the three dimensional imaging of objects using a single pulse of energy or a reduced number of pulses of energy.

2. Description Of The Prior Art

A previous U.S. Pat. No. 4,688,430, describes a similar machine. However in that application the reconstruction process was carried out in two geometrical steps. In the first step the image was resolved with respect to each of two angular directions originating at the transmitting transducer. In the second step the ranges along each two dimensional angular direction are resolved. This requires a complicated mathematical algorithm to be implemented in the reconstruction hardware, and in addition, mathematical approximations to the wavefield geometry may be required.

The previous patent essentially uses spherical coordinates originating at the center of the transmitting transducer. This yields a lateral resolution that is very small near the the transducer but grows larger as the distance from the transducer increases. However, a large aperture formed by a sparse array is capable of producing relatively uniform resolution for ranges equal to several diameters of the array. The previous patent shows an intermediate memory called the data memory which is used to store the three dimensional reconstructed field of reflecting objects. This is an intermediate memory since it must be further processed into a tomographic image or a two dimensional view through a three dimensional field of objects. The present invention can reconstruct tomograms or two dimensional views through three dimensional fields directly from the stored time history of the receiver elements. This increases the processing speed and reduces the amount of electronics by eliminating the requirements for an intermediate memory.

The final display will most likely be in rectangular coordinates whereas the previous approach reconstructs in spherical coordinates. This results in complex electronics being required in the implementation of the machine.

The transmitted wavefield from a small transducer emitting a pulse will approximate an expanding sphere at locations several diameters away from the transducer. This must be taken into account by the reconstruction processor or image degradation will occur. The previous approach makes no explicit provision for this and it would be hard to implement in such a two step reconstruction technique. The implementation would require look up tables or computation circuits for each reconstruction point and each receiver element. This would be hard to implement in real time and would use a large amount of electronics. U.S. Pat. No. 4,706,499 describes a device which uses a round trip time of flight algorithm which automatically takes into account the curved nature of the wavefront propagating away from the transmitter. In addition no Fraunhofer or Fresnel approximations are made since the algorithm is essentially a Huygens wavelet based approach. It requires only the computation of the distance from the transmitter to the reconstruction point and computation of the distance from the reconstruction point to each receiver element.

However, there are further improvements and modifications that can be made.

The time history memories can be eliminated by a reconstruction technique that immediately sums or combines echo samples as they are sampled into the appropriate reconstruction locations (or voxels) in the 3 D memory containing the reconstructed three dimensional image.

The 3 D memory can be eliminated by combining the echo samples as they are sampled into the appropriate pixels in the tomographic image and the shadowgraph image. (The shadowgraph image is the 3 D memory data integrated along a specified viewing perspective vector to provide a two dimensional view through a three dimensional volume)

Multiple redundant transmitted pulses may be used to reconstruct a single image whereby the image signal to noise ratio is improved. The term "redundant" is used since only one transmitted pulse is necessary for the reconstruction of a three dimensional image.

Multiple transmitters may be used with the redundant transmitted pulses to reduce the sidelobe levels. These transmitters are to be spatially offset from one another. The receiver elements may be used as the multiple transmitters or separate transmitting elements may be used. The echoes from the multiple transmitters may be summed, or combined in another manner, in time history memories or separate images may be reconstructed from each different transmitters echoes and the resulting images combined or summed. The later may be done in the absence of time history memories.

Recording devices may be added to record the echo time histories from a number of sequential transmitted pulses. At a later time the recording then can be played back though the machine allowing image reconstruction to take place. The resulting "real time" 3 D image can be viewed from various viewing perspectives and tomograms may be extracted from various positions and orientations.

If oscillations occur in the transmitted pulse, the image can be degraded. Several techniques may be used to compensate for or accommodate this.

The reconstruction technique described in U.S. Pat. No. 4,706,499 is essentially the backprojection of the echo samples over ellipsoids of revolution as will be more fully described in this application. The backprojections may be weighted as a function of the reconstruction point position to compensate for transmitter or receiver radiation patterns and other phenomena.

The sparse receiver array, by the addition of elements, may be made into a more nearly continuous array which when arranged in a circle would be a phased annulus or adjustable axicon. This sort of receiver array normally has very high sidelobes but when used with a noninterfering transmitted pulse and ellipsoidal backprojection has acceptable sidelobe levels. The addition of redundant pulsing and multiple transmitters further reduces the sidelobe level.

In forming shadowgraphs by integration (two dimensional views through three dimensional volumes), the sidelobes are integrated and the relative sidelobe level is degraded. After a three dimensional image is created of a volume containing many point reflectors, the sidelobes create a more or less continuous background level. If this background level is subtracted out (or truncated) before the shadowgraphs are created, the relative sidelobe level will not be degraded as much.

Another method of reducing sidelobe levels is to use a nonlinear form of combination in the reconstruction process (as contrasted with only using addition). For example, the echo samples may be multiplied together. The samples could be logarithmically compressed and then added together. The samples could be, first, applied to a comparator, being compared with a reference value, thus being converted to binary values, and then be combined using logic operations such as conjunction, alternation (disjunction) or more complex compound logical operations. The samples could be first compressed using the square root, then added, the results then could be decompressed by squaring.

Nonlinear combination could be useful when the three dimensional volume to be imaged contains only a few sparsely spaced objects.

The class of types of transmitted pulses that the imaging system may use can be broadened to include any type of pulse with a sharply peaked autocorrelation function that has a very small value except when the shift variable is near zero. Another measure is the integral of the sum, over time, of the pulse and a time shifted replica of itself. The amount of shift is given by the "shift variable". The result is a function of the shift variable and will be termed the "auto interference function", which is a measure of constructive and destructive interference of the pulse shape with replica of itself as a function of the shifted position of the replica. Pulses that have a peaked autointerference function that has a very small value except when the shift variable is near zero and very low amplitude oscillations are also suitable. All of these types of pulses will be termed "non interfering" or "interference free" for purposes of this application as there is little constructive and destructive interference and therefore grating lobes will not be formed when using a sparse array. A wideband white noise pulse is an example. These types of pulses also can propagate relatively uniformly through a wide solid angle. Further discussion of these types of pulses may be found in "Random Data:Analysis and Measurement Procedures" by Bendat and Piersol.

The imaging system can also function with a class of pulses which will be termed "low interference" for purposes of this application. This type of pulse has relatively low constructive and destructive interference effects as measured by the autointerference function. The function is relatively peaked around zero with relatively low amplitude oscillations as the shift variable takes on non zero values and therefore high amplitude grating lobes will not be formed when using a sparse array.

Periodic, oscillating, "interfering" pulses of a particular class may also be used for imaging if additional echo processing occurs before image reconstruction (such as echo time history convolution with a matched filter impulse response) or without additional processing if some image degradation is allowable. These pulses have an oscillating autointerference function although the oscillations may not be of equal amplitude. Even with equal amplitude oscillations, the grating lobes will be lower in amplitude than the main lobe (the reconstruction point) and the reconstructed image may be adequate for some purposes. The pulses must be of short enough duration to allow adequate lateral and range resolution. Thus, a pulse of several sinusoidal cycles may be used if the total pulse duration, or length, is of the same order as the required resolution. These types of pulses will be termed "short duration interfering" pulses.

SUMMARY

This invention will provide a three dimensional image after transmitting a single pulse (or reduced number of pulses) of energy using the echoes received by a closely spaced or sparse array of receiver elements.

It will image a three dimensional volume in real time or near real time and provide a means of reconstructing a three dimensional image of objects using echoes resulting from the transmission of a single pulse of energy while avoiding grating lobes and other interference effects when using a sparse array of receiver elements.

It uses a reconstruction technique based on the speed of propagation of elementary wavelets generated by the transmitter and reflecting points on objects. Each echo sample at each receiver element represents the integral of the imaged object field over an ellipsoid of revolution. Thus the echo samples are projections of the field of objects over ellipsoids of revolution. Reconstruction is done by backprojection of these projections. The backprojection algorithm is simple and fast. Various filters may be applied to the echo samples before backprojection. These filters can sharpen the image, reduce the sidelobe levels, or compensate for propagation phenomena. Some additional objects of this invention are:

To illuminate or insonify a wide angular volume uniformly with the transmission of a single pulse of energy.

To provide a means of viewing three dimensional data on a two dimensional display.

To provide a means for reconstructing an image which provides relatively uniform resolution throughout the imaged volume.

To use a simple reconstruction method which uses one geometrical step.

To use a reconstruction method which is based on rectangular coordinates.

To reconstruct the image of objects causing echoes directly from the stored time history of echoes received at each element of the receiver array.

To use a reconstruction algorithm which uses the combined distances from the transmitter to the reconstruction point and from the reconstruction point to the receiver element as a basis for reconstruction.

To reconstruct three dimensional images and tomographic images from the array element time histories without the use of large intermediate memories.

To use a reconstruction algorithm which can reconstruct points in any order within the insonified three dimensional volume and thus facilitate the reconstruction of variously oriented volumes and tomograms viewed from various perspectives.

To use a reconstruction algorithm which inherently takes into account the wavefront curvature of the transmitted pulse.

To use a reconstruction algorithm which makes no Fresnel, Fraunhofer, or similar approximations.

Further objects and advantages of this invention will become apparent from consideration of the drawings and descriptions of the preferred embodiment.

BRIEF DESCRIPTION OF THE DRAWINGS

FIG. 7 shows time history memory elimination.

FIG. 8 shows 3D memory elimination.

FIG. 9 further shows 3D memory elimination.

FIG. 10 shows an object oriented display.

FIG. 11 shows elimination of both 3D and time history memories.

FIG. 12 shows multiple transmitters.

FIG. 13 shows multiple redundant pulses/summing into echo time history memories.

FIG. 14 shows multiple redundant pulses/summing into image pixels.

FIG. 15 shows an echo recording device.

FIG. 16 shows oscillation compensation.

FIG. 17 shows the echo geometry.

FIG. 18 shows echo and reconstruction geometry for two receiver elements.

FIG. 19 shows Echo and reconstruction geometry for four receiver elements.

FIG. 20 shows an axicon array.

FIG. 21 shows a lidar embodiment.

FIG. 22 shows a radar embodiment.

FIG. 23 shows a sonar embodiment.

FIG. 24 shows a particle beam embodiment.

FIG. 25 shows time history filtering.

FIG. 26 shows echo sample integration/blip imaging.

FIG. 27 shows different transmit and echo velocities.

FIG. 28 shows reconstruction address generation for multiple transmitters.

FIG. 29 shows different transmit and echo velocities and the method of time history address generation.

FIG. 30 shows an arbitrary three dimensional array.

FIG. 31 shows the transmission of a wideband random pulse.

FIG. 32 shows nonlinear processing.

FIG. 33 shows the transmission of an oscillating pulse.

FIG. 34 shows backprojection image reconstruction using an oscillating transmitted pulse.

FIG. 35 shows quasi specular reflection with an oscillating transmitted pulse.

FIG. 36 shows non interfering pulses

FIG. 37 shows low interference pulses

FIG. 38 shows short duration interfering pulses

FIG. 39 shows an autointerference function

FIG. 40 shows backprojection of interfering pulse echoes

FIG. 41 shows backprojection of interfering pulse echoes

FIG. 42 shows backprojection of interfering pulse echoes

FIG. 43 shows ellipsoidal eccentricity and spheres

FIG. 44 shows a non sparse array with closely spaced elements

FIG. 45 shows alternate means of echo sample combination

DESCRIPTION OF THE PREFERRED EMBODIMENT

Description Of The Preferred Embodiment

Medical Ultrasound

Figure 1:
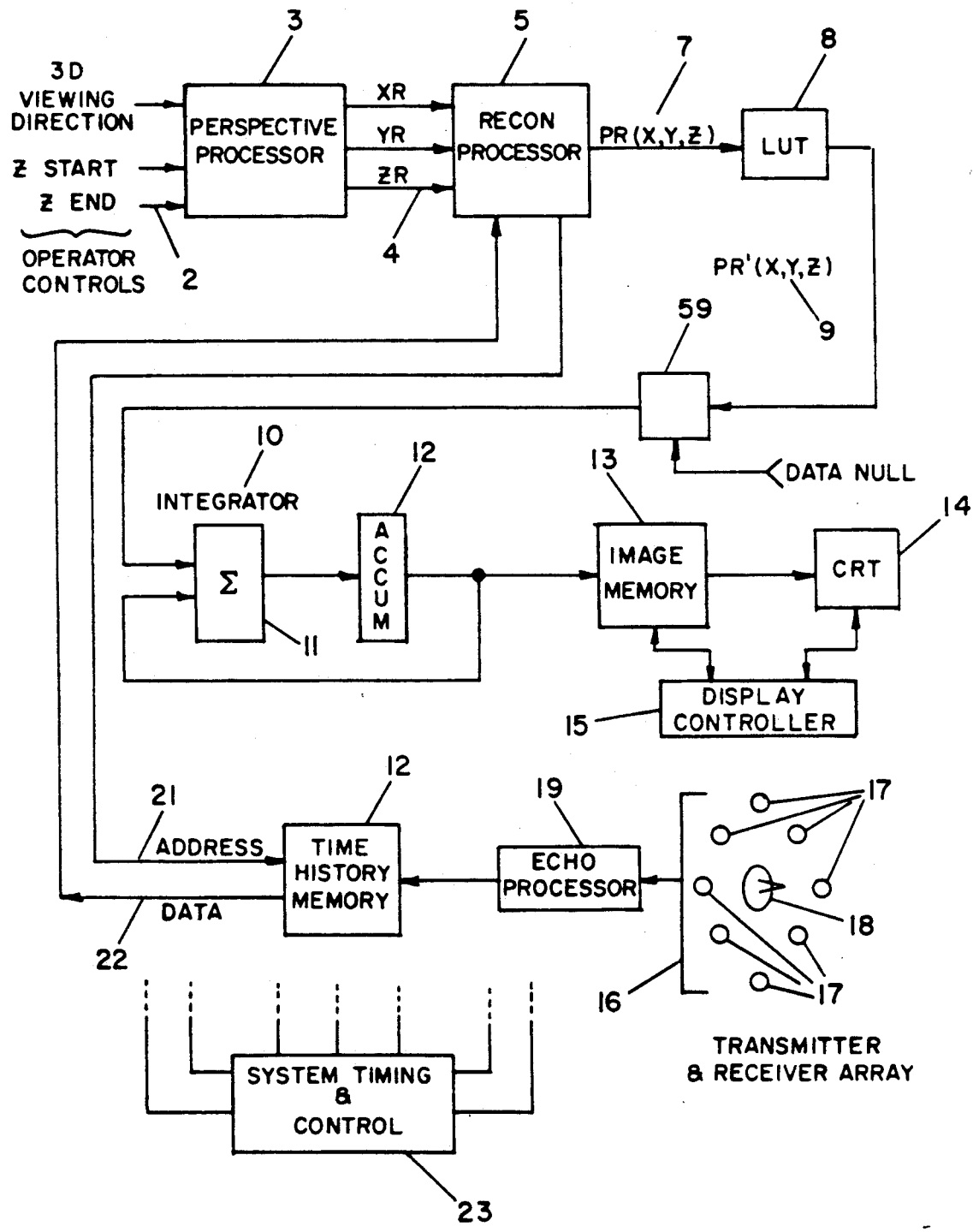
FIG. 1 shows a block diagram of the single pulse imaging system.
Figure 2:
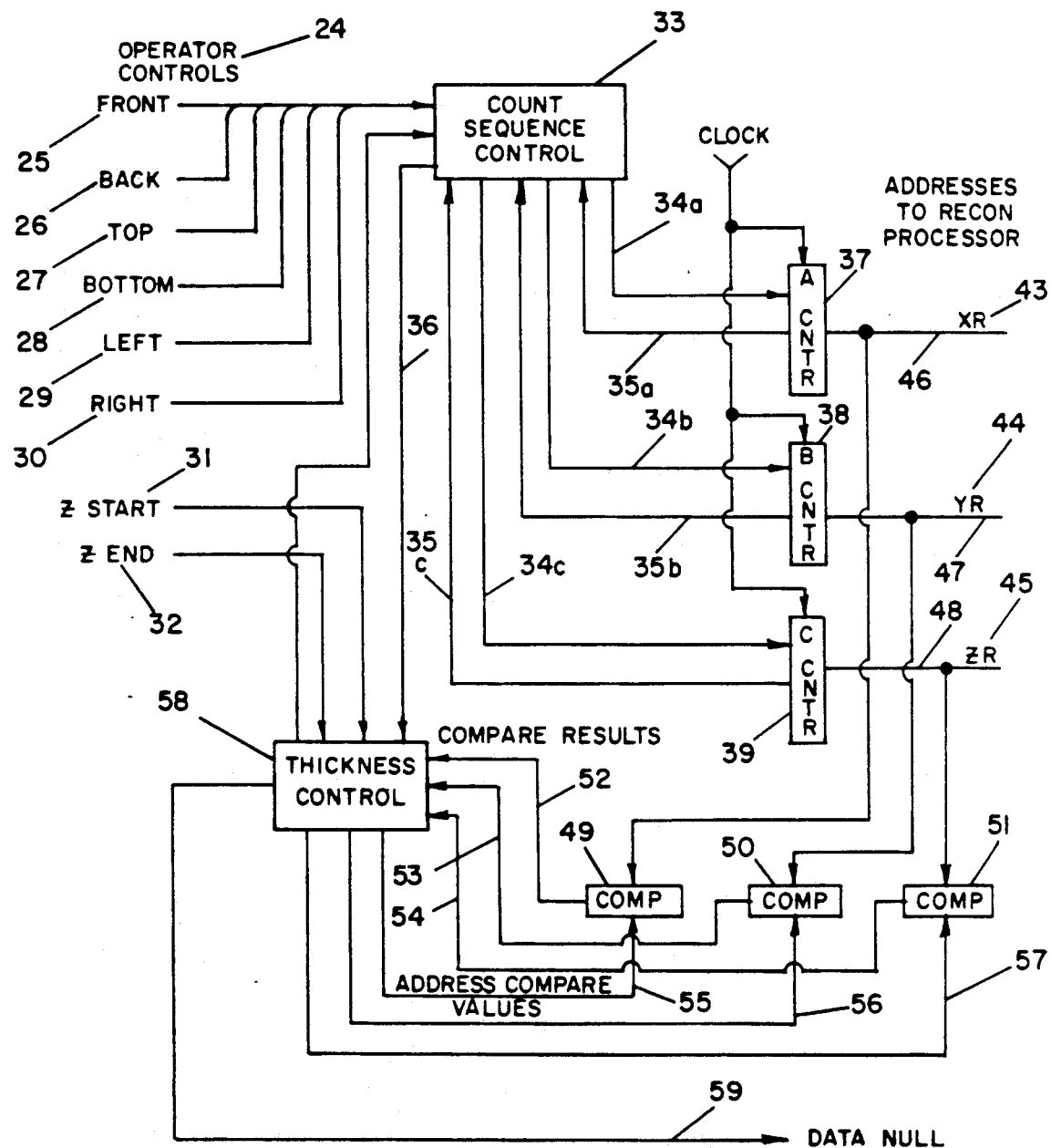
FIG. 2 shows a block diagram of the perspective processor which controls the reconstruction sequence to generate three dimensional or tomographic views from user selectable perspectives.

The apparatus described herein is a means of imaging three dimensions with the transmission and reception of a single pulse of ultrasonic energy. FIG. 1 is a system block diagram. A single transmitting element, the pulse generating means (18) is located at the center of a sparse circular array (17) of receiver elements. The transmitter emits a single unipolar pulse of energy. An example of the method of generation of such a pulse, and experimental results can be found in "Electronic Circuit for High Frequency and Broad Band Ultrasonic Pulse Echo Operation" by Platte el al in Ultrasonics 1987 vol 25 March. A multicycle pulse may be used if the echoes are converted to unipolar pulses by rectification at the receiver elements before further processing occurs. A multicycle pulse may also be used without rectification if certain other criterion are met. These criterion are discussed later. Also a wideband noise like pulse may be used. The pulse shape may be a half cycle sinusoid, a gaussian pulse or any other monopolar pulse. A gaussian shape is efficient in that it contains a relatively small higher harmonic content. If a single cycle or multicycle pulse is used with a small transmitter element, a wide solid angle may be insonified uniformly. Then these pulses may be considered noninterfering or relatively noninterfering pulses for the purpose of insonification of the imaged volume and for the purposes of this application. This is illustrated in U.S. Pat. No. 4,688,430. Most mediums to be imaged attenuate higher frequencies more than lower frequencies. The ratio of the diameter of the transmitter to the length of the transmitted pulse determines the size of the solid angle that will be insonified uniformly. In other embodiments a transmitter which is large compared with the pulse length may be used if it is curved (or defocused) so that the radiated pulse is spherical. With a large transmitter the edge waves must be attenuated or otherwise accommodated.

As the pulse propagates away from the transmitter, objects, or reflecting points, in its path will generate echoes that propagate back toward the receiver array. These echoes are detected by the receiver elements (17) of the receiver array. Because a unipolar pulse is used, the receiver array elements may be spaced far apart creating a large sparse aperture which will have better lateral resolution than the same number of elements configured into a dense array. With a unipolar pulse (or any non interfering pulse) no grating lobes will occur.

A sparse array is an array of elements that, for the purposes of this application, are placed no closer together that one half the spatial length of the transmitted pulse.

The echoes detected at each receiver element are amplified, sampled, processed and digitized by the echo processor (19) and then stored in time history memory (12). They may also be stored in an external memory such as a disk drive for later use. These echo samples are projections over ellipsoids of revolution of the imaged objects as is shown in FIGS. 17,18,19.

A pulse is generated by the transmitter the Pulse Generating Means. It propagates though the object field as an expanding spherical surface of radius RTP (FIG. 17—303,306). As the surface encounters reflecting points in objects (FIG. 17—300,301), wavelets of radius RPE (FIG. 17—304,305) are generated which propagate back toward the receiver elements (FIG. 17—308, FIG. 18—312,314, FIG. 19—317,318,319,320). These are echoes which are detected by the receiver elements and compled then recorded in the time history memories (FIG. 1—12). The elapsed time from pulse transmission to an echo sample defines the round trip distance, RTP+RPE, from transmitter to reflecting point and back to the receiver element (FIG. 17—303,304). There are numerous points which can contribute to a particular echo sample. These points, specifically, are all of the points which lie on an ellipsoid of revolution with the foci being the transmitter and the particular receiver element (FIG. 17—302). The eccentricity is determined by the round trip distance which is also equal to the major axis. Therefore each echo sample from each receiver element represents a projection of the object field over an ellipsoid of revolution (FIG. 17—302, FIG. 18—309,310, FIG. 19—322).

System timing and control (23) synchronizes, controls and coordinates the various elements of the imaging apparatus. The perspective processor (3) is responsive to the operator controls (2) which determine the direction or perspective from which the final image will be viewed. The perspective processor also allows the operator to determine the thickness of the three dimensional volume which will be viewed on the final two dimensional display (14). This is done by removing front portions and rear portions of the image in a direction orthogonal to the viewing screen (14). The thickness of the portions to be removed are determined by the z start and z end operator controls (2). By using these controls the image may be reduced to a tomogram located at any position orthogonal to the viewing screen. The three dimensional viewing direction is also an operator control (2) and allows the imaged volume to be viewed from the front, back, top, bottom, right side, or left side. This, in conjunction with the z start and z end controls, allow viewing of the imaged volume from six different directions and also allow viewing volumetric images of various thicknesses, positions and orientations in addition to tomographic images of various positions and orientations. The perspective processor (3) sequences the three dimensional reconstruction points (4) that are fed to the recon processor (5). It does this in such a manner that fixed sequences of reconstructed points (7) may be summed by the integrator (10) and the results stored in the accumulator (12) to form one pixel at a time of the final two dimensional view through the three dimensional volume.

The look up table (8) provides a means for shading the two dimensional view through the three dimensional volume so that a front to back gray scale perspective is formed. The look up table can also be used for other image processing functions by programming its contents with other values. The look up table mapped, reconstructed points (9) are fed to the integrator (10). The adder (11) sums these points with the data in the accumulator (12) and replaces the data in the accumulator with the results. This process constitutes a weighted integration of the reconstructed three dimensional volume in a direction orthogonal to the screen of the final two dimensional display (14). The integrated three dimensional data sequences each form one pixel in the two dimensional image memory (13). The data in this memory is converted to a composite video signal by the display controller (15) and is used to drive the cathode ray tube circuits (14).

DETAILED DESCRIPTION OF THE PREFERRED EMBODIMENT

Figure 3:
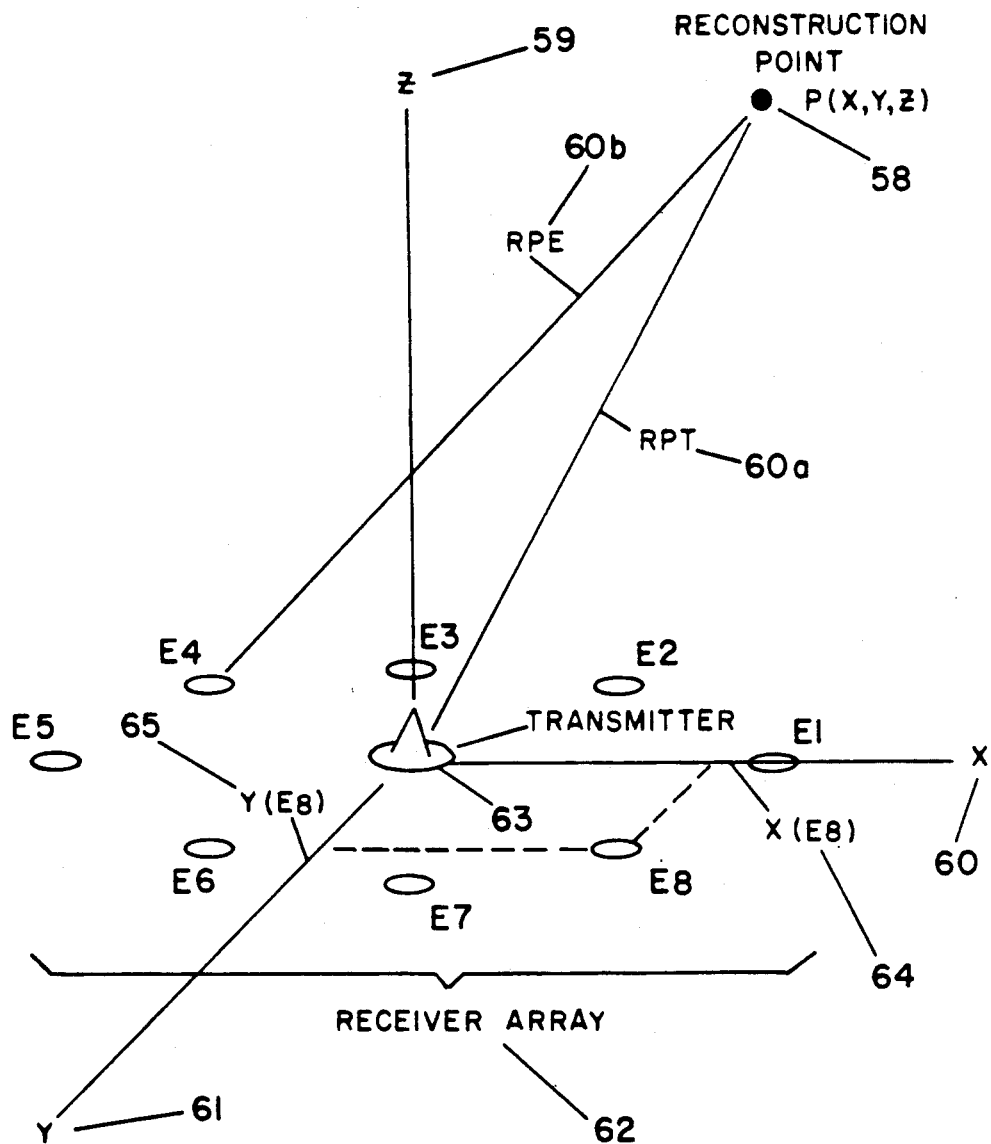
FIG. 3 shows the reconstruction geometry including transmitter and receiver and also the particular point to be reconstructed.

FIG. 3 is a drawing of the reconstruction geometry. The receiver array is in the x y plane and consists of a sparse array of receiver elements (62) evenly spaced on the circumference of a circle. Thus in this embodiment the receiver, also termed Receiver Array Means, is an axicon constructed with a sparse array. The transmitter (63), which is a part of the Pulse Generating Means, is located at the origin of the x y z coordinate system and transmits a pulse in the z direction. An example reconstruction point is shown at (58). RPE (60b) represents the distance that an echo must travel from the reconstruction point (58) to receiver element E4. RPT (60a) represents the distance that an acoustic pulse must travel from the transmitter (63) to the reconstruction point (58). The sum of RPE and RPT defines the major axis of an ellipse of revolution, FIG. 17—302.

Figure 6:
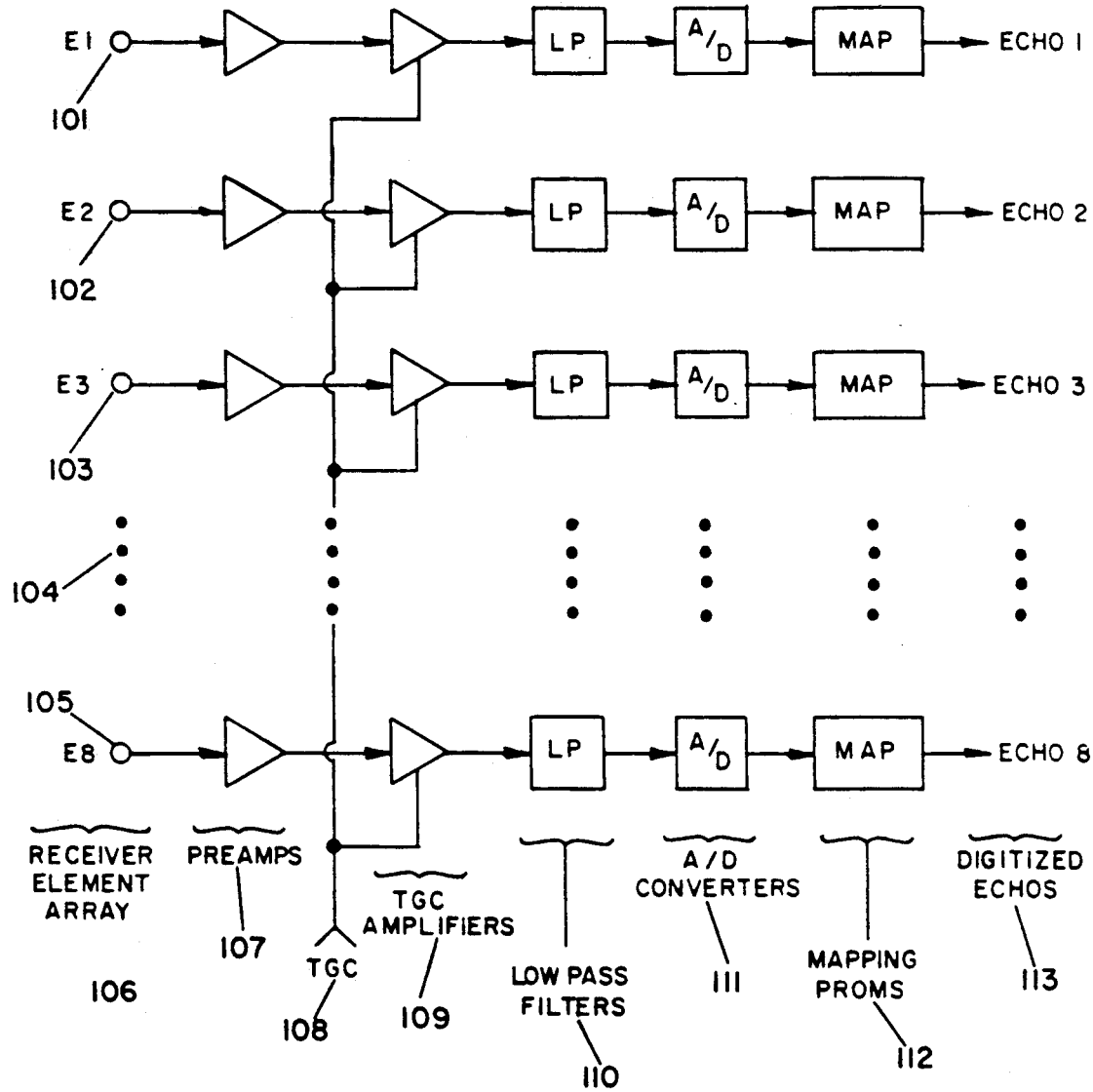
FIG. 6 shows the echo processor which first receives the echo data from the receiver elements.

FIG. 6 shows the echo processor, comprising a Sampling Means, which receives and samples echo data from the receiver arrays elements (106). The preamplifiers (107) increase the magnitude of the echoes to reduce the effects of noise further along in the system. The time gain compensation amplifiers (109) provide a time varying gain to compensate for attenuation in the imaged medium which is a function of the echoes time of flight and also, spherical spreading loss. The tgc input (108) consists of an adjustable ramp, or function with adjustable shape, which increases the gain for echoes coming from reflectors further away from the receiver array. The low pass filters (110) will prevent aliasing and reduce noise. The analog to digital converters, the Sampling Means, (111) convert the echoes to digital echo samples. The mapping proms (112) can be used for various types of dynamic range compression or expansion while the data is in sampled wavefield form. The output signals are the digitized echo samples (113). Each sample represents a projection of the object field over an ellipsoid of revolution, refer to FIGS. 17,18,19.

FIG. 1 (19) shows the time history memory which receives the processed and digitized echo data from the echo processor; these are the echo samples associated with each receiver element. This memory consists of two alternating memories, one being read into while the other is being read out of. The data in the memory is a sampled and processed, but geometrically distorted, replica of the time history of the wavefield incident on the surface of the receiver array.

Figure two is a block diagram of the perspective processor. The perspective processor controls the direction from which the three dimensional imaged volume is viewed. It also controls the thickness of the tomographic images and their location within the imaged volume and, in addition, the thickness of the tomogram. The count sequence control (33) accepts input from the operator controls (24) and configures the counter control lines (34a), (35), (34b), (35b), (34c), (35c) to the address sequence counters (37), (38), (39). It does this such that the correct sequence of reconstruction point address (43), (44), (45) are fed to the recon processor. The counter control lines configure the counters in count up or count down mode, preset them to the correct value, and determine the interconnection of the carry in and carry out signals. The thickness control (58) accepts z start (31) and z end (32) operator controls and monitors the counter values (46), (47), (48) by loading comparison values (55), (56), (57) into the comparators (49), (50), (51). If the counter values are outside the range as determined by the z start (31) and z end (32) controls it activates the data null signal (59) which causes data values of zero to be fed into the integrator FIG. 1, (59), (10).

Figure 4:
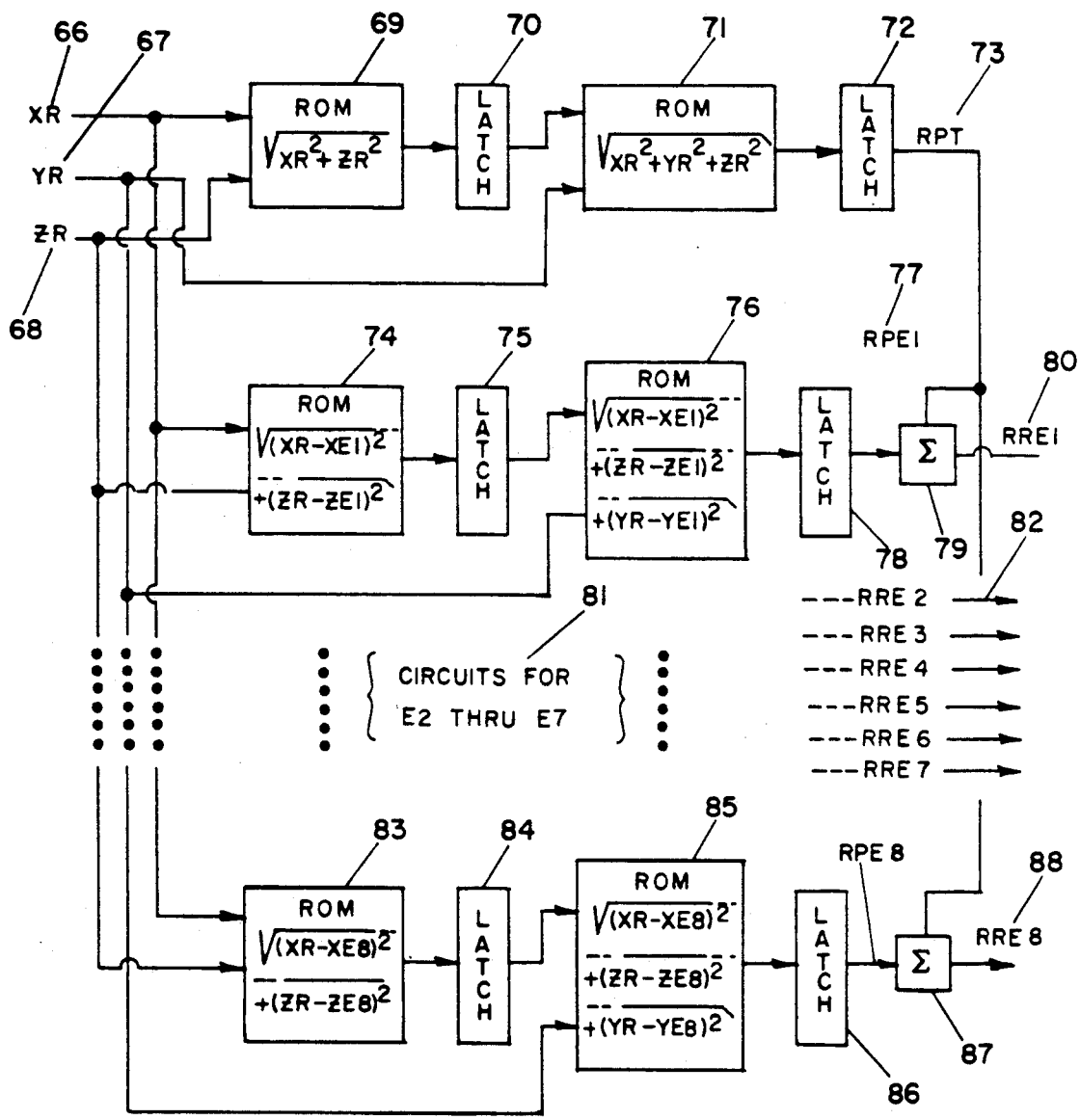
FIG. 4 shows the reconstruction address generator which takes the reconstruction point coordinates as an input and computes the appropriate time history addresses as outputs.
Figure 5:
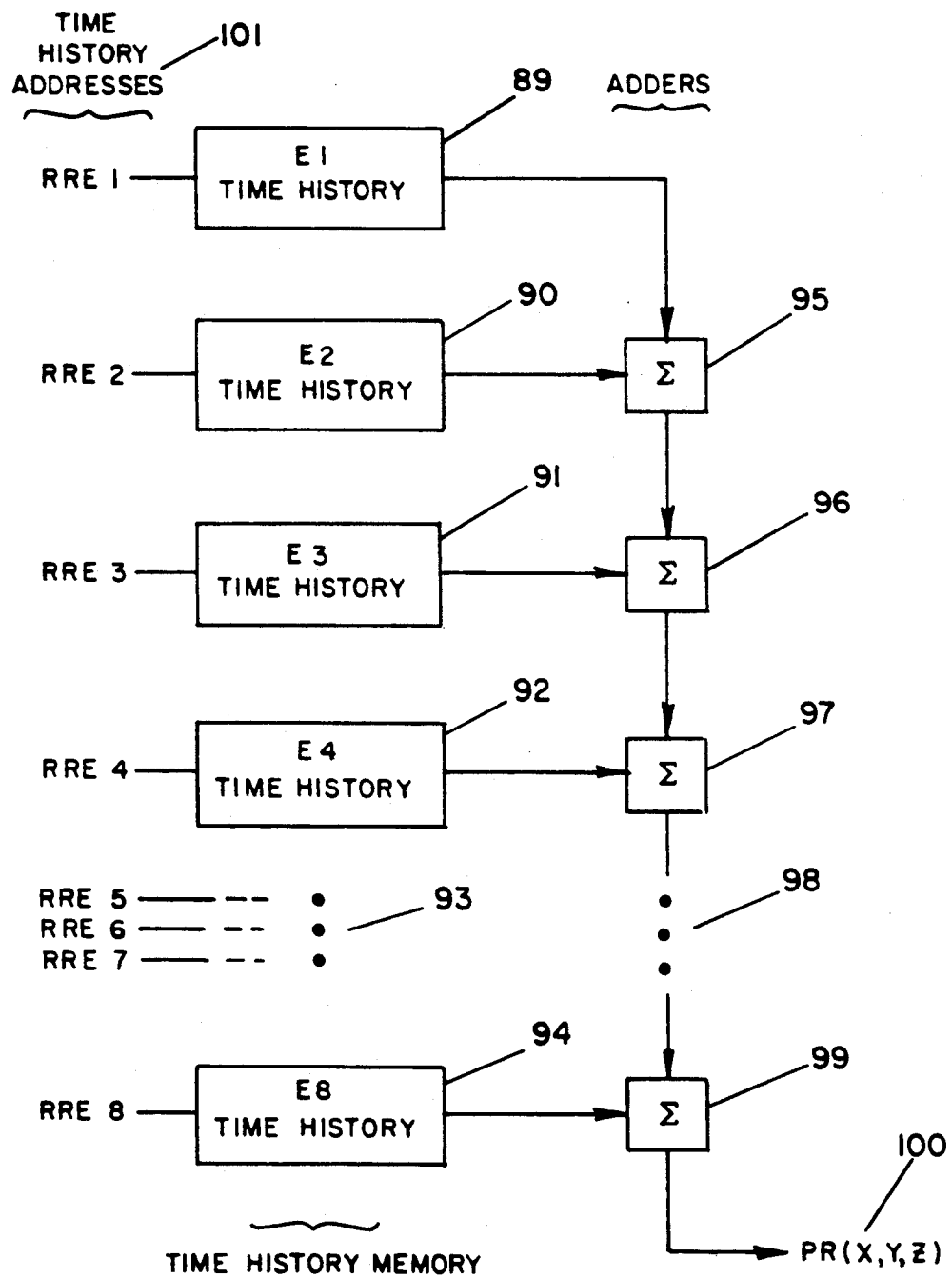
FIG. 5 shows the reconstruction summer which sums the appropriate time history data together to reconstruct an object field point.

The recon processor FIG. 1 (5) comprises a Selecting and Combining Means which in turn comprises the recon address generator (Recon Address Generator Means), FIG. 4, and the recon summer (Recon Summer Means), FIG. 5.

FIG. 4 is a block diagram of the reconstruction address generator, the Recon address Generator Means. The reconstruction address generator sends a stream of addresses to the reconstruction summer, the Combining Means, (FIG. 5) which controls the way in which the time history memory data (FIG.1-12) is summed to reconstruct image points. The reconstruction algorithm is implemented in hardware by programmable logic and is a parallel pipelined structure. For each point to be reconstructed in the three dimensional volume (xr, yr, zr) (66, 67, 68) the recon address generator computes the appropriate addresses for the recon summer (FIG. 5). Given the reconstruction point coordinates and the time of flight, or equivalently (within a constant factor, the total travel distance), the distance from the transducer to the point rpt (73) is computed by the two programmed roms (69, 71). To minimize rom size the first rom computes the distance to xr, zr and the second rom takes this distance and the zr coordinate and computes the final distance rpt. The rest of the rom circuitry is used to compute the distances from the reconstruction point to each of the receiver elements. Their are eight sets of roms similar to the two roms (74, 76). Each set is programmed to compute the distance for one of the eight receiver elements e1 through e8 (FIG. 3). The first rom of each rom pair computes the distance projected in the x z plane and the second rom takes this distance along with the y coordinate of the reconstruction point and computes the final distance rpe (77). The summers (79, 87) sum two the distances together to form the total distance from transmitter to reconstruction point to receiver element for each receiver element in the receiver array. This combined distance defines the major axis of an ellipse of revolution upon which lie the points responsible for echoes which make up a single echo sample. Then, each sample at each receiver element has a total travel time, or total time of flight and total travel distance associated (FIG. 17—303,304,305,306) with it which defines the eccentricity of the ellipse (FIG. 17—302, FIG. 18—309,310, FIG. 19—322). The coordinates of the particular receiver element and the coordinates of the transmitter define the locations of the two foci (FIG. 17—307,308, FIG. 18—312,313,314, FIG. 19—317,318,319,320,321). Thus each echo sample from each receiver element has a unique ellipse of revolution associated with it. The sample represents the surface integral of the object field over this ellipse.

The speed of sound is used as a scale factor in producing the output addresses (80, 82, 88) which are sent to the reconstruction summer (FIG. 5). The round trip distance divided by propagation velocity divided by the sample interval gives the sample location in the time history memory which is used by the Selecting And Combining Means for echo sample selection. The separate rom pairs for each element form the parallel architecture whereas the latches (70, 72, 75, 77, 84, 86) form a pipelined architecture in that the reconstruction speed is governed by the single slowest element in the circuit rather than by a sum of circuit element delays.

FIG. 5 shows the reconstruction summer (recon summer), the Combining Means, which adds the appropriate time history data together to reconstruct each image point. The time history addresses (101) are generated by the reconstruction address generator (Recon Address Generator) (FIG. 4) and causes the appropriate data to be accessed in each elements time history memory (89, 90, 91, 92, 93, 94). This data is summed by the adders (95, 96, 97, 98, 99) in the recon summer (FIG. 5) to form the reconstructed point pr(x,y,z) (100).

This reconstruction summation process constitutes the backprojection of time history samples over ellipsoids of revolution (FIGS. 18, 19) in the same manner that the time history samples represented projections of the object field over ellipsoids of revolution. It is the inverse of the original sampling process. The eccentricity of the back projected ellipsoids is determined by the distance from transmitter to reconstruction point and back to the particular receiver element from which the time history was generated (FIG. 17—303,305). The foci of the ellipsoids are the locations of the transmitter and the particular receivers (FIG. 19—317,318,319,320,321). The reconstructed point and its sidelobe structure is the summation of backprojected ellipsoids from each of the receiver elements, refer to FIG. 19.

The previously described image reconstruction method, for purposes of this patent application, is termed "ellipsoidal backprojection". Referring to FIG. 43, it can be seen that if the transmitter (524, 525, 528) do not coincide, the projections (521, 522, 523) are ellipsoids (521, 522). If they do coincide (528) the projection is over a sphere (523) which is a special case of the ellipsoid. The term "ellipsoidal backprojection" will be confined to the case where at least some of the projections are over non spherical ellipsoids (521, 522).

The image of a single point gives the system point spread function. The point spread function for this imaging system varies with reconstruction point location. The system is not isoplanatic. However, if the method of combining echo samples, the Combining Means of the Selecting And Combining Means, is addition, the system is linear. Then the resultant image is the convolution of the spatially varying point spread function with a perfect image of the objects in the imaged 3 D volume.

FIG. 1 which is a system block diagram shows the integrator (10), the image memory (13), the crt display (14), and the display controller (15). These components function together to provide a display of the three dimensional imaged volume or selected tomographic images. The integrator receives reconstructed image points (of reflecting points) from the reconstruction processor (5) in a sequence consisting of subsequences such that the summation of each subsequence forms one pixel for the two dimensional display. Each pixel then represents a view along a line through a three dimensional volume. The integrator forms these subsequence summations by using results fed back from the accumulator (12). The resulting pixels are placed in the appropriate locations in the image memory (13). The image memory consists of two alternating memories, one in read mode and one in write mode. The display controller (15) forms a composite video signal using the data in image memory and the video synchronization signals. This video signal is fed to the cathode ray tube (14).

DESCRIPTION OF THE SECOND EMBODIMENT

Lidar

Refer to FIG. 21

This imaging system uses a circular very sparse array of light detector elements, the receiver array means (335, 336, 337) with a light emitter (338) located near the center, the pulse generating means. The emitter generates a very short pulse of light (333) which propagates outward through a wide solid angle (334). Objects in the path of the propagating pulse reflect light back toward the detector array. Each element in the detector array consists of a light collector and a light detector. The collector redirects the incident light on to the detector. The detector converts the light to an electric signal which is recorded as a function of time in the elements time history memory. The image reconstruction is performed as described in the preferred embodiment.

DESCRIPTION OF THE THIRD EMBODIMENT

Underwater sonar

Refer to FIG. 23

This system uses a vertical sparse array of sonobouys (340,341,342) as a receiver array, the receiver array means. The buoys are anchored (344) in place. The transmitter, the pulse generating means, is an acoustic projector (343) located near the center of the array. The transmitter generates a short monopolar pulse which propagates outward through a wide solid angle. Objects in its path cause echoes which propagate back toward the receiver array which convert them to electric signals (339) which are transmitted back to a remotely located image reconstruction system. There they are recorded in the individual elements time history memories. Image reconstruction follows the description in the preferred embodiment with modifications for a different propagation velocity and different geometry.

DESCRIPTION OF THE FOURTH EMBODIMENT

Particle Imaging

Refer to FIG. 24

This embodiment uses a short pulse of particles, the pulse generating means, (346) to reconstruct a three dimensional image. The receiver array is an approximately circular, very sparse array of particle detectors, the receiver array means (348). The transmitter is a particle emitter (349) located inside or outside of the receiver array. The transmitter generates very short burst of particles (346) which propagate out through a wide solid angle (347) with uniform velocity. Elastic collisions with objects in the path of the propagating pulse cause particles to be reflected back toward the receiver array. The particle detectors in the receiver array generate electric signals proportional to the number of incident particles. These signals are recorded as a function of time in the individual elements time history memories. Image reconstruction takes place as described in the preferred embodiment.

DESCRIPTION OF THE FIFTH EMBODIMENT

Radar

Refer to FIG. 22

This imaging system uses echoes caused by the transmission of a single radar pulse, the pulse generating means, (333) to reconstruct a three dimensional image. The receiver is an approximately circular, very sparse array of radar antennas, the receiver array means, (335,336,337). An electromagnetic transmitter (338) is located inside or outside of the array. The transmitter generates a monopolar or multicycle pulse (333) which propagates out through a wide solid angle (334). Objects in its path cause echoes which propagate back toward the receiver array. The echoes are detected at the individual elements and rectified and filtered if a multicycle pulse was used. They are converted to electric signals which are recorded in each individual element's time history memory. Image reconstruction occurs as described in the preferred embodiment.

ELIMINATION OF THE TIME HISTORY MEMORIES

Refer to FIG. 7

Here the object is to sum echo samples immediately, as they are sampled, into the appropriate reconstruction points, the selecting and combining means. This constitutes the immediate backprojection of the echo samples over ellipsoids in the 3 D image memory. If this is done, no time history memory is required.

Since the image reconstruction comprises backprojection of the echo samples over ellipsoids, the reconstructed image is the superposition of ellipsoids, one for each echo sample collected. As the echo samples are taken, they may immediately be summed into the appropriate voxels in the 3 D image memory, the selecting and combining means. Each echo sample will be summed into every voxel intersected by the ellipsoid associated the sample. This requires circuitry (and/or a ROM look up table) which uses the equation of the ellipsoid (for example see "Calculus with Analytic Geometry" Johnson and Kiokemeister) to compute the appropriate voxel addresses. Each echo sample (114) is summed by the adder (115) into the appropriate voxel (117) in the 3 D memory (116), the selecting and combining means. In the illustrated implementation there is a separate 3 D memory for each receiver/transmitter combination (Ei,Tj). This provides maximum reconstruction rates, but may require too much electronics if there are many receiver/transmitter elements. A single common memory may be used if it is multiplexed or time shared by echo samples from different receiver elements.

The look up table (120) controls the voxel addresses (118,119) for the 3 D memory. Since there are several voxels into which a given echo sample will be summed, the point number input (143,138) selects among the several voxels allowing the sample to be summed into each of them in sequence. The contents of the lookup table is determined by the equation (140) which gives the points on an ellipsoid given the sample number (121,137) and the transmitter/receiver elements coordinates.

The individual 3 D memories (122,123,124,125) voxels (126,127,128,129) are summed by adders (130,131,132,133,134) into the final 3 D memory (136).

ELIMINATION OF THE 3 D MEMORY

Refer to FIGS. 8 and 9

This design option will sum the echo samples, the selecting and combining means, (144,184), either from time history memories or directly as the echoes are sampled, into the appropriate pixel locations in the tomogram image in the tomogram memory (147) and the shadowgraph image in the shadowgraph memory (186). This eliminates the requirement for a 3 D memory.

Alternately, the reconstruction points may be reconstructed in a register and then directly transferred to the appropriate locations in the tomogram memory and summed into the appropriate locations in the shadowgraph memory.

If echo samples are summed into the tomogram memory an additional adder (350) is required.

The figures show the direct writing of reconstructed points into the memories. In synchronism with the reconstructed points are the reconstructed points' coordinates (145,191). The coordinates are input to the tomogram processor (149) and the shadowgraph processor (190). The tomogram processor has as additional inputs, the tomogram position (150) and the tomogram orientation (151). The shadowgraph processor has as additional inputs, the viewing orientation (192) and the viewing position (193). Both processors generate write pulses (146,188) and memory addresses (148,189).

The tomogram processor contains lookup tables derived from the equation of a plane (351). The tomogram orientation inputs (171) provide the coefficients, alpha, beta and gamma (172,173,174), for the equation. These are multiplied (175,176,179) by the reconstructed point coordinates (180,181,182) and summed by adders (177,178) to form the left side of the equation (170). The tomogram position (169) provides the constant factor (167) after being scaled by a lookup table (168). The opposite sides of the equation are tested for equality by the comparator (166). Equality is anded (164) with a write clock (163) to generate the write pulse (165).

The tomogram processor also generates memory addresses (148,152,153). The reconstruction point coordinates (161,158,159,160), tomogram position and tomogram orientation (156,157,162) are inputs to prom based algorithm processors (154,155) which generate the addresses (152,153).

The shadowgraph processor (190) takes the reconstruction point coordinates (200), the starting viewing position (203) and the viewing orientation angles (204,205,206), associated with the x,y,z base coordinates, and formulates the equations (194) of straight lines which represent the line integrals which will become pixels in the shadowgram. The raster generator (214) generates a sequence of pixel addresses (212,213) representing the pixels in the shadowgram. These are used in conjuction with the shadowgram position (203) by the vector tail generator (202) to generate the vector tail addresses (201). The vector tail addresses are subtracted (199) from the reconstruction point coordinates (200). The result (198) is one input to a three stage comparator (197) which will generate a memory write pulse (195). The vector incrementor (211) increments a parameter (210) which is multiplied (207,208,209) by the shadowgraph orientation angles (204,205,206). The results are the other input (196) to the three stage comparator.

ELIMINATION OF BOTH 3 D AND TIME HISTORY MEMORIES

Refer to FIG. 11

This design variation will sum echo samples directly into the tomogram and shadowgraph pixels without using echo time history memories or a 3 D memory, the selecting and combining means.

An additional equation, related to the perspective viewing direction, may be combined with the equation of FIG. 7, yielding a resultant equation which can be used to construct all of the 2 D pixel addresses that a given echo sample should be summed into. As before, as the echo samples are taken, they may immediately be combined into the 2 D image without an intermediate time history memory or three dimensional memory.

The technique is the combination of the foregoing techniques to eliminate each of the two memories separately. The echo samples (232) from each of the n elements (230,231) are transferred directly (233) to the tomogram summer (352) and the shadowgraph summer (238). The tomogram processor (236) controls the tomogram memory write pulses and addresses (235). The shadowgraph processor (237) controls the shadowgraph read/write pulses and addresses (242). The summer (238) combines the echo samples (233) with memory locations (240) to reconstruct pixels and perform the integration (241).

OBJECT ORIENTED DISPLAY

Refer to FIG. 10

This display technique allows the tomogram, the shadowgraph and the graphics display to be maintained as separate objects to be combined into the rs170 video signal. This eliminates the need for a separate complete display memory and allows the display objects to be repositioned (229) or modified separately by the user.

The three separate image objects (215,216,217) addresses and read pulses (224,225,226) are controlled by the rs170 processor (227) which also controls (223) the multiplexer (221). The processor, as the rs170 pixel scan progresses, combines pixels (222) into the rs170 video signal, as appropriate, from either the tomogram (218), shadowgraph (219) or graphics (220) memories.

SIGNAL TO NOISE IMPROVEMENT WITH ECHO TIME HISTORY INTEGRATION AND REDUNDANT TRANSMITTED PULSES

Refer to FIG. 13

Integrating an image over several frames is a technique commonly used to increase the image signal to noise ratio. If the noise is uncorrelated from one frame to the next, the signal to noise ratio is increased by the square root of the number of integrations. For each frame integration this involves summing each new pixel with each old pixel. For a three dimensional image this would be time consuming because of the large number of pixels.

This invention uses a reconstruction technique and system architecture that allows the same type of signal to noise improvement without having to sum individual pixels. Consecutive frames may be integrated by summing in the time history memories instead of the image memory and the effects will be similar. There is much less data stored in the time history memories before image reconstruction which greatly reduces the number of additions required for a full frame integration. This saves hardware and processing time.

Referring to FIG. 13, the time history memories (251,252) contain the echo time history from the last transmitted pulse. As new echoes (247,248) are received from a new transmitted pulse, the echo samples are added (249,250) to their counterparts from the last transmitted pulse. This can be continued indefinitely if the addition results are shifted right as the addition results fill up the capacity of the individual time history memory locations.

SIGNAL TO NOISE IMPROVEMENT WITH IMAGE INTEGRATION AND REDUNDANT TRANSMITTED PULSES (AND "REDUCED PULSE THREE DIMENSIONAL IMAGING")

Refer to FIG. 14

As before, since in some imaging applications there is time for more than one transmitted pulse per image frame, multiple pulses may be transmitted and the resulting echoes combined into the same image to provide increased signal to noise ratios. Rather than "single pulse three dimensional imaging" this will be termed "reduced pulse three dimensional imaging" since the image will be formed after the transmission of a smaller number of pulses than would be required in conventional imaging systems. This same terminology applies when ever multiple redundant pulses are used as in the previous descriptions of signal to noise improvement techniques.

The echoes from each pulse may be used for a complete image reconstruction. The reconstructed pixels or voxels may then be summed into the previously reconstructed image. The process may be repeated for several transmitted pulses.

The reconstructed image points (255) are sent to summers (256,257) for the tomogram memory (258) and the shadowgraph memory (259). The summers perform the integration of image points resulting from several transmitted pulses.

SIDELOBE REDUCTION WITH MULTIPLE OFFSET TRANSMITTERS

Refer to FIG. 12

Sidelobes are created in the point response of the imaging system when back projected ellipses coincide at locations other than the actual location of the reconstruction point, refer to FIGS. 17—302 and 18—309. Integration of consecutive frames does not reduce the sidelobe level if the same elements are used for transmission and reception each time. However, if the transmission originates from a different location, because of offset transmitters, in each consecutive transmitted pulse, then, for a particular receiver element and particular reconstruction point, the back projected ellipses will coincide only at the location of the reconstruction point. Then, when integration over consecutive frames is done, the sidelobe levels will be reduced. The amount of the sidelobe reduction is proportional to the number of frame integrations with transmissions originating from offset transmitters and is therefore proportional to the number of offset transmitters.

The receiver elements (244) may be used as the multiple transmitters (243) or a separate transmitter array (245) may be used with the receiver array (246).

RECEIVER ELEMENTS USED AS TRANSMITTERS

Refer to FIG. 12

The previously described embodiments show transmitters that are separate from the receiver elements. However, if the receiver elements can also be used as transmitters, a complete transmit receive array could be formed by a circular array of elements (244). Each element in the array (243) could be used, one at a time, consecutively for pulse transmission. If consecutive frame integration was implemented, sidelobe reduction and signal to noise improvement would be achieved without an increase in the number of array elements.

WEIGHTED BACKPROJECTIONS TO COMPENSATE FOR ELEMENT RADIATION PATTERNS AND OTHER PHENOMENA

Refer to FIGS. 7, 17, 18, 19

Backprojections may be weighted (400) as a function of the sample number (total round trip time of flight, RTP+RPE) (402) or as a function of the reconstruction points coordinates (401) or both.

The transmitter and receiver elements have radiation patterns which may be partially compensated for by weighting the backprojections as a function of the reconstruction points coordinates. Finite area transmitter/receiver elements cause an actual backprojection pattern that is wider in the off axis direction (353,354). The echo sample represented by the backprojected ellipsoid can then be weighted as a function of the off axis angle (356) as it is summed into the various reconstruction points.

The ellipsoidal backprojections differ in length or area (309,310) depending on the sample number and the position of the foci (312,313,314). The echo samples can be weighted to take into account the total surface area of the backprojected ellipsoid.

RECORDING THE ECHO HISTORIES IN RECORDING DEVICES

Refer to FIG. 15

A recording device (264) may be added which, when connected (263), can record a sequence of echoes from the time history memories (265) of each of the receiver elements (261,262). The recorded echoes may later be played back into the time history memories for reconstruction of the image (266) by the rest of the imaging machine.

AXICON ARRAY WITH REDUCED SIDELOBE LEVELS

Refer to FIG. 20

If more elements are added to a sparse circular array (324), the array will become a phased annulus or axicon with receiver elements closely spaced around a circle. This type of aperture does not have grating lobe problems, but has very high sidelobe levels when used with oscillating transmitted pulses. If non oscillating noninterfering or low interference pulses are used the sidelobe levels are reduced. If, in addition, multiple transmitters (325) and multiple redundant pulses are used, the sidelobes are further reduced, and interfering type pulses may yield adequate images.

OSCILLATION COMPENSATION

Refer to FIG. 16

A non oscillating transmitted pulse may be hard to achieve in certain types of imaging systems. Also, if a non oscillating pulse is transmitted (267), propagation effects (268) may cause oscillations to build up (269). This may be compensated for by detecting or rectifying (271) the echo (270) and then filtering it (272) to generate corrected pulses (273) which are then used for image reconstruction.

Alternately, a time varying filter (for example, a time varying matched filter) may be used where the filter coefficients are made a function of the sample number or time of flight to account for differing propagation effects depending on the round trip time of flight of the echo. The echoes (275) are digitized (274) and fed into a sequence of latches (276,277,278,279,280). The latch outputs (291,289,287,285,283,281) are multiplied (292,290,288,286,284) by the filter coefficients which are stored in a PROM (293). The prom address (294) is sequenced as a function of time of flight. The multiplication results are summed (295,296,297,298,299) and the result is a corrected pulse which is then used for image reconstruction.

BACKGROUND LEVEL REDUCTION

Refer to FIG. 19

A shadowgram is created by integrating along viewing vectors (316) through a reconstructed three dimensional volume. When this is done the sidelobe levels (322) are summed which obscures the resulting shadowgram. The sidelobe levels create a relatively constant ambient level in the reconstructed three dimensional image. If this level is subtracted out before the shadowgram is created, the sidelobes will not be integrated into the resulting image.

TIME HISTORY FILTERING

Refer to FIG. 25

Filtering the echo samples stored in the time history memories, before backprojection, can have beneficial effects on the reconstructed image.

In general the filters can reduce image clutter artifact, reduce peak sidelobe levels, reduce average sidelobe levels and increase resolution (sharpen the point spread function).

FIG. 25 shows as an example a four stage nonrecursive filter. Recursive filters may also be implemented. FIG. 25—357,358 represent the input signals from the receiver elements. These signals are processed through preamps (359) and time of flight gain compensation amplifiers (360) which are controlled by a signal (361) which increases the gain as a function of time to balance out time varying attenuation. The low pass filter (362) restricts the noise bandwidth and prevents aliasing. The analog to digital converter (364) digitizes the signal in synchronism with the sample clock (363). Four latch stages (365,366,367,368) of the digital filter hold successive echo samples. Each of the samples is multiplied by a weight, w1, w2, w3, w4. The weighted samples are then summed (369) together to form the filtered sample (370).

The value of the weights, w1, w2, w3, w4 determine the type of filter applied and can be under machine control and also varied dynamically, for example, as a function of reconstruction point position, as a function of round trip time of flight or they may may also be adjusted manually by the operator.

Examples of filters that can have beneficial effect are: a two stage backdifferencing filter, a three stage approximation to the sinc function, a matched filter for slightly oscillating transmit pulses, a time varying filter to compensate for transmission effects.

ECHO SAMPLE INTEGRATION/BLIP IMAGING

Refer to FIG. 26

If the echo is integrated during the sample interval, the effect is to thicken the backprojected ellipsoids by the integration duration. This allows blip images to be formed where the effective resolution is greater than the size of the imaged objects.

For example, if the integration interval corresponds to one mile, then the reconstructed image would consist of adjacent, somewhat distorted, one mile cubes. If there were no objects in a cube it would be clear. If a cube contained objects it would be grey. The level of greyness would correspond to the total number of enclosed objects and their reflectivity. That particular cube could then be reconstructed at a higher resolution to create an image of the objects contained within.

FIG. 26—371,372 are echo signals from the receiver elements which are processed by the preamps (373), TGC amps (375) and low pass filter (376). The integrator (377), which may consist of an op amp with capacitor feedback, is gated, for example by a FET across the capacitor, by an integration width signal (378). The trailing edge of the integration width signal clocks the analog to digital converter (379). The result is the integrated echo sample (380) which now represents an ellipsoidal projection through the object space where the width of the ellopsoid is controlled by the integration width signal.

DIFFERENT TRANSMIT AND ECHO VELOCITIES

Refer to FIGS. 27 and 29

The transmitted pulse of energy may be a short burst of ionizing particles (382,384). In this case the echoes from an object (383) will consist of gamma rays (387) rather than reflected particles. The gamma rays will travel with a different velocity (386) as compared to the transmitted particles (385). The gamma rays are received as echoes by an array of detectors (381).

This is easily taken into account by the reconstruction processor when selecting echo samples to combine from the time history memories.

The reconstruction processor will scale (390) the distances from the receiver elements to the reconstruction point (388) with the echo propagation velocity (392). It will scale (391) the distances from the transmitter elements to the reconstruction point (389) with the transmit pulse propagation velocity (393). It may do this with multipliers (390,391). The resulting scaled signals (394,395,396,397) are paired off (as previously described) and summed (398) to form the addresses to the time history memories (399).

The resulting backprojected ellipsoids are distorted, shaped like eggs, but still as effectively reconstruct an image.

RECON ADDRESS GENERATION FOR MULTIPLE TRANSMITTERS

Refer to FIG. 28

FIG. 28—388 are the reconstruction point coordinates whereas the following ROMs and latches are used to find the distances, RPTj, from the reconstruction point to the different transmitters. These distances are combined with the distances from the reconstruction point to the receiver elements RPEj. When that total round trip distance is divided by the velocity of propagation and then divided by the echo sample interval, the time history memory addresses are formed for the proper selection of echo samples to be combined to create a reconstructed image point.

The first set of ROMs (389,390,395) find the distances as projected in the XY plane. The second set of ROMs (393,394) take that intermediate distance along with the Z coordinate and find the final distance RPTj (391,392).

ARBITRARY THREE DIMENSIONAL ARRAY

Refer to FIG. 30

A three dimensional array may be used which is composed of a number of transmitters and receivers arranged in arbitrary positions in three dimensional space. Each transmitter/receiver pair will contribute a family of ellipsoidal projections through the imaged three dimensional volume. These projections are backprojected to reconstruct the image.

In FIG. 30 an arbitrary three dimensional array is shown where 400,401,402,403 and 404 are receiver elements and 405 and 406 are transmitter elements.

NON INTERFERING AND LOW INTERFERENCE PULSES

Refer to FIGS. 31,36 and 37

"Non interfering" and "low interference" pulses have very useful characteristics for ellipsoidal backprojection imaging. they exhibit no or little destructive interference effects and, therefore, have reduced grating lobes and cause minimal specular reflection.

Examples of non interfering pulses are monopolar or unipolar (a synonym) pulses as described in U.S. Pat. Nos. 4,706,499 and 4,688,430. This type of pulse comprises; gaussian pulses, square pulses, triangular pulses and impulsive type transmissions. FIG. 36—446 shows a monopolar (or unipolar) gaussian pulse. FIG. 36—447 shows a monopolar square wave. FIG. 36—448 shows a monopolar triangle pulse. FIG. 36—449 shows an approximation to an impulse.

Low interference type pulses include noise like transmissions, single cycle pulses (as described in U.S. Pat. Nos. 4,706,499 and 4,688,430), and short pseudo random time sequences with low interference properties. Referring to FIG. 31, a wideband random pulse may be generated by the transmitter for single pulse imaging purposes. The resulting echoes can be processed in the same manner as those resulting from a monopolar pulse transmission. This sort of pulse may be easier to generate in some applications although it has some disadvantages. Since it will typically contain periodic spectral components some interference phenomena will occur causing a degree of specular reflection. If the specular reflection phenomena is not too severe, adequate images will result. Also since there are components with alternating polarity some beamforming will occur upon transmission. However, depending on the nature of the pulse, the beam may be smeared, without sharp, strongly formed lobes, and also broad allowing adequately uniform illumination of a wide solid angle. A pulse possessing these qualities of weak beamforming and weak specular reflection will be considered "low interference" or relatively non interfering for purposes of this application and will be considered capable of radiating or propagating uniformly through a wide solid angle in this application. The low interference pulse type classification includes all non interfering pulse types in addition to the foregoing described pulse types. FIG. 31—407 shows a random wideband pulse launched from a transmitter (408).

Other types of pulses may also have desirable characteristics for use in Ellipsoidal Backprojection imaging systems and may be considered low interference types. Specifically, these characteristics are: ability to propagate adequately uniformly through a wide solid angle (without large peaks and nulls in intensity, in the illuminated field of objects, so great as to render inadequate images); short temporal duration as required for adequate resolution (although compression techniques may be used to synthesize this); and weak specular reflection formation (as with relatively non interfering pulses).

One criterion that can be used to judge the degree of non interference is the autocorrelation function of the transmitted pulse waveform. Autocorrelation measures, as a function of shift, the integral of the product of a waveform and a shifted replica of the waveform.

A better criteria would be a measure, as a function of shift, of the integral of the sum of a waveform and a time shifted replica of the waveform, the resulting function being termed an auto interference function.

A relatively non interfering pulse, or low interference pulse would have a peak, for shift equal to zero, in both of these measures. The remaining portion of the measures, for non zero values of shift, would be lower in value and without large oscillations in amplitude.

Transmitted pulses satisfying these criteria would generally meet the requirements for: uniform propagation through a wide solid angle; and weak specular reflection formation. These pulse types could be classified low interference. Low interference type pulses are shown in FIG. 37. FIG. 37—450 shows a noise like pulse of short duration. FIG. 37—451 shows a single cycle sinusoidal pulse. FIG. 37—452 shows a single cycle square wave. FIG. 37—453 shows a short train of pulse width modulated pulses. FIG. 37—454 shows a quickly damped sinusoidal pulse. FIG. 37—455 shows a pulse approximating an impulsive doublet. FIG. 37—456 shows a single cycle triangle pulse.

SHORT DURATION INTERFERING PULSES, OSCILLATING TRANSMIT PULSES AND OTHER INTERFERING TYPE PULSES

Refer to FIGS. 33, 34, 35 and 38

Interfering type pulses have pulse shapes which can cause strong destructive interference effects as in beam forming or in specular reflection. Temporally limited interfering pulses can be, additionally, adequately limited in spatial or temporal duration so as to allow usable range resolution and lateral resolution. Range resolution is in the direction of propagation of the transmitted pulse. Lateral resolution is in all other directions. Refering to FIGS. 18, 19, 34, 40, 41, and 42, it can be seen as the transmit pulse is lengthened, both lateral and range resolution will be degraded. Adequately limited pulses, providing acceptable range and lateral resolution, will be termed "short duration interfering pulses" More generally, the term "short duration pulses" will include interfering, low interference and non interfering pulses short enough for adequate range and lateral resolution.

An oscillating transmit pulse, of the short duration interfering type, may be used in ellipsoidal backprojection imaging. The oscillations will cause an amplitude modulation of the backprojected ellipsoids if the transmitter is large enough to cause beam forming effects, however, if only the three dimensional volume spanned by the central area of the ellipsoids is of interest, the modulation will not create a problem. Alternately, if the transmitter is small compared to the wavelength, the main lobe will be very wide and the ellipsoids will not be modulated significantly in the imaged volume.

When an oscillating pulse propagates through a wide solid angle, specular reflection problems may occur. However, if the wavelength is longer than the largest expected specular surfaces, then sufficient echo energy will propagate back toward the receiver array for adequate imaging. Alternately, if the surface irregularities are of the order of the wavelength, the energy will be incoherently scattered, and specular reflection will not be a problem. Also in some imaging systems, specular reflection may be tolerated and interfering type pulses may yield useful imaging information. In any of these systems, the echo samples resulting from an interfering type pulse can be processed, and the image reconstructed, in the same manner as echoes resulting from non interfering type pulses.

FIG. 33—423 shows a transmit / receive array. Four receiver elements (421) surround a single transmitter (422) in this example. An oscillating transmitted pulse (a short duration interfering type pulse) propagates outward through a wide solid angle (426). The three dimensional volume contained within the wide solid angle is illuminated relatively uniformly by the main lobe (424) of the beam pattern formed by the transmitted pulse.

FIG. 34 shows the backprojected ellipsoids that have been modulated by the beam pattern of the transmitted pulse. The transmitter (435) and the receivers (434,436) form the foci of the two backprojected ellipsoids. Portions (430,431) of the ellipsoids lie within the mainlobe area (427) of the transmitted pulse. The reconstruction point (445) is just within the mainlobe area (429). Points further off axis will not be reconstructed properly and will be within the transmit pulse sidelobe region (432,433).

FIG. 35 shows a relatively long wavelength (438) pulse (439) propagating away from a transmitter (441) surrounded by receiver elements (440). It propagates through a wide solid angle (437). A specular reflector (442) is in the path of the transmitted pulse, however, the energy reflected is only weakly focused (443) in a direction away from the receiver array. A reflected sidelobe (444) also is formed. The receiver will detect reflected energy from both the reflected mainlobe (443) and the reflected sidelobe (444) and adequate imaging is possible.

FIG. 38 shows various types of short duration interfering pulses. FIG. 38—457 shows a finite duration sine wave type pulse. FIG. 38—458 shows a short duration square wave. FIG. 38—459 shows a slowly damped sine wave of short duration.

The autointerference function has been described with suggested use as a measure of a pulse's interference properties. FIG. 39 shows the autointerference function for a short duration sine wave. FIG. 39—465 shows the bounds of the integration, which is the original length of the pulse. FIG. 39—463 and 464 show the shift variable. FIG. 39—460 is the origional pulse. FIG. —461 and 462 are shifted replicas of the origional pulse. FIG. 39.—467 shows the resulting autointerference function as a function of the shift variable (466). For a particular value of the shift variable, the replica is shifted by that value. Then, the replica and the origional are added together, point by corresponding point, for each position and its corresponding points in the origional and replica on the horizontal axis. The resulting added points are then summed together over the integration interval yielding a single numerical value associated with the particular value of the shift variable. This is repeated for each value of the shift variable. The resulting numerical sequence, as a function of the shift variable, is the autointerference function. It can be seen that the illustrated autointerference function has many peaks and nulls suggesting relatively strong interference.

FIG. 40 shows backprojection of echo samples resulting from a short duration sine wave (473, 484) which is contained in the bacprojected ellipsoidal shells (468, 472). A minimal geometry is shown to facilitate understanding. Refering to this FIG. 470 shows the single transmitter, 469 and 471 the two receiver elements. 473 and 484 show the shape of the origional transmitted pulse and also the shape of the shell (472 and 468) of the backprojected ellipsoids. 480, 482, 483 are the loci of the maxima in the backprojected echoes. 478 is the reconstruction point. In this simple illustration, only two echo samples are backprojected to reconstruct the point. 474, 475, 476, 477, 478, 479, 485, 486 are the locations where the maxima of the backprojected echoes intersect, and are analogous to grating lobes. With only two backprojected echoes, the grating lobes are equal in amplitude to the reconstruction point. Two maxima contribute to each grating lobe and also to the reconstruction point.

FIG. 41 shows the case where four echo samples are backprojected to reconstruct a point. Refering to this FIG., 485 is the reconstruction point. 486, 487, 488, 489 are the loci of the first maxima of the four backprojected echoes. 490, 491, 492, 493 are the shape of the transmit pulse. 496 is the transmitter. 494, 495, 497, 498 are the receiver elements.

FIG. 42 shows a detail of FIG. 41, the backprojections on the right side of the reconstruction point. Refering to this FIG., 501 is the reconstruction point. 505 is the transmit pulse shape. 516, 513, 511, 506 are the centers of the backprojected echoes. 517, 515, 514, 512, 510, 509, 507, 508 are the loci of the maxima. With more than two backprojected echoes, it can be seen that most often no more than two maxima intersect (504, 502, 503), except at the reconstruction point, where, in this case, all the maxima intersect. These are the grating lobes. There may be some "higher order" grating lobes (500, 499) where more than two maxima intersect, however, with proper receiver element spacing, this can be minimized. So then, even with interfering type pulses, grating lobes can be suppressed.

Then, although interfering type pulses are not the optimum type, they may be used in three dimensional imaging when ellipsoidal backprojection image reconstruction is used.

ELLIPSOID ECCENTRICITY AND ELEMENT SEPARATION

Refer to FIG. 43

The eccentricity of the backprojected ellipsoids (521, 522, 523), for a given reconstruction point distance from the focal axis (518, 519, 520) is a function of the distance between the foci, the transmitter (524, 525, 528) and the receiver (526, 527, 528). If they coincide (528), the ellipsoid becomes a sphere.

IMAGING WITH CLOSELY SPACED, NON SPARE ARRAYS

Refer to FIG. 44

Although sparse arrays may be used in ellipsoidal backprojection imaging, they are not required. Some imaging applications may require small apertures for access or because of space limitations. However, they may also require numerous backprojected ellipsoids so as to achieve low sidelobe levels. this requires that a large number of transmitter and receiver elements be placed in the small aperture resulting in a non sparse or closely spaced array (529). The spacing between the elements (531, 532) may be only a small fraction of the spatial length of the transmitted pulse (530).

NONLINEAR PROCESSING

Refer to FIG. 32

The echo samples must be "combined" to reconstruct an image the selectivy and combining means.

The term "combining" comprises both linear combination (typically addition or summation) and nonlinear combination (for example, multiplying the echo samples together).

Nonlinear processing may be implemented in the reconstruction process to increase the resolution and control the sidelobes. In a system using many diverse backprojected ellipsoids, a weak form of nonlinear processing may be implemented that does not cause the undesirable effects normally associated with nonlinear imaging techniques such as strong response in sidelobes for certain imaging conditions. Nonlinear processing may be especially appropriate when only a few sparsely spaced objects are to be imaged as in sonar applications.

One method of nonlinear processing could be termed root processing and is shown in FIG. 32. The echo samples (417) are selected from the time history memories (409, 410, 411, 412) as previously described. As an example, four time history memories are shown. The echo samples are used as addresses to the root mapping ROMs (413,414,415,416). The ROM outputs are the Ath root of the echo samples. The processed samples are then summed, as previously described, in the echo combiner (418). The result is then used as an address to a power mapper ROM (419). The output of the ROM is the Ath power of the input and is also the reconstructed image point (420).

The strength of the nonlinear processing can be controlled by modifying the value of A.

ALTERNATE METHODS OF ECHO SAMPLE COMBINATION

Refer to FIG. 45

The term "combining" comprises all methods of echo combination including combining sequences of samples (the Combining Means of the Selecting And Combining Means), rather than individual single samples, as in cross correlation combination. Other forms of combination using nonlinear processing would include multiplicative processing (where echo samples are combined by multiplication), or log processing (where the logarithms of echo samples are taken before summation), and logical processing where echo samples are converted to binary values, one or zero, by a comparison with a threshold value before addition or multiplication, or a combination of addition and multiplication, with the results of the combination then possibly being converted back to a digital value. This is essentially binary combination using logic elements (and gates or or gates), "logical combination". The echo samples could also be combined by correlation or cross correlation.

Refering to FIG. 45, 533 shows multiplicative combination. 538, 539, 540, 541 are the echo sample inputs. 535, 536, 537 are multipliers which multiply the echo samples together to produce the reconstructed point (534).

570 shows a particular type of logical combination where the echo samples (543, 545) are first compared to a threshold, reference value (544, 546) by comparators (542, 547). The resulting binary values are fed to an and gate (548) which creates the reconstructed point (549). More complex logic can be used, for example, to require only a minimum number of successful comparisons to provide a unity reconstruction point.

535 shows a cross correlator for echo sample combination. Echo sample (550, 557) time sequences (558) are shifted into latches (551, 552, 553, 554, 555). The sequences are then multiplied together (556, 559, 560, 561, 562) and the results (567, 563, 564, 565, 566) summed together (568) to produce the reconstructed point (569).

SOFTWARE BASED IMAGE RECONSTRUCTION (A METHOD OF IMAGE RECONSTRUCTION)

The image reconstruction can be implemented in software as well as hardware. The software embodiment would only be capable of real time imaging on very fast computers and then only with relatively small image volumes at coarse resolution. However, not all applications require real time imaging. In those cases, software based reconstruction can be very cost effective and flexible. A array of transducers and associated electronics may be interfaced to the computer to provide the echo samples. Alternately, the echo samples could be recorded on removable disk by a remote system, and then provided to the image reconstruction computer. Echoes could also be telemetered to the reconstruction computer from a remote site. The resulting image could be displayed on a display interfaced to the image reconstruction computer. Alternately, the reconstructed digital image data could be used by another machine for, for example, object identification and analysis.

REFER TO THE FOLLOWING PASCAL LISTING

The following code listing consists of a Turbo Pascal program, which runs on an XT clone, comprising four main blocks, each separated by a node. The blocks are functionally distinct.

The zeroth node marks the end of the configuration portion where the initial parameters are set.

The first node, the end of the first block, marks the end of the array and object field simulation and includes the definition of the array geometry and the simulated object field. This block of code provides a set of echo time histories (which are saved in disk files) to the next block. The echo samples are derived from a simulated transmitter/receiver array and a simulated field of objects made up of reflecting points. This portion is used for simulation and system design purposes and can be largely eliminated when actual echo time histories, from a functional array, are available in a disk file or an input/output port on the computer. However, the system still must be configured to match the geometry of the array supplying the echoes.

The second node marks the end of the image reconstruction block of code (which uses the echo time histories generated by the first block) where a three dimensional image has been reconstructed from the echo time histories and saved in a disk file.

The third node marks the end of the block of code that operates on the reconstructed three dimensional image to produce tomographic views or shadowgraphs that can be displayed on printer output or the crt in numeric form. This portion could be modified to interface to a video memory board attached to a second crt, and thus provide a grey scale presentation of the reconstructed image.

The code following the third node is the pascal program proper, all the previous code comprises pascal procedures.

The computer program, taken with the information in this patent application, is self documenting for an experienced pascal programmer who has become familiar with ellipsoidal backprojection through studying the patent specification, and represents an alternate method of implementing the imaging machine. It will also be useful in further understanding the hardware based image reconstruction processor by providing insight into the core of the reconstruction process. Real time images will be generally unobtainable in software based imaging machines.

```
                { SOFTWARE IMPLEMENTATION OF IMAGING MACHINE:}
    {$R-}       {Range checking ?}
    {$B-}       {Boolean complete evaluation on}
    {$S-}       {Stack checking ?}
    {$I-}       {I/O checking ?}
    {$N+}       {numeric coprocessor}
    {$M 65520,0,655360}{stack and heap}{old:65500,65500,655360}
    program recon;
    {***************************************************************}
    {***************************************************************  }
    {* *            IMPULSE IMAGING PROGRAM                   * * }
    {* *        copyright 1988 by Forrest Anderson            * * }
    {* *              All Rights Reserved                   - * * }
    {***************************************************************  }
    {***************************************************************  }

Uses
      Dos,
      Crt;
    {Turbo3;}
```

```
const
{.................SWITCHES................................}
  TH_TextFile              = false; {generate time history text file}
  ShowTimeHistory          = false; {put time histories on the screen}
  NormalizeShadows         = true;  {maps 0..max to 0..99  !!!}
  NormalizeTomos           = true;  {maps 0..max to 0..99  !!!}
  LogVoxels                = false; {log remap voxels}
  NormalizeVoxels          = false; {sets maximum voxel value to 99}
  NormalizeVoxels_80db     = false; {sets maximum voxel value to 10,000 -1}
  Trunc_Voxel_Background   = false; {truncate recon. voxels in background}
  TruncNegTomoPixels       = false; {set neg tomo pixels to zero}
  ShadowBack               = 0; {set to 0 for no shadowbackground reduction}
  Vdisk                    = false; {ramdrive D: for intermediate storage}
  Back_Diff                = false; {back difference time histories}
  Fore_Back_Diff.          = false; {forward & backward difference}
  Sinc_Filter_Diff         = false; {sinc filter time histories}
  Hilb_Filter_Diff         = true;  {hilbert filter time histories}
  Log_Sum_PRs              = false; {log sums prs from separate xmittrs}
  NonLinear_Proc_TH        = false; {NL comb. of THs for each xmittr}
  NonLinear_Proc_Xmtrs     = false; {NL comb. of PRs from diff.xmittrs}
  NL_Mul_TH_Proc           = false; {Mul comb. of THs from each xmittr}
  Save_3D_Pix_Text         = false; {save 3D recon in text file}
  Reassign_Echo_Ampl       = true;  {redo all point amplitudes}
  DoDefault                = true;  {do default config automatically.. *.bat}
  UseDos                   = false; {uses dos for screen output..DV}
{.................CONSTANTS................................}
  PI                       = 3.1415926;
  Speed                    = 1.5; {millimeter/microsec}

{.................MAXIMUM VALUES............................}
  MaxNumRcvrEle            = 32;
  MaxNumXmtrEle            = 16;
  MaxNumSamples            = 260;
  MaxX                     = 10;
  MinX                     =-10; {-10}
  MaxY                     = 10; {10}
  MinY                     =-10; {-10}
  MaxZ                     = 75; {75}
  MinZ                     = 65; {65}
  MaxNumPoints             = 35;
  MaxNumXmtrRings          = 4;

type
{.................GLOBAL VARIABLE TYPES.....................}
  RcvrRadtype              = 1..200;
  XmtrRadtype              = 0..199;
  NumRcvrEletype           = 2..MaxNumRcvrEle;
  NumXmtrEletype           = 1..MaxNumXmtrEle;
  SampleNumtype            = 1..MaxNumSamples;
  SampleInttype            = single;
  NumSamplestype           = 1..MaxNumSamples;
  ReconRestype             = single;
  PulseWidthtype           = single;
  NumPointstype            = 1..MaxNumPoints;
  XlBoundtype              = MinX..MaxX;
  XuBoundtype              = MinX..MaxX;
  YlBoundtype              = MinY..MaxY;
  YuBoundtype              = MinY..MaxY;
  ZlBoundtype              = MinZ..MaxZ;
  ZuBoundtype              = MinZ..MaxZ;
  X_tomotype               = MinX..MaxX;
  Z_tomotype               = MinZ..MaxZ;
  NumSqrtype               = 1..100;
```

```
    NumSqrRttype              = 1..100;
    pixelrangetype            = 10..99;
    VoxelTruncLeveltype       = 1..100;
    FilterCoeffType           = single;

var
{.....................GLOBAL VARIABLES.............................}
    RcvrRad                   : RcvrRadtype;
    XmtrRad                   : XmtrRadtype;
    NumRcvrEle                : NumRcvrEletype;
    XE                        : array[1..MaxNumRcvrEle] of single;
    YE                        : array[1..MaxNumRcvrEle] of single;
    NumXmtrEle                : NumXmtrEletype;
    XT                        : array[1..MaxNumXmtrEle] of single;
    YT                        : array[1..MaxNumXmtrEle] of single;
    ZT                        : array[1..MaxNumXmtrEle] of single;
    SampleNum                 : SampleNumtype;
    SampleInt                 : SampleInttype;
    NumSamples                : NumSamplestype;
    ReconRes                  : ReconRestype;
    PulseWidth                : PulseWidthtype;
    NumPoints                 : NumPointstype;
    XP                        : array[1..MaxNumPoints] of single;
    YP                        : array[1..MaxNumPoints] of single;
    ZP                        : array[1..MaxNumPoints] of single;
    EchoAmpl                  : array[1..MaxNumPoints] of single;
    XlBound                   : XlBoundtype;
    XuBound                   : XuBoundtype;
    YlBound                   : YlBoundtype;
    YuBound                   : YuBoundtype;
    ZlBound                   : ZlBoundtype;
    ZuBound                   : ZuBoundtype;
    X_tomo                    : X_tomotype;
    Z_tomo                    : Z_tomotype;
    NumSqr                    : NumSqrtype;
    NumSqrRt                  : NumSqrRttype;
    pixelrange                : pixelrangetype;
    VoxelTruncLevel           : VoxelTruncLeveltype;
    FC1                       : FilterCoeffType;
    FC2                       : FilterCoeffType;
    FC3                       : FilterCoeffType;
    FC4                       : FilterCoeffType;
    FC5                       : FilterCoeffType;

{................END OF GLOBAL / PROGRAM DECLARATIONS....................} procedure change_default_drive ;
  begin
    writeln('*******   ALL OUTPUT WILL GO TO VDISK D:  !!!!!!!!!!!!!!!!! ');
    exec('\command.com','/c d:');
    if DosError <> 0 then
       writeln('Dos error #',DosError)
    else
       writeln('Exec OK.. child process exit code =', DosExitCode);
  end; {procedure change_default_drive} procedure use_dos_for_screen;
  begin
    assign(input,'');
    reset(input);
    assign(output,'');
    rewrite(output);
  end; {procedure use_dos_for_screen}
```

```
procedure default_configuration ;
  var
    rcvrconf              : text;
    xmtrcon1              : text;
    xmtrcon2              : text;
    xmtrcon3              : text;
    xmtrcon4              : text;

EleNum                : integer;

XmtrRingNum1Rad       : integer;
    XmtrRingNum2Rad       : integer;
    XmtrRingNum3Rad       : integer;
    XmtrRingNum4Rad       : integer;
    XmtrRingNum1Offs      : integer;
    XmtrRingNum2Offs      : integer;
    XmtrRingNum3Offs      : integer;
    XmtrRingNum4Offs      : integer;
    NumXmtrEleRingNum1    : integer;
    NumXmtrEleRingNum2    : integer;
    NumXmtrEleRingNum3    : integer;
    NumXmtrEleRingNum4    : integer;

FN                    : integer;
    Universal_Ampl        : integer;

begin
  writeln('DOING DEFAULT CONFIGURATION....');

{............THE FUNDAMENTAL PARAMETERS...............................}

{NONLINEAR COMPRESSION if active}
  NumSqr                := 1;{1}
  NumSqrRt              := 2;{2}

{VOXEL TRUNCATION LEVEL if active}
  VoxelTruncLevel       := 1;

{FILTER COEFFICIENTS}
  FC1 := 0; FC2 := -0.5; FC3 := 1; FC4 := -0.5; FC5 := 0;
      {THE ARRAY}
  XmtrRingNum1Rad       := 0;  {25}
  XmtrRingNum1Offs      := 0;
  XmtrRingNum2Rad       := 20;
  XmtrRingNum2Offs      := 0;
  XmtrRingNum3Rad       := 30;
  XmtrRingNum3Offs      := 0;
  XmtrRingNum4Rad       := 40;
  XmtrRingNum4Offs      := 0;
  NumXmtrEleRingNum1    := 1;   {r3=0}{r2=0}{r1=1} {16}
  NumXmtrEleRingNum2    := 4;   {r3=0}{r2=0}{r1=3}
  NumXmtrEleRingNum3    := 5;   {r3=0}{r2=16} {r1=4}
  NumXmtrEleRingNum4    := 6;   {r3=16} {r2=0}{r1=4}

NumRcvrEle            := 32;  {32}
  RcvrRad               := 50;

{THE OBJECT FIELD}
  NumPoints    := 1; {31}

XP[1]        := 0;      {0}    {start body}
  YP[1]        := 0;      {5}
  ZP[1]        := 71;     {71}
  EchoAmpl[1]  := 5;      {5}
```

```
XP[2]          := 0;
YP[2]          := 4;
ZP[2]          := 71;
EchoAmpl[2]    := 5;

XP[3]          := 0;
YP[3]          := 3;
ZP[3]          := 71;
EchoAmpl[3]    := 5;

XP[4]          := 0;
YP[4]          := 2;
ZP[4]          := 71;
EchoAmpl[4]    := 5;

XP[5]          := 0;
YP[5]          := 1;
ZP[5]          := 71;
EchoAmpl[5]    := 5;

XP[6]          := 0;
YP[6]          := 5;
ZP[6]          := 71;
EchoAmpl[6]    := 5;

XP[7]          := 0;
YP[7]          := -1;
ZP[7]          := 71;
EchoAmpl[7]    := 5;

XP[8]          := 0;
YP[8]          := -2;
ZP[8]          := 71;
EchoAmpl[8]    := 5;

XP[9]          := 0;
YP[9]          := -3;
ZP[9]          := 71;
EchoAmpl[9]    := 5;

XP[10]         := 0;
YP[10]         := -4;
ZP[10]         := 71;
EchoAmpl[10]   := 5;

XP[11]         := 0;            {end body}
YP[11]         := -5;
ZP[11]         := 71;
EchoAmpl[11]   := 5;

XP[12]         := 4;            {start wing}
YP[12]         := 1;
ZP[12]         := 71;
EchoAmpl[12]   := 5;

XP[13]         := 3;
YP[13]         := 1;
ZP[13]         := 71;
EchoAmpl[13]   := 5;

XP[14]         := 2;
YP[14]         := 1;
```

```
ZF[14]          := 71;
EchoAmpl[14]    := 5;

XF[15]          := 1;
YF[15]          := 1;
ZF[15]          := 71;
EchoAmpl[15]    := 5;

XF[16]          := -1;
YF[16]          := 1;
ZF[16]          := 71;
EchoAmpl[16]    := 5;

XF[17]          := -2;
YF[17]          := 1;
ZF[17]          := 71;
EchoAmpl[17]    := 5;

XF[18]          := -3;
YF[18]          := 1;
ZF[18]          := 71;
EchoAmpl[18]    := 5;

XF[19]          := -4;            {end wing}
YF[19]          := 1;
ZF[19]          := 71;
EchoAmpl[19]    := 5;

XF[20]          := 3;             {start tail}
YF[20]          := -5;
ZF[20]          := 71;
EchoAmpl[20]    := 5;

XF[21]          := 2;
YF[21]          := -5;
ZF[21]          := 71;
EchoAmpl[21]    := 5;

XF[22]          := 1;
YF[22]          := -5;
ZF[22]          := 71;
EchoAmpl[22]    := 5;

XF[23]          := -1;
YF[23]          := -5;
ZF[23]          := 71;
EchoAmpl[23]    := 5;

XF[24]          := -2;            {end tail}
YF[24]          := -5;
ZF[24]          := 71;
EchoAmpl[24]    := 5;

XF[25]          := 0;             {start rudder}
YF[25]          := -5;
ZF[25]          := 70;
EchoAmpl[25]    := 5;

XF[26]          := 0;
YF[26]          := -5;
ZF[26]          := 69;
EchoAmpl[26]    := 5;
```

```
XP[27]        := 0;                    {end rudder}
YP[27]        := -5;
ZP[27]        := 68;
EchoAmpl[27]  := 5;

XP[28]        := -5;                   {start widen wing}
YP[28]        := 1;
ZP[28]        := 71;
EchoAmpl[28]  := 5;

XP[29]        := -6;
YP[29]        := 1;
ZP[29]        := 71;
EchoAmpl[29]  := 5;

XP[30]        := 5;
YP[30]        := 1;
ZP[30]        := 71;
EchoAmpl[30]  := 5;

XP[31]        := 6;                    {end widen wing}
YP[31]        := 1;
ZP[31]        := 71;
EchoAmpl[31]  := 5;
{
XP[31]        := ;
YP[31]        := ;
ZP[31]        := ;
EchoAmpl[31]  := ;
}
{
XP[32]        := 0;
YP[32]        := 1;
ZP[32]        := 71;
EchoAmpl[32]  := 5;
}{
XP[33]        := 0;
YP[33]        := 1;
ZP[33]        := 71;
EchoAmpl[33]  := 5;
}{
XP[34]        := 0;
YP[34]        := 1;
ZP[34]        := 71;
EchoAmpl[34]  := 5;
}

{*———————————ECHO AMPL REASSIGNMENT———————————*}
if Reassign_Echo_Ampl then
begin
  Universal_Ampl := 1;
  writeln('****REASSIGNING ALL POINT AMPLITUDES TO ',Universal_Ampl);
  for PN := 1 to NumPoints do
    EchoAmpl[PN] := Universal_Ampl;
end;
{************************************}
{*****——POINT  REASSIGNMENT——*****}
{   XP[1]        := 8.660 ;          }
{   YP[1]        := 5 ;              }
{   ZP[1]        := ZP[1];           }
{   EchoAmpl[1]  := 1;               }
{*****——FOR OBJECT SCANNING——*****}
{**   OR OBJECT DECOMPOSITION    **}
{************************************}
```

```
{RECON PARAMETERS}
 SampleInt      := 0.66666666;    {microsec}
 NumSamples     := 250;
 ReconRes       := 1;
 PulseWidth     := 1;

X_tomo         := 0;        { YZ tomogram location}
 Z_tomo         := 71;       { YX tomogram location} pixelrange     := 99;{max nomalization value}

XlBound        := - 10                    {- 10};
 XuBound        :=   10                    {  10};

YlBound        := -10                     {- 10};
 YuBound        :=  10                     {  10};

ZlBound        := 65                      { 65 };
 ZuBound        := 75                      { 75 };

{............COMPUTE THE TRANSMITTER ELEMENT COORDINATES................}

NumXmtrEle := NumXmtrEleRingNum1 + NumXmtrEleRingNum2 +
               NumXmtrEleRingNum3 + NumXmtrEleRingNum4;
 writeln('NumXmtrEle = ',NumXmtrEle,'   !!!!!!!!!!!');

for EleNum := 1 to NumXmtrEleRingNum1 do {find transmitter element
coordinates}
     begin
     XT[EleNum] :=XmtrRingNum1Rad*cos((2*PI/NumXmtrEleRingNum1)*EleNum +PI/2);
     YT[EleNum] :=XmtrRingNum1Rad*sin((2*PI/NumXmtrEleRingNum1)*EleNum +PI/2);
     ZT[EleNum] :=XmtrRingNum1Offs;
     end;

{*****************************}
{*-TRANSMITTER COORD REASSIGNMENT-**}
{  writeln('');                      }
{  writeln('REASSIGNING XMITTR COORDS');}
{  writeln('');                      }
{                                    }
{  XT[1] := -22;                     }
{  YT[1] := -12;                     }
{  ZT[1] := 0;                       }
{                                    }
{  XT[2] :=                          }
{  YT[2] :=                          }
{  ZT[2] :=                          }
{                                    }
{  XT[3] :=                          }
{  YT[3] :=                          }
{  ZT[3] :=                          }
{*****************************} for EleNum := 1 to NumXmtrEleRingNum1 do
     writeln('RING1.. TN',EleNum,' (',round(XT[EleNum]),','
         ,round(YT[EleNum]),',',round(ZT[EleNum]),')');
 writeln('FORMING TRANSMITTER RING 1 CONFIGURATION TEXT FILE
"xmtrcon1.dat"...');
 assign(xmtrcon1,'xmtrcon1.dat');
 rewrite(xmtrcon1);
 for EleNum := 1 to NumXmtrEleRingNum1 do
```

```
      writeln(xmtrcon1,'TN',EleNum,' (',round(XT[EleNum]),','
              ,round(YT[EleNum]),',',round(ZT[EleNum]),')');
    close(xmtrcon1);

If (NumXmtrEleRingNum2 > 0) then
    begin
    for EleNum    := (NumXmtrEleRingNum1 + 1) to
                  (NumXmtrEleRingNum1 + NumXmtrEleRingNum2) do
                     {find transmitter element coordinates}
      begin
      XT[EleNum]  := XmtrRingNum2Rad * cos((2*PI/NumXmtrEleRingNum2)*EleNum);
      YT[EleNum]  := XmtrRingNum2Rad * sin((2*PI/NumXmtrEleRingNum2)*EleNum);
      ZT[EleNum]  := XmtrRingNum2Offs;
      end;

for EleNum := (NumXmtrEleRingNum1 + 1) to (NumXmtrEleRingNum1 +
                   NumXmtrEleRingNum2)   do
      writeln('RING2.. TN',EleNum,' (',round(XT[EleNum]),','
              ,round(YT[EleNum]),',',round(ZT[EleNum]),')');
    writeln('FORMING TRANSMITTER RING 2 CONFIGURATION TEXT FILE
"xmtrcon2.dat"...');
    assign(xmtrcon2,'xmtrcon2.dat');
    rewrite(xmtrcon2);
    for EleNum := (NumXmtrEleRingNum1 + 1) to (NumXmtrEleRingNum1 +
                   NumXmtrEleRingNum2)   do
      writeln(xmtrcon2,'TN',EleNum,' (',round(XT[EleNum]),','
              ,round(YT[EleNum]),',',round(ZT[EleNum]),')');
    close(xmtrcon2);
    end;

If (NumXmtrEleRingNum3 > 0) then
    begin
    for EleNum    := (NumXmtrEleRingNum1 + NumXmtrEleRingNum2 + 1) to
                  (NumXmtrEleRingNum1 + NumXmtrEleRingNum2 +
                   NumXmtrEleRingnum3) do
      begin
      XT[EleNum] :=XmtrRingNum3Rad * cos((2*PI/NumXmtrEleRingNum3)*EleNum
+PI/2);
      YT[EleNum] :=XmtrRingNum3Rad * sin((2*PI/NumXmtrEleRingNum3)*EleNum
+PI/2);
      ZT[EleNum] :=XmtrRingNum3Offs;
      end;

for EleNum    := (NumXmtrEleRingNum1 + NumXmtrEleRingNum2 + 1) to
                  (NumXmtrEleRingNum1 + NumXmtrEleRingNum2 +
                   NumXmtrEleRingnum3) do
      writeln('RING3.. TN',EleNum,' (',round(XT[EleNum]),','
              ,round(YT[EleNum]),',',round(ZT[EleNum]),')');
    writeln('FORMING TRANSMITTER RING 3 CONFIGURATION TEXT FILE
"xmtrcon3.dat"...');
    assign(xmtrcon3,'xmtrcon3.dat');
    rewrite(xmtrcon3);
    for EleNum    := (NumXmtrEleRingNum1 + NumXmtrEleRingNum2 + 1) to
                  (NumXmtrEleRingNum1 + NumXmtrEleRingNum2 +
                   NumXmtrEleRingnum3) do
      writeln(xmtrcon3,'TN',EleNum,' (',round(XT[EleNum]),','
              ,round(YT[EleNum]),')',round(ZT[EleNum]));
    close(xmtrcon3);
    end;

If (NumXmtrEleRingNum4 > 0 ) then
    begin
    for EleNum    := (NumXmtrEleRingNum1 + NumXmtrEleRingNum2 +
                   NumXmtrEleRingNum3 + 1) to
```

```
                         (NumXmtrEleRingNum1 + NumXmtrEleRingNum2 +
                          NumXmtrEleRingnum3 + NumXmtrEleRingnum4) do
      begin
        XT[EleNum]    :=  XmtrRingNum4Rad * cos((2*PI/NumXmtrEleRingNum4)*EleNum);
        YT[EleNum]    :=  XmtrRingNum4Rad * sin((2*PI/NumXmtrEleRingNum4)*EleNum);
        ZT[EleNum]    :=  XmtrRingNum4Offs;
      end;

for EleNum    := (NumXmtrEleRingNum1 + NumXmtrEleRingNum2 +
                      NumXmtrEleRingNum3 + 1) to
                     (NumXmtrEleRingNum1 + NumXmtrEleRingNum2 +
                      NumXmtrEleRingnum3 + NumXmtrEleRingnum4) do
      writeln('RING4.. TN',EleNum,' (',round(XT[EleNum]),','
               ,round(YT[EleNum]),',',round(ZT[EleNum]),')');
    writeln('FORMING TRANSMITTER RING 4 CONFIGURATION TEXT FILE
"xmtrcon4.dat"...');
    assign(xmtrcon4,'xmtrcon4.dat');
    rewrite(xmtrcon4);

for EleNum    := (NumXmtrEleRingNum1 + NumXmtrEleRingNum2 +
                      NumXmtrEleRingNum3 + 1) to
                     (NumXmtrEleRingNum1 + NumXmtrEleRingNum2 +
                      NumXmtrEleRingnum3 + NumXmtrEleRingnum4) do
      writeln(xmtrcon4,'TN',EleNum,' (',round(XT[EleNum]),','
               ,round(YT[EleNum]),',',round(ZT[EleNum]));
    close(xmtrcon4);
  end;

{................COMPUTE THE RECEIVER ELEMENT COORDINATES..............}
    for EleNum    := 1 to NumRcvrEle do {find receiver element coordinates}
      begin
        XE[EleNum]    :=  RcvrRad * cos((2*PI/NumRcvrEle)*EleNum+PI/2);
        YE[EleNum]    :=  RcvrRad * sin((2*PI/NumRcvrEle)*EleNum+PI/2);
      end;
    writeln('COMPUTING RECEIVER ELEMENT COORDINATES....');
    for EleNum := 1 to NumRcvrEle do
      writeln('EN',EleNum,' (',round(XE[EleNum]),',',round(YE[EleNum]),')');
    writeln('FORMING RECEIVER CONFIGURATION TEXT FILE "rcvrconf.dat"...');
    assign(rcvrconf,'rcvrconf.dat');
    rewrite(rcvrconf);
    for EleNum := 1 to NumRcvrEle do
      writeln(rcvrconf,'EN',EleNum,'
(',round(XE[EleNum]),',',round(YE[EleNum]),')');
    close(rcvrconf);

end; {default_configuration} procedure configure_simulation;
var
  ans, dummychar : char;
begin
  writeln(' Accept Default simulation Configuration?? y/n   ');
  if DoDefault = true then
    default_configuration;
  if DoDefault = false then
    begin
      repeat
        begin
          ans := ReadKey;    {read(kbd,ans)}
          if ans = 'y' then
            default_configuration
```

```
              else
                default_configuration; {reconfigure;}
              end;
          until (ans = 'y') or (ans = 'n');
      end;
end; {configure_simulation}

{------------------------------------------------------------}
{                                                            }
{                   LOCATION OF ZEROTH NODE                  }
{                                                            }
{                  system has been configured                }
{------------------------------------------------------------} procedure do_time_history;
  var
    TimeHistory    : array[1..MaxNumSamples,
                            1..MaxNumRcvrEle] of single;
    TN             : integer;

procedure generate_time_histories;
  var

EchoRecord     : array[1..MaxNumRcvrEle,
                            1..MaxNumPoints] of boolean;
    RTP            : single;
    RFE            : single;
    RR             : single;
    TOF            : single;
    EN             : integer;
    PN             : integer;
    RRint          : integer;
    begin
      if Nonlinear_Proc_TH then
        begin
          writeln(' ');
          writeln('!!! NONLINEAR PROCESSING OF TH COMBINATION IS ACTIVE');
          writeln('      -> COMPRESSION RATIO IS : ', NumSqr,' / ',NumSqrRt);
          writeln(' ');
        end;
      writeln(' ');
      writeln('GENERATING TIME HISTORY.... NUMBER OF SAMPLES = ',NumSamples);
      for EN := 1 to NumRcvrEle do   {initialize}
        for PN := 1 to NumPoints do
          for SampleNum := 1 to NumSamples do
            begin
            EchoRecord[EN,PN] := false;
            TimeHistory[SampleNum,EN] := 0;
            end;
        for EN := 1 to NumRcvrEle do
          begin
          writeln('EN= ',EN,' ------------------------------------');
          for PN := 1 to NumPoints do
            begin
            write('      PN= ',PN);
            for SampleNum := 1 to NumSamples do
              begin
                RTP            := sqrt(sqr(XP[PN]-XT[TN])+sqr(YP[PN]-YT[TN])
                                        +sqr(ZP[PN]-ZT[TN]));
                RFE            := sqrt(sqr(XP[PN]-XE[EN])+sqr(YP[PN]-YE[EN])
                                        +sqr(ZP[PN]));
                RR             := RFE + RTP;
```

```
              RRint           := round(RR);
              TOF             := SampleNum * SampleInt ;
               {if ( ( ABS((TOF * Speed) - RR) <= (0.499 * Sampleint * Speed) )
                  or (TOF * Speed > RR) )
                  and ( EchoRecord[EN,FN]=false )
                then}
                if ( (TOF * Speed) >= RRint )
                   and (EchoRecord[EN,FN] = false) then
                begin
                  TimeHistory[SampleNum,EN] := TimeHistory[SampleNum,EN]
                                                     + EchoAmpl[FN];
                  EchoRecord[EN,FN]  := true;
                  writeln('  echo recorded');
                end
                else
                begin
                  TimeHistory[Samplenum,EN] := TimeHistory[SampleNum,EN]
                                                     + 0;
                end;
              If (ShowTimeHistory = true)
                then
                  writeln('TIME HISTORY..',
                          ' TN=',TN,' EN=',EN,' FN=',FN,
                          ' ER=',EchoRecord[EN,FN],
                          ' SN=',Samplenum,
                          ' TH=',round(TimeHistory[SampleNum,EN]),
                          ' RR=',round(RR), 'RTP=',round(RTP),'
RFE=',round(RFE));
            end;{for SampleNum}
          end;{for FN}
        end;{for EN}
     end; {procedure generate_time_histories} procedure back_difference;
   var
     EN                : integer;
     SampleNum         : integer;
     DifTimeHistory    : array[1..MaxNumSamples] of single;

begin
     writeln('BACK DIFFERENCING TIME HISTORY...');
     for EN := 1 to NumRcvrEle  do
        begin
        for SampleNum := 2 to NumSamples  do
           DifTimeHistory[SampleNum] := TimeHistory[SampleNum,EN]
                                     - TimeHistory[(SampleNum - 1),EN];
        for SampleNum := 2 to NumSamples do
           TimeHistory[SampleNum,EN] := DifTimeHistory[SampleNum];
        end;
   end; {procedure back_difference} procedure fore_difference;
   var
     EN                : integer;
     SampleNum         : integer;
     DifTimeHistory    : array[1..MaxNumSamples,1..MaxNumRcvrEle] of single;

begin
     writeln('FORWARD DIFFERENCING TIME HISTORY...');
     for EN := 1 to NumRcvrEle  do
        for SampleNum := 1 to NumSamples - 1  do
           DifTimeHistory[SampleNum,EN] := TimeHistory[SampleNum,EN]
                                     - TimeHistory[(SampleNum + 1),EN];
```

```
      for EN := 1 to NumRcvrEle do
         for SampleNum := 1 to NumSamples - 1 do
            TimeHistory[SampleNum,EN] := DifTimeHistory[SampleNum,EN];
   end; {procedure fore_difference} procedure sinc_filter;
   var
      EN                : integer;
      SampleNum         : integer;
      DifTimeHistory    : array[1..MaxNumSamples] of single;

begin
      writeln('SINC FILTERING TIME HISTORY...');
      for EN := 1 to NumRcvrEle  do
         begin
            for SampleNum := 2 to NumSamples - 1  do
               DifTimeHistory[SampleNum] := TimeHistory[SampleNum,EN]
                                   - 0.5 * TimeHistory[(SampleNum - 1),EN]
                                   - 0.5 * TimeHistory[(SampleNum + 1),EN];
            for SampleNum := 2 to NumSamples - 1  do
               TimeHistory[SampleNum,EN] := DifTimeHistory[SampleNum];
         end;
   end; {procedure sinc_filter}
procedure hilb_filter;
   var
      EN                : integer;
      SampleNum         : integer;
      DifTimeHistory    : array[1..MaxNumSamples] of single;

begin
      writeln('HILB FILTERING TIME HISTORY...');
      for EN := 1 to NumRcvrEle  do
         begin
            for SampleNum := 3 to NumSamples - 2  do
               DifTimeHistory[SampleNum] :=
                                     FC1 * TimeHistory[(SampleNum - 1),EN]
                                   + FC2 * TimeHistory[(SampleNum - 2),EN]
                                   + FC3 * TimeHistory[SampleNum,EN]
                                   + FC4 * TimeHistory[(SampleNum + 1),EN]
                                   + FC5 * TimeHistory[(SampleNum + 2),EN]

for SampleNum := 3 to NumSamples - 2  do
               TimeHistory[SampleNum,EN] := DifTimeHistory[SampleNum];
         end;
   end; {procedure hilb_filter} procedure save_time_histories;
   type
      sample      = single;
   var
      EN          : integer;
      tim_hist    : file of sample;
      TNS         : string[2];
      timhistTN   : string[11];

begin
      writeln('SAVING BINARY TIME HISTORIES IN FILES tim_hist.',TN,'....');
      str(TN,TNS);{make hard disk file names}
      timhistTN := concat('tim_hist.',TNS);
      assign(tim_hist,timhistTN);{make individual files for each xmitter}
      rewrite(tim_hist);
      for EN := 1 to NumRcvrEle do
```

```
      for SampleNum := 1 to NumSamples do
        begin
          write(tim_hist,TimeHistory[SampleNum,EN]);
          {writeln('SAVED BINARY TIME HISTORY=',TimeHistory[SampleNum,EN]:2,
              ' SampleNum=',SampleNum:3,' EN=',EN,' TN=',TN);}
        end;
      close(tim_hist);
    end{procedure save_time_histories};

procedure record_time_histories;

var
    EN              : integer;
    echo_hist       : text;
    TNS             : string[2];
    echohistTN      : string[10];

begin {write time histories to text file if option selected} writeln('WRITING TIME HISTORY TO TEXT FILE echohist.',TN,'..... ');
    str(TN,TNS);{make hard disk file names}
    echohistTN := concat('echohist.',TNS);
    assign(echo_hist,echohistTN);
    rewrite(echo_hist);
    writeln(echo_hist,
      ' S  E E E E E E E E E E E E E E E E E E E E E E E E E E E E E E E E
');
    writeln(echo_hist,
      ' M  N N N N N N N N N N N N N N N N N N N N N N N N N N N N N N N N
');
    writeln(echo_hist,
      ' P  0 0 0 0 0 0 0 0 0 0 1 1 1 1 1 1 1 1 1 1 2 2 2 2 2 2 2 2 2 2 3 3 3
');
    writeln(echo_hist,
      ' #  1 2 3 4 5 6 7 8 9 0 1 2 3 4 5 6 7 8 9 0 1 2 3 4 5 6 7 8 9 0 1 2
');
    for SampleNum := 1 to NumSamples do
      begin
        write(echo_hist,SampleNum:3);
        for EN := 1 to NumRcvrEle do
          begin
            write(echo_hist, round(TimeHistory[SampleNum,EN]):2);
          end;{for EN}
        writeln(echo_hist);
      end;{for SampleNum}
    close(echo_hist);
  end {procedure record_time_histories};

procedure compress_TH;

type
    SqrCountertype          = 1..100;
    SqrRtCountertype        = 1..100;

var
    IntermediateValue       : single;
    SqrCounter              : SqrCountertype;
    SqrRtCounter            : SqrRtCountertype;
    EN                      : integer;

begin
    writeln('COMPRESSING TIME HISTORIES');
```

```
        for SampleNum := 1 to NumSamples do
          begin
            for EN := 1 to NumRcvrEle do
              begin
                IntermediateValue := TimeHistory[SampleNum,EN];
                for SqrCounter := (1 + 1) to NumSqr do
                  IntermediateValue :=
                    TimeHistory[SampleNum,EN] * IntermediateValue;
                for SqrRtCounter := (1 + 1) to NumSqrRt do
                  IntermediateValue := sqrt(IntermediateValue);
                TimeHistory[SampleNum,EN] := round(IntermediateValue);
              end;{for EN}
          end;{for SampleNum}
      end {procedure compress_TH};

begin {procedure do_time_histories}
    for TN := 1 to NumXmtrEle do
      begin
        writeln('***GENERATING & SAVING TIME HISTORY FOR TRANSMITTER NUMBER
',TN);
        generate_time_histories;
        if Back_Diff then
          back_difference;
        if Fore_Back_Diff then
          begin
            if odd(TN) then
              back_difference
            else
              fore_difference;
          end;
        if Sinc_Filter_Diff then
          sinc_filter;
        if Hilb_Filter_Diff then
          hilb_filter;
        if TH_TextFile then
          record_time_histories;
        if NonLinear_Proc_TH then
          compress_TH;
        save_time_histories;
      end
  end; {procedure do_time_history}
{─────────────────────────────────────────────}
{             LOCATION OF FIRST NODE           }
{         time histories have been generated  }
{               and saved on disk              }
{─────────────────────────────────────────────} procedure make_3D_image;

var

TimeHistory   : array[1..MaxNumSamples,
                          1..MaxNumRcvrEle] of single;
    FR            : array[MinX..MaxX,MinY..MaxY,
                          MinZ..MaxZ] of single;
    FRMAX         : single;

echo_hist     : text;
    EN            : integer;
    TN            : integer;

procedure initialize_voxels ;
  var
      XR          : integer;
```

```
        YR              : integer;
        ZR              : integer;

begin {initialize}
        for XR := XlBound to XuBound do
            for YR := YlBound to YuBound do
                for ZR := ZlBound to ZuBound do
                    FR[XR,YR,ZR] := 0;
        FRMAX := 0;
    end; {procedure initialize_voxels} procedure load_time_history;
    type
        sample          = single;
    var
        EN              : integer;
        tim_hist        : file of sample;
        TNS             : string[2];
        timhistTN       : string[11];

begin
        writeln('LOADING TIME HISTORY FOR TRANSMITTER NUMBER ',TN,'...');
        for EN := 1 to NumRcvrEle do               {initialize time history
arrays}
            for SampleNum := 1 to NumSamples do
                TimeHistory[SampleNum,EN] := 0;
        str(TN,TNS);                                {derive hard disk file name}
        timhistTN := concat('tim_hist.',TNS);                     {tim_hist.TN}
        assign(tim_hist,timhistTN);                 {equate with file variable}
        reset(tim_hist);                                           {open the file}
        for EN := 1 to NumRcvrEle do                 {read disk data into time}
            for SampleNum := 1 to NumSamples do                  {history array}
                read(tim_hist,TimeHistory[SampleNum,EN]);
        close(tim_hist);
    end;{procedure load_time_history} procedure decompress_FR;

type
        SqrCountertype          = 1..100;
        SqrRtCountertype        = 1..100;

var
        IntermediateValue       : single;
        SqrCounter              : SqrCountertype;
        SqrRtCounter            : SqrRtCountertype;
        XR                      : integer;
        YR                      : integer;
        ZR                      : integer;

begin
        writeln('**DECOMPRESSING RECONSTRUCTED VOXELS, "FR" **');
        for XR := Xlbound to Xubound do
            begin
                for YR := Ylbound to Yubound do
                    begin
                        for ZR := Zlbound to Zubound do
                            begin
                                IntermediateValue := FR[XR,YR,ZR];
                                for SqrCounter := (1 + 1) to NumSqrRT do
                                    begin
                                    {writeln('sqr ');}
```

```
              IntermediateValue :=
                FR[XR,YR,ZR] * IntermediateValue;
              end;
            for SqrRtCounter := (1 + 1) to NumSqr do
              begin
              {writeln('sqrt ');}
              IntermediateValue := sqrt(IntermediateValue);
              end;
            FR[XR,YR,ZR] := round(IntermediateValue);
            end;{for ZR}
          end;{for YR}
        end;{for XR}
    end {procedure decompress_FR};

procedure recon_image ;

var

FRt             : real;

XR              : integer;
    YR              : integer;
    ZR              : integer;

EN              : integer;

RTF             : single;
    RFE             : single;
    RR              : single;

SampleLoc       : integer;

begin
  writeln('DOING standard IMAGE RECONSTRUCTION FOR TRANSMITTER ',TN);
  if (Log_Sum_FRs) then writeln('         !!!!!!Log_Sum_FRs IS ON!!!!!');
  writeln('XBOUND = ',XlBound:3,' to ',XuBound:3,
    '    YBOUND = ',YlBound:3,' to ',YuBound:3,
    '    ZBOUND = ',ZlBound:3,' to ',ZuBound:3);
    for XR := XlBound to XuBound do
      begin
      write('.');
      for YR := YlBound to YuBound do
        for ZR := ZlBound to ZuBound do
          begin
          FRt := 0;
          for EN := 1 to NumRcvrEle do
            begin
            RTF       := sqrt(sqr(XR-XT[TN])+sqr(YR-YT[TN])+sqr(ZR-ZT[TN]));
            RFE       := sqrt(sqr(XR-XE[EN])+sqr(YR-YE[EN])+sqr(ZR));
            RR        := RFE + RTF;
            SampleLoc := round(RR / (SampleInt * speed));
            FRt       := FRt + TimeHistory[ SampleLoc,EN];
            end; { for EN}
          if (Log_Sum_FRs) then
            begin
            if (FRt <= 0.0001) then FRt := 0.0001;
            FR[XR,YR,ZR] := FR[XR,YR,ZR] + 20 * ln(FRt) / ln(10);
            end
          else
            begin
            FR[XR,YR,ZR] := FR[XR,YR,ZR] + FRt;
            end;
          end;{for ZR}
```

```
        end;{for XR}
  writeln('IMAGE RECONSTRUCTION DONE *********');
  end; { procedure recon_image} procedure nl_mul_TH_recon_image ;

var

XR              : integer;
    YR              : integer;
    ZR              : integer;

EN              : integer;

RTF             : single;
    RFE             : single;
    RR              : single;

SampleLoc       : integer;

FSF             : single;

begin
  writeln('DOING nl_mul_TH IMAGE RECONSTRUCTION FOR TRANSMITTER ',TN);
  writeln('XBOUND = ',XlBound:3,' to ',XuBound:3,
       '  YBOUND = ',YlBound:3,' to ',YuBound:3,
       '  ZBOUND = ',ZlBound:3,' to ',ZuBound:3);

for XR := XlBound to XuBound do
    begin
      write('.');
      for YR := YlBound to YuBound do
      begin
        for  ZR := ZlBound to ZuBound do
        begin
          FSF := 1; {must be init. to 1 for mult. proc.}
          for  EN := 1 to NumRcvrEle do
          begin
            RTF       := sqrt(sqr(XR-XT[TN])+sqr(YR-YT[TN])+sqr(ZR-ZT[TN]));
            RFE       := sqrt(sqr(XR-XE[EN])+sqr(YR-YE[EN])+sqr(ZR));
            RR        := RFE + RTF;
            SampleLoc := round(RR / (SampleInt * speed));
            FSF       := FSF * TimeHistory[SampleLoc,EN];
          end;{for EN}
          FR[XR,YR,ZR]  := FR[XR,YR,ZR] + FSF;
        end;{for ZR}
      end;{for YR}
    end;{for XR}
  writeln('NL_MUL_TH_IMAGE RECONSTRUCTION DONE FOR TN= ',TN,' *********');
  end; { procedure nl_mul_TH_recon_image} procedure nl_xmtr_recon_image ;

type
    SqrCountertype          = 1..100;
    SqrRtCountertype        = 1..100;

var
    IntermediateValue       : single;
    SqrCounter              : SqrCountertype;
    SqrRtCounter            : SqrRtCountertype;
```

```
   XR              : integer;
   YR              : integer;
   ZR              : integer;

EN              : integer;

RTP             : single;
   RFE             : single;
   RR              : single;

SampleLoc       : integer;

begin
writeln('DOING nl_xmittr IMAGE RECONSTRUCTION FOR TRANSMITTER ',TN);
writeln('XBOUND = ',XlBound:3,' to ',XuBound:3,
     '  YBOUND = ',YlBound:3,' to ',YuBound:3,
     '  ZBOUND = ',ZlBound:3,' to ',ZuBound:3);
   for XR := XlBound to XuBound do
     begin
     write('.');
     for YR := YlBound to YuBound do
       begin
       for  ZR := ZlBound to ZuBound do
         begin
         IntermediateValue := 0;
         for  EN := 1 to NumRcvrEle do
           begin
           RTP  := sqrt(sqr(XR-XT[TN])+sqr(YR-YT[TN])+sqr(ZR-ZT[TN]));
           RFE  := sqrt(sqr(XR-XE[EN])+sqr(YR-YE[EN])+sqr(ZR));
           RR   := RFE + RTP;
           SampleLoc    := round(RR / (SampleInt * speed));
           IntermediateValue :=
                     IntermediateValue +  TimeHistory[ SampleLoc,EN];
           end;{for EN}
         {write(' ',round(IntermediateValue):3);}
         for SqrCounter := (1 + 1) to NumSqr do
           begin
           {writeln('sqr ');}
           IntermediateValue :=
              IntermediateValue * IntermediateValue;
           end;
         for SqrRtCounter := (1 + 1) to NumSqrRt do
           begin
           {writeln('sqrt ');}
           IntermediateValue := sqrt(IntermediateValue);
           end;
         FR[XR,YR,ZR] := FR[XR,YR,ZR] + round(IntermediateValue);
         end;{for ZR}
       end;{for YR}
     end;{for XR}
writeln('NL TRANSMITTER IMAGE RECONSTRUCTION DONE *********');
end; { procedure nl_xmtr_recon_image} procedure normalize_voxels;

var
   FRMAX           : single;
   XR              : integer;
   YR              : integer;
   ZR              : integer;

begin
     writeln('*******NORMALIZING VOXELS.......');
     FRMAX := 1;
```

```
        for XR := XlBound to XuBound do
          for YR := YlBound to YuBound do
            for ZR := ZlBound to ZuBound do
              if FR[XR,YR,ZR] > FRMAX then
                FRMAX := FR[XR,YR,ZR];
        writeln('FRMAX = ',FRMAX);
        for XR := XlBound to XuBound do
          for YR := YlBound to YuBound do
            for ZR := ZlBound to ZuBound do
            begin
            {write('FR before= ',FR[XR,YR,ZR]);}
            FR[XR,YR,ZR] := round(FR[XR,YR,ZR]/FRMAX*99);
            {write(' FR after= ',FR[XR,YR,ZR]);}
            {writeln(' FRMAX= ',FRMAX);}
            end;
    end; {procedure normalize_voxels} procedure truncate_voxels;

var
        XR              : integer;
        YR              : integer;
        ZR              : integer;

begin
    writeln('*******TRUNCATING VOXEL BACKGROUND AT ',(VoxelTruncLevel -
1),'...');
        for XR := XlBound to XuBound do
          for YR := YlBound to YuBound do
            for ZR := ZlBound to ZuBound do
              begin
              if FR[XR,YR,ZR] < VoxelTruncLevel then
              FR[XR,YR,ZR] := 0;
              end;
    end; {procedure truncate voxels} procedure log_voxels;

var
        XR              : integer;
        YR              : integer;
        ZR              : integer;
        TruncateFR      : single;
        LogFR           : single;
        FRMAX           : single;

begin
    writeln('******* CONVERTS ALL VOXELS TO DECIBELS...');
    writeln('         ....TRUNCATES BELOW ONE BEFORE 20 LOGGING...');
    writeln('         .......CONVERTS RESULTING FR dbs TO INTEGERS......');

if NormalizeVoxels_80db then
        begin
        writeln('***** NORMALIZING VOXELS TO 10,000 (80db) .......');
        FRMAX := 1;
        for XR := XlBound to XuBound do
          for YR := YlBound to YuBound do
            for ZR := ZlBound to ZuBound do
              if FR[XR,YR,ZR] > FRMAX then
                FRMAX := FR[XR,YR,ZR];
        writeln('FRMAX = ',FRMAX);
        for XR := XlBound to XuBound do
```

```
              for YR := YlBound to YuBound do
                for ZR := ZlBound to ZuBound do
                begin
                  {write('FR before= ',FR[XR,YR,ZR]);}
                  FR[XR,YR,ZR] := round(FR[XR,YR,ZR]/FRMAX*99);
                  {write(' FR after= ',FR[XR,YR,ZR]);}
                  {writeln(' FRMAX= ',FRMAX);}
                end;
          end; {NORMALIZING VOXELS} for XR := XlBound to XuBound do
            for YR := YlBound to YuBound do
              for ZR := ZlBound to ZuBound do
                begin
                  if FR[XR,YR,ZR] < 1
                    then  FR[XR,YR,ZR] := 1 ;
                  TruncateFR          := FR[XR,YR,ZR];
                  LogFR               := 20 * ln(TruncateFR) / ln(10);
                  FR[XR,YR,ZR]        := round(LogFR);
                end;
          end; {procedure log_voxels} procedure save_3D_Image;
  type
    point        = single;
  var
    XR           : integer;
    YR           : integer;
    ZR           : integer;
    image_3d     : file of point;
  begin
    writeln('SAVING BINARY 3D IMAGE IN FILE "image_3d.dat"....');
    assign(image_3d,'image_3d.dat');
    rewrite(image_3d);
    for XR := XlBound to XuBound do
      for YR := YlBound to YuBound do
        for ZR := ZlBound to ZuBound do
          write(image_3d,FR[XR,YR,ZR]);
    write(image_3d,FRMAX);
    close(image_3d);
  end; {procedure save_3D_Image} procedure save_3D_pik;

var
    pik_3d       : text;
    XR           : integer;
    YR           : integer;
    ZR           : integer;

begin
    writeln('SAVING 3D IMAGE IN FILE "pik_3d.dat"....');
    assign(pik_3d,'pik_3d.dat');
    rewrite(pik_3d);
    for XR := XlBound to XuBound do
      for YR := YlBound to YuBound do
        for ZR := ZlBound to ZuBound do
          write(pik_3d,FR[XR,YR,ZR]);
    close(pik_3d);
  end; {procedure save_3D_pik} begin {Make_3D_Image}
  initialize_voxels;
```

```
    for TN := 1 to NumXmtrEle do
      begin  {recon for TN = i and sum into 3D image voxels}
        load_time_history;{download time history for a particular xmitter}
        if not (NonLinear_Proc_Xmtrs or NL_Mul_TH_Proc) then
          recon_image;
        if NonLinear_Proc_Xmtrs then
          NL_xmtr_recon_image;
        if NL_Mul_TH_Proc then
          NL_Mul_TH_Recon_Image;
      end;  {separate xmitter images have been summed or combined}
    if NonLinear_Proc_TH or NonLinear_Proc_xmtrs then
      decompress_FR;
    if NormalizeVoxels then
      normalize_voxels;
    if Trunc_Voxel_Background then
      truncate_voxels;
    if LogVoxels then
      log_voxels;
    save_3D_Image;          {save in a binary file}
    if Save_3D_Pix_Text then
      save_3D_pik;          {save in a text file}
  end; {procedure make_3D_image}

{────────────────────────────────────────────────────────────────}
{             LOCATION OF SECOND NODE                            }
{          a three dimensional image has been                    }
{             reconstructed and saved on disk                    }
{────────────────────────────────────────────────────────────────} procedure form_2D_view;

var
    FR           : array[MinX..MaxX,MinY..MaxY,
                          MinZ..MaxZ] of single;
    FYZ          : array[MinY..MaxY,MinZ..MaxZ]
                          of integer;
    FYX          : array[MinY..MaxY,MinX..MaxX]
                          of integer;

FXS          : array[MinY..MaxY,MinZ..MaxZ]
                          of integer;

FZS          : array[MinX..MaxX,MinY..MaxY]
                          of integer;

FRMAX        : single;

XV           : integer;
    YV           : integer;

procedure load_3D_image;

type
    point        = single;

var
    image_3d     : file of point;
    XR           : integer;
    YR           : integer;
    ZR           : integer;

begin writeln('LOADING BINARY 3D IMAGE FROM FILE "image_3d.dat"....');
```

```
    assign(image_3d,'image_3d.dat');
    reset(image_3d);
    for XR := XlBound to XuBound do
      for YR := YlBound to YuBound do
        for ZR := ZlBound to ZuBound do
          read(image_3d,FR[XR,YR,ZR]);
    read(image_3d,FRMAX);
    close(image_3d);
    end; {procedure load_3D_Image} procedure form_YZtomogram;
  var
    FYZMAX        : integer;
    XV            : integer;
    YV            : integer;
    ZV            : integer;
    XR            : integer;

begin  { form a slice in YZ plane }
    for XV := Ylbound to YuBound do   {initialize}
      for YV := ZlBound to ZuBound do
        FYZ[XV,YV] := 0;
    writeln('FORMING YZ TOMOGRAM...');
    XR := X_tomo;
    for XV := Ylbound to YuBound do
      for YV := ZlBound to ZuBound do
        FYZ[XV,YV] := round(FR[XR,XV,YV]);
    if (TruncNegTomoPixels = true) then
    begin
      for XV := Ylbound to YuBound do
        for YV := ZlBound to ZuBound do
          if (FYZ[XV,YV] < 0) then FYZ[XV,YV] := 0;
    end;
    if (NormalizeTomos = true) then
    begin
      FYZMAX := 1;
      for XV := Ylbound to YuBound do
        for YV := ZlBound to ZuBound do
          if FYZ[XV,YV] > FYZMAX then
            FYZMAX := FYZ[XV,YV];
      for XV := Ylbound to YuBound do
        for YV := ZlBound to ZuBound do
          FYZ[XV,YV] := round(FYZ[XV,YV] / FYZMAX * pixelrange);
    end
  end; {procedure form yz tomogram} procedure save_YZtomogram;

var
    yztomo        : text;
    XV            : integer;
    YV            : integer;
    ZV            : integer;

begin
    writeln('SAVING YZ TOMOGRAM IN FILE "YZ_tomo.dat"....');
    assign(yztomo,'yz_tomo.dat');
    rewrite(yztomo);
    writeln(yztomo,'       Y Y Y Y Y Y Y Y Y Y Y Y Y Y Y Y Y
Y');
    writeln(yztomo,'       = = = = = = = = = = = = = = = = = =
=');
    write(yztomo,'     ');
```

```
        for XV := YlBound to YuBound do
          write(yztomo,XV:3);
        writeln(yztomo);
        for YV := ZlBound to ZuBound do
          begin
          writeln(yztomo);
          write(yztomo,'Z=',YV:3);
          for XV := YlBound to YuBound do
            write(yztomo,PYZ[XV,YV]:3);
          end;
        close(yztomo);
      end; {procedure save_YZtomogram} procedure form_YXtomogram;
  var
    PYXMAX         : integer;
    XV             : integer;
    YV             : integer;
    ZV             : integer;
    ZR             : integer;

begin  { form a slice in YX plane }
      for XV := Ylbound to YuBound do   {initialize}
       for YV := XlBound to XuBound do
         PYX[XV,YV] := 0;
      writeln('FORMING YX TOMOGRAM...');
      ZR := Z_tomo;
      for XV := Ylbound to YuBound do
        for YV := XlBound to XuBound do
          PYX[XV,YV] := round(FR[YV,XV,ZR]);
        if (TruncNegTomoPixels = true) then
        begin
          for XV := Ylbound to YuBound do
            for YV := XlBound to XuBound do
              if (PYX[XV,YV] < 0) then PYX[XV,YV] := 0;
        end;
        if (NormalizeTomos = true) then
        begin
          PYXMAX := 1;
          for XV := Ylbound to YuBound do
            for YV := XlBound to XuBound do
              if PYX[XV,YV] > PYXMAX then
                PYXMAX := PYX[XV,YV];
          for XV := Ylbound to YuBound do
            for YV := XlBound to XuBound do
              PYX[XV,YV] := round(PYX[XV,YV] / PYXMAX * pixelrange);
        end
      end; {procedure form yx tomogram} procedure save_YXtomogram;

var
    yxtomo         : text;
    XV             : integer;
    YV             : integer;
    ZV             : integer;

begin
  writeln('SAVING YX TOMOGRAM IN FILE "YX_tomo.dat"....');
  assign(yxtomo,'yx_tomo.dat');
  rewrite(yxtomo);
  writeln(yxtomo,'      Y Y Y Y Y Y Y Y Y Y Y Y Y Y Y Y Y Y Y');
  writeln(yxtomo,'      = = = = = = = = = = = = = = = = = = =
```

```
=');
  write(yxtomo,'      ');
  for XV := YlBound to YuBound do
    write(yxtomo,XV:3);
  writeln(yxtomo);
  for YV := XlBound to XuBound do
    begin
    writeln(yxtomo);
    write(yxtomo,'X=',YV:3);
    for XV := YlBound to YuBound do
      write(yxtomo,FYX[XV,YV]:3);
    end;
  close(yxtomo);
  end; {procedure save_YXtomogram} procedure form_Xshadowgraph;
  var
    PXSMAX          : integer;
    XV              : integer;
    YV              : integer;
    ZV              : integer;
    XR              : integer;

begin { integrate in X direction}
    writeln('FORMING X SHADOWGRAPH....');
    for XV := Ylbound to YuBound do
      for YV := ZlBound to ZuBound do
        PXS[XV,YV] := 0;
    for XV := Ylbound to YuBound do
      for YV := ZlBound to ZuBound do
        for XR := XlBound to XuBound do
          begin
            if FR[XR,XV,YV] < ShadowBack + 1
              then
                PXS[XV,YV] := PXS[XV,YV] + 0
              else
                PXS[XV,YV] := PXS[XV,YV] + round(FR[XR,XV,YV]);
{if (FR[XR,XV,YV] > 2)   then writeln('PXS =',PXS[XV,YV],' FR=',FR[XR,XV,YV]);}
          end;
    if (NormalizeShadows = true) then
      begin
      writeln('NORMALIZING XSHADOWGRAPH...');
      PXSMAX := 1;
      for XV := YlBound to YuBound do
        for YV := ZlBound to ZuBound do
          begin
          if PXS[XV,YV] > PXSMAX then
          PXSMAX := PXS[XV,YV];
          end;
      writeln('PXSMAX = ',PXSMAX);
      for XV := YlBound to YuBound do
        for YV := ZlBound to ZuBound do
          PXS[XV,YV] := round(PXS[XV,YV]/PXSMAX*99);
      end
  end;{procedure form_Xshadowgraph} procedure save_Xshadowgraph;

var
    xshadow         : text;
    XV              : integer;
    YV              : integer;
    ZV              : integer;
```

```pascal
  begin
  writeln('SAVING X SHADOWGRAPH IN FILE "XSHADOW.DAT"....');
  assign(xshadow,'xshadow.dat');
  rewrite(xshadow);
  writeln(xshadow,'          Y  Y  Y  Y  Y  Y  Y  Y  Y  Y  Y  Y  Y  Y  Y  Y  Y  Y
Y  Y');
  writeln(xshadow,'          =  =  =  =  =  =  =  =  =  =  =  =  =  =  =  =  =  =
=  =');
  write(xshadow,'   ');
  for XV := YlBound to YuBound do
    write(xshadow,XV:3);
  writeln(xshadow);
  for YV := ZlBound to ZuBound do
    begin
      writeln(xshadow);
      write(xshadow,'X=',YV:3);
      for XV := YlBound to YuBound do
        write(xshadow,round(PXS[XV,YV]):3);
    end;
  close(xshadow);
  end; {procedure save_Xshadowgraph} procedure form_Zshadowgraph;
  var
    PZSMAX    : integer;
    XV        : integer;
    YV        : integer;
    ZV        : integer;
    ZR        : integer;
  begin  { integrate in Z direction}
    writeln('FORMING Z SHADOWGRAPH....');
    for XV := Xlbound to XuBound do
      for YV := YlBound to YuBound do
        PZS[XV,YV] := 0;
    for XV := Xlbound to XuBound do
      for YV := YlBound to YuBound do
        begin
          for ZR := ZlBound to ZuBound do
            begin
              if PR[XV,YV,ZR] < ShadowBack + 1
                then
                  PZS[XV,YV] := PZS[XV,YV] + 0
                else
                  PZS[XV,YV] := PZS[XV,YV] + round(PR[XV,YV,ZR]);
            end;
          {writeln('PZS=',PZS[XV,YV],' XV=',XV,' YV=',YV);}
        end;
    if (NormalizeShadows = true) then
      begin
      writeln('NORMALIZING ZSHADOWGRAPH..');
      PZSMAX := 1;
      for XV := XlBound to XuBound do
        for YV := YlBound to YuBound do
          if PZS[XV,YV] > PZSMAX then
            PZSMAX := PZS[XV,YV];
      writeln('PZSMAX = ',PZSMAX);
      for XV := XlBound to XuBound do
        for YV := YlBound to YuBound do
          begin
            {write('PZS before= ',PZS[XV,YV]);}
            PZS[XV,YV] := round(PZS[XV,YV]/PZSMAX*99);
            {write(' PZS after= ',PZS[XV,YV]);}
            {writeln(' PZSMAX= ',PZSMAX);}
          end;
      end
```

```
end;{procedure form_Zshadowgraph} procedure save_Zshadowgraph;

var
    zshadow        : text;
    XV             : integer;
    YV             : integer;
    ZV             : integer;

begin
    writeln('SAVING Z SHADOWGRAPH IN FILE "ZSHADOW.DAT"....');
    assign(zshadow,'zshadow.dat');
    rewrite(zshadow);
    writeln(zshadow,'          Y Y Y Y Y Y Y Y Y Y Y Y Y Y Y Y Y
 Y Y');
    writeln(zshadow,'          = = = = = = = = = = = = = = = = =
= =');
    write(zshadow,'        ');
    for XV := XlBound to XuBound do
      write(zshadow,XV:3);
    writeln(zshadow);
    for YV := YlBound to YuBound do
      begin
        writeln(zshadow);
        write(zshadow,'X=',YV:3);
        for XV := XlBound to XuBound do
          write(zshadow,round(FZS[XV,YV]):3);
      end;
    close(zshadow);
    end; {procedure save_Zshadowgraph} begin
    load_3D_image;
    form_YZtomogram;
    save_YZtomogram;
    form_YXtomogram;
    save_YXtomogram;
    form_Xshadowgraph;
    save_Xshadowgraph;
    form_Zshadowgraph;
    save_Zshadowgraph;
  end; {procedure form_2D-view}

{---------------------------------------------------------------}
{                  LOCATION OF THIRD NODE                       }
{            a three dimensional image has been                 }
{            reduced to a two dimensional image                 }
{            which can be printed, plotted, or                  }
{                   sent to a frame grabber                     }
{---------------------------------------------------------------}

{procedure form_RS170_video;}

{***************************************************************}
{*                   PROGRAM : RECON.PAS                       *}
{***************************************************************} begin {program RECON}
  if VDisk then change_default_drive;
  if UseDos then use_dos_for_screen;
  configure_simulation;   {define_target;}
```

```
    do_time_history;           {generate_time_histories;} {save_time_histories;}
    make_3D_image;             {recon_image;}
    form_2D_view;              {load_3D_image} {form..}
    writeln('*****************PROGRAM FINISHED********************');
end. {program RECON}
``` linear, sets up nonlinear reconstruction parameters. Sets voxel truncation level, if active. Sets up the filter coefficients for the convolution filter (hilb filter) applied to the echo time histories before image reconstruction. Sets the diamter of four rings of transmitter elements, concentric and inside of the ring of receiver elements. Sets the number of transmitter elements in each ring. Sets the number of receiver elements in the receiver ring. Sets the diameter of the receiver ring. Defines the simulated object to be imaged, point by point. An airplane shaped test object is included in the code. Sets the image reconstruction parameters. Sets the x location of the yz tomogram. Sets the z location of the yx tomogram. Sets the pixel normalization value. Defined the bounds of the three dimensional volume to be reconstructed. Computes the coordinates of the array elements.

ZEROTH NODE: (end of block zero) An actual scan head can be attached to the computer (along with interface electronics) or echo time histories, obtained by another, remote, system can be loaded onto the computers hard disk under the appropriate file names. The code in block zero can be modified so that no time histories are generated. The scan head, or array, geometry must match that of the actual array used to obtain the data. In the case of an attached scan head, the interface electronics would comprise circuits similar to FIG. 5 also having the time history memories of FIG. 6 but without the summation means. The interface electronics would also contain circuits similar to those in the reference by Platte for driving the transmitter elements. Standard RS 232 electronics along with commonly designed interface circuitry could be used to control the transmitter electronics and access the echo samples from the echo time history memories.

do_time_history: The main block one procedure. Computes echo time histories, and stores them in disk files, given the previously defined configuration.

generate_time_histories: Form the sequences of echo samples for each receiver element, for each transmitter element.

back_difference: Backward differences, if selected, the echo time histories.

fore_difference: Foreword differences, if selected, the echo time histories.

sinc_filter: Convolves a sinc type filter, if selected, with the echo time histories.

hilb_filter: Convolves a special filter, described in a different patent application, if selected, with the time histories.

save_time_histories: Stores the time histories in disk files.

record_time_histories: Puts the time histories in ascii text files for user observation.

compress_TH: Used with nonlinear reconstruction, takes the fractional root of the echo samples.

FIRST NODE: (end of block one) The block one code can be mostly eliminated if actual echo time histories are available as make_3D_image: The main block two procedure. Uses the echo time histories to reconstruct a three dimensional image and saves it in a disk file.

initialize_voxels: Sets all voxels to zero.

load_time_history: Reads in the echo time history data from disk files.

decompress_PR: Decompresses the reconstructed voxels if nonlinear processing is used.

recon_image: Linearly combines the echo samples to reconstruct the image.

nl_mul_TH_recon_image: Non linearly combines the echo samples to reconstruct the image.

nl_xmitr_recon_image: Non linearly combines the reconstructed images from each transmitter time histories.

normalize_voxels: Normalizes the reconstructed voxels to a selected value.

truncate_voxels: Truncates, if selected, all voxels below a selected value.

log_voxels: Log compresses, if selected, the reconstructed image voxels.

save_3D_image: Writes the reconstructed image to a disk file.

SECOND NODE: (end of block two) Block two code can be augmented by specially designed hardware processor boards which can perform the more computationally intensive algorithms, such as computing the total round trip distance. The code would then be modified to read and write into these boards and the specific algorithm eliminated.

form_2 D_view: The main procedure for the third block of code. Forms two dimensional views (shadowgraphs and tomograms) through the 3 D image.

load_3 D _image: Reads the reconstructed 3 D image in from a disk file.

form_YZ_tomogram: Forms a slice through the 3 D image in the yz plane.

save_YZ_tomogram: Saves the slice in a disk file.

form_YX_tomogram: Forms a slice through the 3 D image in the yx plane.

save_YX_tomogram: Saves the slice in a disk file.

form_Xshadowgraph: Forms a view through (by integration) the 3 D image in the x direction.

save_Xshadowgraph: Saves the view in a disk file.

form_Zshadowgraph: Forms a view through (by integration) the 3 D image in the z direction.

save_Zshadowgraph: Saves the view in a disk file.

THIRD NODE: End of block three code.

While the above descriptions contains many specifics, these should not be construed as limitations on the scope of the invention, but as an example of several embodiments.

The imaging concept can be implemented with any type of energy pulse of short duration with predictable velocity of propagation.

Non interfering, low interference or interfering type transmitted pulses may be used. Longer pulses may be used which are temporally compressed upon reception. Pulse sequences may be used which are combined by cross correlation for image reconstruction. Echoes may be processed as time sequences which are combined by cross correlation.

Sparse or non sparse two or three dimensional arrays may be used.

The echoes may or may not be of the same type of energy as the transmitted pulse. The velocity of the transmitted energy may be different from velocity of the echo energy.

The receiver array can be any shape, two dimensional or three dimensional, although circular is typically optimal. The transmitter or transmitters can be located at any position with respect to the receiver array.

The image reconstruction processing may be implemented in hardware or software or a combination of both.

The tomograms may be extracted in a more flexible manner by implementing, in hardware, equations that describe the tomographic plane and then by using these equations to extract voxels from the 3 D image to be used as tomographic pixels.

The viewing perspectives through the 3 D volume may be made more continuously variable by implementing in hardware the viewing perspective vector and using it to generate 3D memory addresses to access vowels to be summed, thus causing the integration.

What is claimed is:

1. A device for reconstructing an image, comprising image points of reflecting points on or within objects in a three dimensional volume, from echoes from the reflecting points resulting from a single transmitted pulse or redundant transmitted pulses, said device comprising:
    (a) pulse generating means for transmitting a short duration pulse of energy which will radiate through a wide solid angle within said three dimensional volume, said pulse generating means comprising a transmitter;
    (b) receiver array means for detecting echoes, from the reflecting points within the wide solid angle, caused by said pulse of energy, having three or more receiver elements, each providing detected echoes;
    (c) sampling means for sampling said detected echoes from each of the receiver elements;
    (d) selecting and combining means for selecting and combining certain of said echo samples with each other, whereby the image is reconstructed of the reflecting points, utilizing for each image reconstruction point corresponding to each of the reflecting points, round trip distance (RPT+RPE) of: (1) distance from the transmitter to the image reconstruction point, (RPT), and (2) distance from the image reconstruction point to each of the receiver elements, (RPE), in a Recon Address generator means for selecting one of the echo samples from each of the receiver elements to be combined by a recon summer means for reconstructing the image point of the reflecting point.

2. A device for reconstructing a three dimensional image, comprising image points of reflecting points on or within objects in a three dimensional volume, with a single transmitted pulse or redundant transmitted pulses, said device comprising:
    (a) pulse generating means for transmitting a short duration, low interference pulse of energy which will radiate uniformly through a wide solid angle in the three dimensional volume;
    (b) receiver array means for detecting echoes, resulting from said pulse of energy, having three or more receiver elements;
    (c) sampling means for sampling said detected echoes from each receiver element of said receiver elements;
    (d) selecting and combining means for selecting and combining each of said echo samples into the image points of the reflecting points in the three dimensional volume, whereby the three dimensional image is reconstructed, said selecting and combining means utilizing total time of flight for selection of each of the echo samples to be combined, wherein said total time of flight consists of sum of: (1) distance from the transmitter to the image point, (RPT) divided by velocity of the transmitted pulse, and (2) distance from the image point back to the receiver element, (RPE) divided by velocity of the echo.

3. The devices of claims 1 or 2 wherein the receiver elements are sparsely spaced.

4. A method for reconstructing a three dimensional image consisting of image points of reflecting points on or within objects in a three dimensional volume, using ellipsoidal backprojection, comprising the steps;
    (a) transmitting a short duration pulse of energy, from a transmitter located at a position given by transmitter coordinates, which will propagate uniformly through the three dimensional volume;
    (b) sensing echoes caused by the reflecting points within said volume using an array of three or more receiver elements located at different locations given by receiver coordinates;
    (c) sampling the echoes sensed at each of the receiver elements, wherein echo samples are created which are associated with each of the receiver elements;
    (d) backprojecting each of the echo samples, associated with each of the receiver elements, through the reconstructed image over an ellipsoid, or distorted ellipsoid, wherein for each said echo sample:
        (aa) round trip distance, RPE+RPT, which is the sum of: the distance from the transmitter coordinates to a particular image point. (RPT), and the distance from the image point to each receiver element coordinates, (RPE), determines major axis of the ellipsoid; transmitter coordinates and receiver element coordinates.

5. In a method for reconstructing an image comprising of image points of reflecting points on or within objects in a three dimensional volume comprising the steps;
    (a) transmitting a short duration pulse of energy which will propagate through the three dimensional volume, from a transmitter located at a transmitter coordinate position;
    (b) sensing echoes caused by the reflecting points within said volume using an array of three or more receiver elements, located at receiver coordinate positions;
    (c) sampling the echoes sensed at each receiver element and associating them with that element;
the improved image reconstruction method comprising the steps:
    (a) backprojecting each of the echo samples, associated with each of the receiver elements, through the reconstructed image, over an ellipsoid of revolution or distorted ellipsoid of revolution associated with each of the echo samples, wherein:
        (aa) round trip distance, RPE+RPT, which is sum of: distance from the transmitter coordinate position to image reconstruction point of one of the reflecting points, (RTP), and distance from that image reconstruction point to one of the receiver element coordinate positions, (RPE), and wherein said round trip distance determines major axis of ellipsoid associated with the transmitter, the receiver, the image reconstruction point and the echo sample;

(bb) foci of the ellipsoid are the transmitter coordinate position and the receiver element coordinate position.

6. The method of claims 4 or 5 wherein the receiver elements are sparsely spaced.

7. The method of claim 6 wherein wherein image reconstruction, more specifically comprises the steps;

(a) combining one of the echo samples from each of the receiver elements to reconstruct the image of one of the reflecting points, said combining comprising the steps; (aa) selecting said echo samples to be combined by forming sum of distance from the transmitter to the image of the reflecting point divided by transmitted pulse propagation velocity, with distance from the image of the reflecting point back to the receiver element divided by echo propagation velocity, and then forming a quotient by dividing said sum by sample interval, in time, at which the echo samples were taken, and using the quotient in forming an address to select each of said echo samples to be combined (bb) combining said selected echo samples by addition to form the image of the reflecting point (b) repeating step (a) for the image of each reflecting point in the reconstructed three dimensional image 8. The method of claim 7 wherein the transmitted pulse is a low interference pulse.

9. The method of claim 7 wherein the transmitted pulse is an intefering pulse.

10. The device according to claim 3 wherein the transmitted pulse is an interfering pulse.

11. The device according to claim 3 wherein the transmitted pulse is a monopolar pulse.

12. The device according to claim 3 wherein the transmitted pulse is an ultrasonic pulse.

13. The device according to claim 12 further comprising a means for generating tomographic images within the imaged three dimensional volume, said means comprising;

(a) means for using equation of a plane to select three dimensional voxels which will be used in the tomographic image (b) means for generating addresses for tomographic image pixels using voxel coordinates and coefficients of the equation of the plane (c) means for generating write pulses for the pixels by comparing the two sides of the equation.

14. The device according to claim 13 further comprising a means for generating shadowgraph images of the imaged three dimensional volume, said means comprising;

(a) means for using equations of lines to generate addresses of voxels to be summed to create pixels for the shadowgraph (b) means for generating a sequence of pixel addresses for the shadowgraph and summing them with the reconstruction point coordinates to create one side of the equation (c) means for multiplying the coefficients of the equation with a vector incrementor parameter and summing results to generate other side of the equation (d) means for comparing the two sides of the equation to generate write pulses for shadowgraph memory.

15. The device according to claim 1 or claim 2 wherein the array is an axicon array with elements spaced around the circumference of the array.

16. The device according to claim 3 wherein the transmitted pulse of energy is light.

17. The device according to claim 3 wherein the transmitted pulse is an electromagnetic radar pulse.

18. The device according to claim 3 wherein the transmitted pulse is a wideband pulse.

19. The device according to claim 3 wherein the transmitted pulse is a monopolar pulse.

20. The device according to claim 1 or claim 2 wherein the transmitted pulse is a pulse of particles.

21. The device according to claim 20 wherein the echo is electromagnetic energy and different velocities of the transmitted pulse and the echoes are used in the image reconstruction whereby the backprojected ellipsoids are distorted.

* * * * *